United States Patent
Aoyagi et al.

(10) Patent No.: US 8,023,789 B2
(45) Date of Patent: Sep. 20, 2011

(54) PLASTIC OPTICAL FIBER CABLE AND METHOD OF SIGNAL TRANSMISSION USING THE SAME

(75) Inventors: Amane Aoyagi, Otake (JP); Yoshihito Tsukamoto, Otake (JP); Yasushi Fujishige, Otake (JP); Yoshiko Maeda, Otake (JP); Tsuyoshi Kimura, Otake (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 264 days.

(21) Appl. No.: 12/311,360
(22) PCT Filed: Sep. 28, 2007
(86) PCT No.: PCT/JP2007/069059
§ 371 (c)(1), (2), (4) Date: Mar. 27, 2009
(87) PCT Pub. No.: WO2008/038791
PCT Pub. Date: Apr. 3, 2008

(65) Prior Publication Data
US 2009/0279837 A1  Nov. 12, 2009

(30) Foreign Application Priority Data

Sep. 28, 2006 (JP) ................ 2006-265773
May 24, 2007 (JP) ................ 2007-137855
Jul. 12, 2007 (JP) ................ 2007-183204

(51) Int. Cl.
*G02B 6/44* (2006.01)
*G02B 6/036* (2006.01)

(52) U.S. Cl. .............. 385/128; 385/100; 385/144
(58) Field of Classification Search .............. None
See application file for complete search history.

(56) References Cited

U.S. PATENT DOCUMENTS

| | | | |
|---|---|---|---|
| 6,453,104 B1 | 9/2002 | Shimada et al. | |
| 6,766,091 B2* | 7/2004 | Beuth et al. | 385/128 |
| 7,031,582 B2* | 4/2006 | Nakamura et al. | 385/128 |
| 2009/0067794 A1 | 3/2009 | Aoyagi et al. | |

FOREIGN PATENT DOCUMENTS

JP   H01-273012   10/1989

(Continued)

OTHER PUBLICATIONS

Cooper et al., "A polarized μ-FTIR study on a model system for nylon 6 6: implications for the nylon Brill structure," *Polymer* 42 (2001) 10119-10132.

(Continued)

*Primary Examiner* — Omar Rojas
(74) *Attorney, Agent, or Firm* — Fitch, Even, Tabin & Flannery

(57) ABSTRACT

A plastic optical fiber cable includes: a bare optical fiber including a core made of a poly(methyl methacrylate) or a copolymer including methyl methacrylate as a major component and a cladding layer including, at least in the outermost layer, a layer made of a certain fluorine-containing olefin-based resin; and a coating layer provided on the outer surface thereof. The coating layer includes a protective coating layer, a light blocking coating layer, and a functional coating layer, the layers being provided in the order mentioned from inner side. The protective coating layer is made of a certain resin material. The light blocking coating layer is made of a nylon-based resin including, as a major component, nylon 11 or nylon 12, the nylon-based resin containing monomer and oligomer compounds derived from the nylon-based resin in an amount of a certain range. The functional coating layer is made of a nylon-based resin composition having a crystalline melting point within a certain range, the nylon-based resin composition containing a certain amount of melamine cyanurate or bromine atoms and further containing a certain amount of inorganic chromatic pigments, or the layer is made of a nylon-based resin composition having a crystalline melting point of within a certain range and an oxygen transmission rate within a certain range.

19 Claims, 5 Drawing Sheets

FOREIGN PATENT DOCUMENTS

| | | |
|---|---|---|
| JP | H10-319281 | 12/1998 |
| JP | H11-242142 | 9/1999 |
| JP | 2000-231045 | 8/2000 |
| JP | 2001-021737 | 1/2001 |
| JP | 2001-074945 | 3/2001 |
| JP | WO01/48526 | 7/2001 |
| JP | 2002-055243 | 2/2002 |
| JP | 2002-55246 | 2/2002 |
| JP | 2003-255202 | 9/2003 |
| JP | 2003-315638 | 11/2003 |
| JP | 2004-226925 | 8/2004 |
| JP | 2005-099447 | 4/2005 |
| JP | 2005-234135 | 9/2005 |
| JP | 2006-133488 | 5/2006 |
| JP | WO2006/121048 | 11/2006 |
| JP | 2007-47424 | 2/2007 |

OTHER PUBLICATIONS

Yoshioka et al., "Structural change in the Brill transition of Nylon *m/n* (2) conformational disordering as viewed from the temperature-dependent infrared spectral measurements," Polymer 44 (2003) 6407-6417.

* cited by examiner

PLASTIC OPTICAL FIBER CABLE AND METHOD OF SIGNAL TRANSMISSION USING THE SAME

CROSS-REFERENCE TO RELATED APPLICATION

This is a U.S. National Phase of International Application PCT/JP2007/069059 filed Sep. 28, 2007, and claims foreign priority under 35 U.S.C. §119 based on Japanese Application Nos. 2006-265773, filed Sep. 28, 2006; 2007-137855, filed May 24, 2007; and 2007-183204, filed Jul. 12, 2007, the entire disclosures of which applications are hereby incorporated herein by reference.

TECHNICAL FIELD

The present invention relates to a plastic optical fiber cable having a coating layer made of a nylon-based resin and, more particularly, to a plastic optical fiber cable having excellent long-term heat resistance in a high temperature environment at around 100 to 110° C., and a method of signal transmission achieved by using a combination of this optical fiber cable and a visible light emitting diode having a center emission wavelength in a range of 500 nm to 600 nm.

BACKGROUND ART

Conventional optical fibers made of quartz, which is capable of providing good optical transmission across a broad wavelength spectrum, have been in practical use mainly for trunk lines. Such quartz optical fibers, however, are expensive and poor in workability. Accordingly, plastic optical fibers (hereinafter, abbreviated as "POF"), which offer advantages such as being much more inexpensive and lightweight, having larger apertures and easily workable end surfaces, and being easily handled, have been in practical use for lighting, sensors, and interior wiring such as FA, OA and LAN.

Among them, a step-index (SI) POF having a core/cladding structure using a poly(methyl methacrylate) (PMMA) as the core material and a low refractive-index fluorine-containing olefin copolymer as the cladding material has gradually been in practical use in the form of a POF cable having coating layer(s) on the outer surface of the POF, for in-vehicle LAN communication wiring because it is available for high-speed data communication and would be a better choice in terms of weight reduction, cost reduction in communication systems, and anti-electromagnetic noise measures.

When used in an automobile where the ambient temperature reaches around 100 to 110° C., a POF cable of the aforementioned type is required to have good heat resistance. In particular, when installed in a high-temperature environment such as in the vicinity of the engine where there are oil, electrolyte, and flammable substances such as gasoline, the POF cable is required to excel not only in heat resistance but also in chemical resistance. From this standpoint, there have been proposed many techniques in which polyamide resins (nylon-based resins) such as nylon 11, nylon 12, nylon 6/12, nylon 6, nylon 66, and nylon 6/66, which have good heat resistance and chemical resistance, are used as the coating material of the POF cable.

For example, Patent Document 1 (Japanese Patent Laid-Open No. 10-319281) and Patent Document 2 (Japanese Patent Laid-Open No. 11-242142) each proposes a POF cable including a POF, and a primary coating layer made of a black polyamide resin and a secondary coating layer made of a colored polyamide resin that are formed around the POF. Given examples of the polyamide resins include nylon 6, nylon 11, and nylon 12.

Patent Document 3 (International Patent Publication No. WO 01/48526) and Patent Document 4 (Japanese Patent Laid-Open No. 2003-315638) each discloses a POF cable including a bare POF, and an adhesive layer made of a material containing a polyamide-based polymer, a primary coating layer and a secondary coating layer that are sequentially formed around the POF. Given examples of the polyamide-based polymers include nylon 6, nylon 66, nylon 11, and nylon 12.

Patent Document 5 (Japanese Patent Laid-Open No. 2003-255202) proposes a POF cable including a bare POF and a coating layer formed around the POF, the coating layer being made of a polyamide resin containing an inorganic pigment based on a rare metal. Given examples of the polyamide-based resin include polyamide 11, polyamide 12, polyamide 6/12, polyamide 66, and polyamide 66/6. Patent Document 6 (Japanese Patent Laid-Open No. 2004-226925) proposes a POF cable including a bare POF and a coating layer formed around the POF. The coating layer is made of a polyamide resin containing an inorganic ultramarine blue pigment. Given examples of the polyamide resin include nylon 11, nylon 12, nylon 6, and nylon 66.

Patent Document 7 (Japanese Patent Laid-Open No. 2000-231045) describes a POF cable including a bare POF, and a primary coating layer and a secondary coating layer that are formed around the POF. The primary coating layer is made of a nylon-based resin having a melting point of 200° C. or lower, and the secondary coating layer is made of, for example, a vinyl chloride resin or nylon 12 having an oxygen index of 25 or higher.

However, POF cables having a coating layer made of a polyamide resin (nylon-based resin) material can suffer from problems as follows.

Typical polyamide resins such as nylon 12 are industrially synthesized by polycondensation of amine and carboxylic acid. However, the polymerization of a polyamide resin is accompanied by the establishment of a chemical equilibrium, so that the resultant polymer is always contaminated with a monomer or oligomer derived from a feed material for the polyamide resin.

Investigations made by the present inventors have demonstrated that transmission losses in POF are significantly increased for POF cables wherein a primary coating layer made of a polyamide 11, polyamide 12, or polyamide 6-12 resin is provided in contact with a bare POF, and for POF cables having a secondary coating layer made of these polyamide resins, as described in the aforementioned Patent Documents, when the cables are left in a high temperature environment at 100° C. or higher for a long period of time.

The present inventors have analyzed a possible cause of this in depth. As a result, the inventors have ascertained that the residual monomers or oligomers derived from the feed material are responsible for the aforementioned increase in transmission loss in POF, that is, they dissolve and diffuse into the bare POF from the primary and/or secondary coating layer(s) to cause the increase in transmission loss.

In addition, it has been found that particularly significant increase in transmission loss is observed when the outermost cladding layer is made of a fluorine-containing olefin resin having a tetrafluoroethylene (TFE) unit and when heat of crystal fusion is greater than a certain amount of value.

Examples of the aforementioned monomers derived from a polyamide resin material include aliphatic diamino acid compounds, aliphatic dicarboxylic acid compounds, and aminoaliphatic carboxylic acid compounds that form polyamide resins. More specifically, examples include 11-aminoundecanoic acid for nylon 11, 12-aminododecanoic acid for nylon 12, hexamethylene diamine and dodecanedioate for nylon 6-12, hexamethylene diamine and sebacate for nylon 610, ε-aminocaproic acid for nylon 6, hexamethylene diamine and adipic acid for nylon 66, 1,10-decanediamine and 1,12-dodecanediamine for nylon 1010, and 1,12-decanediamine and 1,12-dodecanedioic acid for nylon 1012. Examples also include cyclic lactam compounds having an endocyclic amide bond (—CONH—) obtained through intramolecular cyclic esterification of the molecular chain terminals of an aminocarboxylic acid compound. Specific examples include ε-caprolactam for nylon 6 and lauryl lactam for nylon 12. It is noted that the monomers derived from the feed material as used herein include low-molecular-weight compounds produced as by-products during the synthesis of the feed material.

On the other hand, examples of the aforementioned oligomers derived from a polyamide resin material include compounds having molecular chain terminals that has an amino group (—NH$_2$) and/or a carboxyl group (—COOH), which are formed through intermolecular esterification of the molecular chain terminals of two or more molecules of the aforementioned feed monomers (e.g., aliphatic diamino acid compounds, aliphatic dicarboxylic acid compounds, and amino-aliphatic carboxylic acid compounds, as described above) in the course of the condensation polymerization for the production of the polyamide resin; cyclic lactam compounds having an endocyclic amide bond (—CONH—) formed through further intramolecular esterification of the molecular chain terminals of the above compounds; compounds formed through intermolecular esterification of the above compounds; and compounds formed through an intramolecular/intermolecular secondary reaction (deamination reaction or decarboxylation reaction).

When the aforementioned monomers and oligomers are linear, the terminal amino group has high affinity with fluorine-containing olefin polymers, and the monomers and oligomers thus tend to stay in the cladding layer made of the fluorine-containing olefin polymer. This often causes reduction in transparency of the cladding material, which can result in significant deterioration of transmission characteristics of the POF cable. Meanwhile, when the aforementioned monomers and oligomers are cyclic lactam compounds, the monomers and oligomers tend to migrate to the vicinity of the interface on the inner layer side of the cladding layer (the core or the first cladding layer side) to form particulate structures. As a result, more structural mismatch would happen at the core-cladding interface or a cladding-cladding interface if there are two or more cladding layers with a tendency of significant deterioration of transmission characteristics of the POF cable.

Among the aforementioned oligomers, those having a lower molecular weight tend to dissolve and diffuse into POF more easily. In particular, those having a molecular weight of 2,000 or lower have a remarkable tendency of it.

As described above, the POF cables are required to have a good heat resistance. In particular, the POF cables that are intended to be used in an automobile are required not to cause any significant increase in transmission loss for a long period of time of longer than 5,000 hours, in an environment at 105° C. However, it is difficult for the conventional POF cables as described in the aforementioned Patent Documents to meet the required performance because increase in transmission losses is inevitable for the aforementioned reasons, after having been placed in a high temperature environment for a long period of time.

In addition, it has been reported that optical properties of a POF may be significantly degraded due to excessive stress on the POF when the POF is coated with a nylon-based resin such as nylon 66 having a relatively high melting point. For example, Patent Document 7 (Japanese Patent Laid-Open No. 2000-231045) discloses a POF cable having a POF around which a primary coating material of a nylon 66 resin is directly provided, as comparative examples (Comparative Examples 2 and 8) to the proposed invention. The document discloses that, in the POF cable, the polyamide 66 resin having a high melting point is directly coated over the bare POF at a high coating temperature, which brings about deformation of the POF and increase in transmission loss, and hence nylon-based resins having a high melting point are not suitable as a coating material for POFs.

Considering now light emitting diodes (LEDs) which have been used as a light source for POFs, those with a center emission wavelength of around 650 nm are most commonly used but currently cannot provide sufficient long-term heat resistance at 100° C. or higher. The reason is that such LEDs are made of a GaAlAs-based material and their aluminum component, if contained too much, tends to lower the LED's own heat resistance.

As a signal transmission system having an excellent heat resistance at 100° C. or higher, Patent Document 8 (Japanese Patent Laid-Open No. 2001-74945) discloses a signal transmission system including an LED with a center emission wavelength of 930 to 990 nm and a POF whose core is made of a norbornene-based resin, and Patent Document 9 (Japanese Patent Laid-Open No. 2001-21737) discloses a signal transmission system including an LED with a center emission wavelength of 750 to 850 nm and a POF whose core is made of a polycarbonate resin. LEDs of which center emission wavelength falls within a near infrared region contain less aluminum component, and is thus superior in heat resistance at 100° C. or higher. In addition, POFs which are placed in such a high temperature environment typically undergo increase in electronic transition absorption due to thermal oxidative deterioration of a bare POF and increase in Rayleigh scattering due to migration of a low-molecular-weight compound contained in a coating material into the bare POF. The value of transmission loss within the near infrared region is hardly affected by them. Accordingly, in the signal transmission system described in the aforementioned Patent Documents, the transmission loss is less changed with time even in a high temperature environment at 100° C. or higher, and therefore, it is possible to keep the transmission loss at a constant level over a significantly long period of time.

However, transmission losses are as high as the 6,000 s dB/km at 930 to 990 nm in the POF whose core is made of a norbornene-based resin as described in the aforementioned Patent Document 8, while transmission losses are 1,000 s dB/km at 750 to 850 nm in the POF whose core is made of a polycarbonate-based resin as described in Patent Document 9. As apparent from the above, the transmission losses in the POFs described in these Patent Documents are too high to use them in practice for in-vehicle LAN communication wiring.

On the other hand, known as visible light emitting diodes having a center emission wavelength at or below 600 nm are InGaN-based LEDs (center emission wavelengths of 505 nm and 520 nm), PGaN-based LEDs (center emission wavelength of 565 nm), and InGaAlP-based LEDs (center emission wavelength of 590 nm). They contain no or a small percentage of, if any, aluminum component that otherwise would cause reduction in heat resistance of the LED. This means that the heat resistance of these LEDs at 100° C. or higher comes to the point where these LEDs can be put into practical use. Furthermore, in the POFs whose core is made of a PMMA resin, there is a wavelength window around 570 nm where the transmission loss is 80 to 90 dB/km, which is remarkably lower than the transmission loss in a wavelength window around 650 nm where the transmission loss is about 130 to 140 dB/km.

However, the transmission loss in a POF is likely to increase in such short-wavelength regions when the POF is placed in a high temperature environment at 100° C. or higher because it tends to be affected by the aforementioned increase in electronic transition absorption or Rayleigh scattering. It has therefore been believed to be difficult to practically use a signal transmission system including a POF and an LED having a center emission wavelength in a range of 500 nm to 600 nm, in a high temperature environment such as in an automobile.

DISCLOSURE OF THE INVENTION

An object of the present invention is to provide a plastic optical fiber cable with which no significant increase in transmission loss occurs in a high temperature environment, the cable being superior in long-term heat resistance, and a method of signal transmission achieved by using this.

In one embodiment in accordance with a first aspect of the present invention, there is provided a plastic optical fiber cable including: a bare plastic optical fiber including a core and one or two or more cladding layer(s) formed around the core; and a coating layer provided on the outer surface thereof, wherein the core is made of a poly(methyl methacrylate) or a copolymer including methyl methacrylate as a major component;

the cladding layer includes, at least in the outermost layer, a layer made of a fluorine-containing olefin-based resin including a tetrafluoroethylene unit, the cladding layer having a heat of crystal fusion of 40 mJ/mg or smaller as measured using differential scanning calorimetry (DSC);

the coating layer includes a protective coating layer, a light blocking coating layer, and a functional coating layer, the layers being provided in the order mentioned from inner side;

the functional coating layer is made of a nylon-based resin composition having a crystalline melting point in a range of 215° C. to 280° C.;

the functional coating layer is made of the nylon-based resin composition having a crystalline melting point in a range of 215° C. to 280° C. as measured using differential scanning calorimetry (DSC), the nylon-based resin composition containing melamine cyanurate in an amount in a range of 3% to 40% by mass or a brominated flame retardant in such an amount that the content of bromine atoms falls within a range of 1.5% or more to 30% by mass, the nylon-based resin composition further containing an inorganic chromatic pigment in an amount in a range of 0.1% to 10% by mass;

the light blocking coating layer is made of a resin composition including, as a major component, a nylon-based resin of at least one of nylon 11 and nylon 12, the resin composition containing monomer and oligomer compounds derived from the nylon-based resin in an amount of 1.5% by mass or less in total, and the protective coating layer is made of at least one resin material selected from the group consisting of polybutylene terephthalate-based resins, methyl (meth)acrylate-based resins, styrene-based resins, and homopolymers of vinylidene fluoride.

In another embodiment, there is provided the aforementioned plastic optical fiber cable in which the functional coating layer is made of a nylon-based resin composition including at least one of nylon 6 and nylon 66 as a major component.

In another embodiment, there is provided the aforementioned plastic optical fiber cable in which the functional coating layer is made of a nylon-based resin composition containing not more than 20% by mass of antimony oxide.

In another embodiment, there is provided the aforementioned plastic optical fiber cable which satisfies the following formulae (i) to (iii):

$$900 \leq A \leq 1100 \quad (i)$$

$$1.5 \leq b/a \leq 30 \quad (ii)$$

$$5.5 \leq (b+c)/a \leq 70 \quad (iii)$$

wherein "A" represents the outer diameter of the bare plastic optical fiber (μm), "a" represents the thickness of the protective coating layer (μm), "b" represents the thickness of the light blocking coating layer (μm), and "c" represents the thickness of the functional coating layer (μm).

In one embodiment in accordance with a second aspect of the present invention, there is provided a plastic optical fiber cable including: a bare plastic optical fiber including a core and one or two or more cladding layer(s) formed around the core; and a coating layer provided on the outer surface thereof, wherein the core is made of a poly(methyl methacrylate) or a copolymer including methyl methacrylate as a major component;

the cladding layer includes, at least in the outermost layer, a layer made of a fluorine-containing olefin-based resin including a tetrafluoroethylene unit, the cladding layer having a heat of crystal fusion of 40 mJ/mg or smaller as measured using differential scanning calorimetry (DSC);

said coating layer includes a protective coating layer, a light blocking coating layer, and a functional coating layer, the layers being provided in the order mentioned from inner side;

the functional coating layer is made of a nylon-based resin composition having a crystalline melting point in a range of 240° C. to 280° C. as measured using differential scanning calorimetry (DSC), the nylon-based resin composition having an oxygen transmission rate P [cm$^3$·cm/(cm$^2$·sec·Pa)] as measured using a method defined in ISO 14663-2:1999 (Annex C) at a temperature T(K), the P satisfying the following formula (A):

$$P < 8 \times 10^{-2} \times \exp(-5600/T) \quad (A);$$

the light blocking coating layer is made of a resin composition including, as a major component, a nylon-based resin of at least one of nylon 11 and nylon 12, the resin composition containing monomer and oligomer compounds derived from the nylon-based resin in an amount of 1.5% by mass or less in total, and the protective coating layer is made of at least one resin material selected from the group consisting of polybutylene terephthalate-based resins, methyl (meth)acrylate-based resins, styrene-based resins, homopolymers of vinylidene fluoride, and copolymers including a polyethylene unit and a polyvinyl alcohol unit.

In another embodiment, there is provided the aforementioned plastic optical fiber cable in which the functional coating layer is made of a nylon-based resin composition having a crystallinity in a range of 30% to 55%.

In another embodiment, there is provided the aforementioned plastic optical fiber cable in which the functional coating layer is made of a nylon-based resin composition having an average diameter of a spherulite size in a range of 0.01 µm to 40 µm as observed through a microscope.

In another embodiment, there is provided the aforementioned plastic optical fiber cable in which the functional coating layer is made of a nylon-based resin composition including nylon 66 as a major component.

In another embodiment, there is provided the aforementioned plastic optical fiber cable in which the functional coating layer is made of a nylon-based resin composition containing a crystallization accelerator in an amount in a range of 0.01% to 10% by mass.

In another embodiment, there is provided the aforementioned plastic optical fiber cable in which the functional coating layer is made of a nylon-based resin composition containing a bromine-containing polystyrene in such an amount that the content of bromine atoms falls within a range of 1.5% to 30% by mass.

In another embodiment, there is provided the aforementioned plastic optical fiber cable in which the functional coating layer is made of a nylon-based resin composition containing not more than 20% by mass of antimony oxide.

In another embodiment, there is provided the aforementioned plastic optical fiber cable in which the functional coating layer is made of a nylon-based resin composition containing, as a colorant, an inorganic pigment in an amount in a range of 0.1% to 10% by mass.

In one embodiment in accordance with another aspect of the present invention, there is provided a method of signal transmission for transmitting a signal by using a combination of any one of the aforementioned plastic optical fiber cables and a visible light emitting diode having a center emission wavelength in a range of 500 nm to 600 nm.

According to the present invention, it is possible to provide a plastic optical fiber cable with which no significant increase in transmission loss occurs in a high temperature environment, the cable being superior in long-term heat resistance, and a signal transmission system using the same.

BEST MODE FOR CARRYING OUT THE INVENTION

The present inventors have found the following. In a high temperature (or in a high temperature and high humidity) environment, increase in transmission loss in a plastic optical fiber cable (hereinafter, "POF cable") is due to migration of a low-molecular-weight compound contained in a coating material into a bare plastic optical fiber (hereinafter, "bare POF") and its associated increase in Rayleigh scattering, as well as due to oxidation degradation caused by the oxygen existing in an environment where the POF cable is placed, passing through a coating material, and dissolving and diffusing into the bare POF, and resulting increase in electronic transition absorption. The present inventors have also found that increase in transmission loss in the POF at a wavelength of 650 nm can be suppressed by means of providing, in the coating layer structure of the POF cable, a coating layer (protective coating layer) that is capable of preventing migration of low-molecular-weight compounds (monomers and oligomers), and by means of forming the coating layer structure using a coating layer (light blocking coating layer, functional coating layer) that contains only few low-molecular-weight compounds (monomers and oligomers) or that hardly emits low-molecular-weight compounds to suppress increase in Rayleigh scattering.

Furthermore, the present inventors have found that, by using a nylon-based resin composition having low oxygen permeability for the coating layer (functional coating layer) to suppress increase in electronic transition absorption, it is possible to suppress not only increase in transmission loss in the POF at a wavelength of 650 nm but also increase in transmission loss at a wavelength of 600 nm or lower.

Now, a preferred embodiment of the POF cable according to the present invention is described.

[Fundamental Structure of POF Cable]

Figure 1:
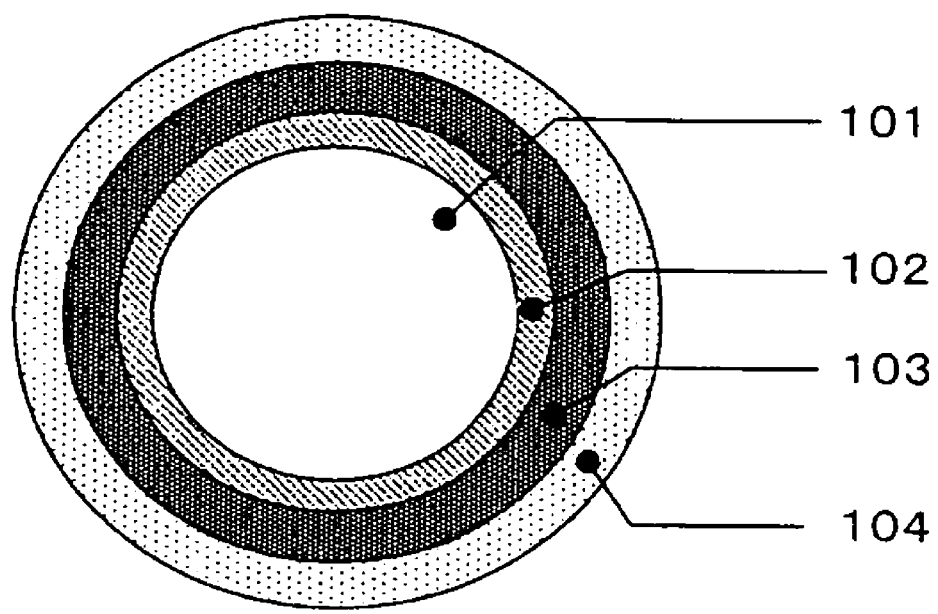
FIG. 1 is a cross-sectional view showing a plastic optical fiber cable according to the present invention.

A POF cable according to the present invention includes, as shown in FIG. 1, a bare POF 101 having a core and one or two or more cladding layer(s) formed around the core, and a coating layer provided on the outer surface thereof, the coating layer being made up of a protective coating layer 102, a light blocking coating layer 3, and a functional coating layer 104, provided in the order mentioned from the inner side.

The aforementioned core is made of a poly(methyl methacrylate) (a homopolymer of methyl methacrylate) or a copolymer including methyl methacrylate as a major component. The aforementioned cladding layer includes, at least in the outermost layer, a layer made of a fluorine-containing olefin resin containing a tetrafluoroethylene unit and having a heat of crystal fusion of 40 mJ/mg or smaller as measured using differential scanning calorimetry (DSC).

The aforementioned protective coating layer according to a first aspect is made of at least one selected from polybutylene terephthalate-based resins, methyl (meth)acrylate-based resins, styrene-based resins including a styrene unit as a major component, and homopolymers of vinylidene fluoride. According to a second aspect, the protective coating layer is made of at least one selected from polybutylene terephthalate-based resins, methyl (meth)acrylate-based resins, styrene-based resins including a styrene unit as a major component, homopolymers of vinylidene fluoride, and copolymers including a polyethylene unit and a polyvinyl alcohol unit. Of these, polybutylene terephthalate-based resins are particularly preferable.

The aforementioned light blocking coating layer is made of a nylon-based resin composition including at least one of nylon 11 and nylon 12. It is preferable that the total amount of the monomer and oligomer compounds derived from a feed material of the nylon-based resin that is contained in this nylon-based resin composition be within a range of equal to or lower than 1.5% by mass. The nylon-based resin composition may be colored to black by means of containing a light blocking agent.

The aforementioned functional coating layer is made of a nylon-based resin composition having a crystalline melting point within the range of 215° C. to 280° C. according to the first aspect and having a crystalline melting point within the range of 240° C. to 280° C. according to the second aspect, as measured using differential scanning calorimetry (DSC). It is preferable that the functional coating layer be made of a nylon-based resin composition including at least one selected from nylon 6, nylon 66, nylon 610, and nylon 6/66. It is more preferable that the functional coating layer be made of a nylon-based resin composition including at least one of nylon 6, and nylon 66.

This functional coating layer may contain a colored inorganic pigment in order to render the POF cable more distinguishable. In addition, it may contain a brominated flame retardant or melamine cyanurate in order to improve the flame resistance of the POF cable.

The aforementioned brominated flame retardant is preferably a brominated compound having a 1% mass loss temperature of 300° C. or higher, as measured using a thermogravimetric-differential thermal analysis (TG/DTA). In addition at least one may be suitably used that is selected from tetrabromobisphenol A derivative compounds having a molecular weight ranging from 900 to 4,000, or from brominated polystyrene, polydibromostyrene, poly(pentabromobenzyl acrylate) having number average molecular weight ranging from 900 to 60,000.

Now, the bare POF (core, cladding), the light blocking coating layer, the protective coating layer, and the functional coating layer are described one by one that make up the POF cable according to the present invention.

[Bare POF]

In the POF cable according to the present invention, the material (core material) used for the core of the bare POF is a poly(methyl methacrylate) (PMMA) or a copolymer of a methyl methacrylate (MMA) unit and one or more vinyl monomer unit from the viewpoint of satisfying the long-term heat resistance of the POF cable around 100 to 105° C. Hereinafter, this copolymer and PMMA are referred to as a PMMA resin. Among them, PMMA having an excellent balance between transparency and mechanical strength is preferable. When the core material is a copolymer of MMA and a vinyl monomer, the content of the MMA unit is preferably 50% by mass or higher, more preferably 60% by mass or higher, even more preferably 70% by mass or higher, from the viewpoint of providing enough transparency. As a copolymerization component for the MMA, any of the materials that have been proposed as a feed material of the POF core material, such as methacrylic ester and acrylic ester, can be selected as appropriate.

The cladding formed on the outer surface of the core may be formed of one layer or two or more layers. At least the outermost cladding layer includes a layer made of a fluorine-containing olefin resin from the viewpoint of mechanical properties, heat resistance, chemical resistance, and impact resistance, for functioning as the protective material for the core and the inner cladding, and, from the viewpoint of optical properties that the outermost layer has a refractive index that is low enough to lower optical loss when the cable is bent. The fluorine-containing olefin polymer used is the one including at least tetrafluoroethylene (TFE) unit and having a heat of crystal fusion of 40 mJ/mg or smaller.

Examples of the fluorine-containing olefin polymer including a TFE unit include, but not limited to, a copolymer obtained through copolymerization of a TFE unit and at least one of a vinylidene fluoride (VdF) unit, a hexafluoropropylene (HFP) unit, and a perfluoro(fluoro)alkylvinyl ether (FVE) unit; a copolymer of a VdF unit, a TFE unit, and a hexafluoroacetone unit; and a copolymer of a TFE unit, an HFP unit, and an ethylene unit. As a copolymerization component for the TFE, a VdF unit, an HFP unit, or an FVE unit is particularly preferable from the viewpoint of cost, transparency, and heat resistance.

In addition, a fluorine-containing olefin polymer including a TFE unit further including at least one of a VdF unit and an HFP unit is preferable in terms of excellent stability during melt spinning of the POF.

As specific examples of the aforementioned fluorine-containing olefin polymer including a TFE unit, mention may be made of a binary copolymer consisting of 60 to 90% by mass of a VdF unit and 10 to 40% by mass of a TFE unit, a ternary copolymer consisting of 10 to 60% by mass of a VdF unit, 20 to 70% by mass of a TFE unit, and 5 to 35% by mass of an HFP unit, a ternary copolymer consisting of 5 to 25% by mass of a VdF unit, 50 to 80% by mass of a TFE unit, and 5 to 25% by mass of an FVE unit, a ternary copolymer consisting of 5 to 60% by mass of an ethylene unit, 25 to 70% by mass of a TFE unit, and 5 to 45% by mass of an HFP unit, a quaternary copolymer consisting of 10 to 30% by mass of a VdF unit, 40 to 80% by mass of a TFE unit, 5 to 40% by mass of an HFP unit, and 0.1 to 15% by mass of an FVE unit, a binary copolymer consisting of 40 to 90% by mass of a TFE unit and 10 to 60% by mass of an FVE unit, and binary copolymer consisting of 30 to 75% by mass of a TFE unit and 25 to 70% by mass of an HFP unit.

Examples of the FVE unit include a unit of a compound represented by the following general formula (1):

$$CF_2=CF—(OCF_2CF(CF_3))aO—Rf_2 \qquad (1)$$

(wherein, $Rf_2$ is an alkyl group or a fluoroalkyl group or an alkoxyalkyl group or a fluoroalkoxyalkyl group, having 1 to 8 carbon atoms, and a is an integer of from 0 to 3).

Among those represented by the aforementioned general formula (1), it is preferable to use a unit of a compound represented by any one of the following general formulae (2) to (5):

$$CF_2=CFO(CF_2)_n—OCF_3 \qquad (2)$$

(wherein, n is an integer of from 1 to 3), $$CF_2=CF(OCF_2CF(CF_3))_nO(CF_2)_mCF_3 \qquad (3)$$

(wherein, n is an integer of from 0 to 3, and m is an integer of from 0 to 3), $$CF_2=CFO(CH_2)_n(CF_2)_mCF_3 \qquad (4)$$

(wherein, n is an integer of from 1 to 3, and m is an integer of from 0 to 3), and $$CF_2=CFO(CH_2)_nCH_3 \qquad (5)$$

(wherein, n is an integer of from 0 to 3).

Furthermore, at least one unit of a compound selected from the group consisting of $CF_2=CFOCF_3$, $CF_2=CFOCF_2CF_3$, $CF_2=CFOCF_2CF_2CF_3$, $CF_2=CFOCH_2CF_3$, $CF_2=CFOCH_2CF_2CF_3$, $CF_2=CFOCH_2CF_2CF_2CF_3$, $CF_2=CFOCH_3$, $CF_2=CFOCH_2CH_3$ and $CF_2=CFOCH_2CH_2CH_3$ is preferable as the FVE unit from the viewpoint that the feed material thereof can be obtained at low cost.

Moreover, as the fluorine-containing olefin polymer that forms the outermost cladding layer in the present invention, it is necessary to use a resin having a value of a heat of crystal fusion of 40 mJ/mg or smaller, more preferably 20 mJ/mg or smaller, and even more preferably 15 mJ/mg or smaller. An excessive heat of crystal fusion produces a resin having a higher crystallinity, and causes reduction in transparency of the resin in a high temperature environment, which possibly results in an increased transmission loss of the POF cable initially and in a high temperature environment. The fluorine-containing olefin polymer that forms the outermost cladding layer can be a resin having a heat of crystal fusion of, for example, 1 mJ/mg or greater as long as it falls within the aforementioned range.

When the cladding is formed of two or more layers, the resin that forms the inner cladding inside the outermost layer can be selected as appropriate from the materials that have been proposed as the POF cladding material, such as fluorinated methacrylate-based polymers and vinylidene fluoride-based polymers. Fluorinated methacrylate-based polymers are particularly preferable because of their having easy-to-adjust refractive index and their having excellent flexibility and workability along with good transparency and heat resistance.

An example of the aforementioned fluorinated methacrylate-based polymer having excellent flexibility and workability along with good transparency and heat resistance, includes a copolymer of 15 to 90% by mass of a unit (A) of fluorinated alkyl (meth)acrylate represented by the following general formula (6):

$$CH_2=CX-COO(CH_2)_m-R_{1f} \quad (6)$$

(wherein, X is a hydrogen atom, a fluorine atom or a methyl group, $R_{1f}$ is a fluoroalkyl group having 1 to 12 carbon atoms, and m is an integer of 1 or 2), and 10 to 85% by mass of a unit (B) of a monomer which is copolymerizable with the monomer of the unit (A), the copolymer having a refractive index ranging from 1.39 to 1.475.

An example of the unit (A) of the fluorinated alkyl (meth) acrylate includes a unit of a compound represented by the following general formula (7) or (8):

$$CH_2=CX-COO(CH_2)_m(CF_2)_nY \quad (7)$$

(wherein, X is a hydrogen atom or a methyl group, Y is a hydrogen atom or a fluorine atom, m is 1 or 2, n is an integer of from 1 to 12),

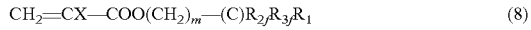

$$CH_2=CX-COO(CH_2)_m-(C)R_{2f}R_{3f}R_1 \quad (8)$$

(wherein, X is a hydrogen atom or a methyl group, $R_{2f}$ and $R_{3f}$ are fluoroalkyl groups which may be the same or different, R1 is a hydrogen atom, a methyl group or a fluorine atom, and m is an integer of 1 or 2).

Examples of the general formula (7) include fluorinated (meth)acrylates having a linear fluorinated alkyl group as a side chain, such as 2,2,2-trifluoroethyl (meth)acrylate (3FM), 2,2,3,3-tetrafluoropropyl (meth)acrylate (4FM), 2,2,3,3,3-pentafluoropropyl (meth)acrylate (5FM), 2,2,3,4,4,4-hexafluorobutyl (meth)acrylate (6FM), 1H,1H,5H-octafluoropentyl (meth)acrylate (8FM), 2-(perfluorobutyl)ethyl (meth)acrylate (9FM), 2-(perfluorohexyl)ethyl (meth)acrylate (13FM), 1H,1H,9H-hexadecafluorononyl (meth)acrylate (16FM), 2-(perfluorooctyl)ethyl (meth)acrylate (17FM), 1H,1H,11H-(icosafluoroundecyl) (meth)acrylate (20FM), and 2-(perfluorodecyl)ethyl (meth)acrylate (21 FM). Examples of the general formula (8) include fluorinated (meth)acrylate having a branched fluorinated alkyl group as a side chain, such as hexafluoroneopentyl (meth)acrylate and hexafluoroisobutyl (meth)acrylate.

On the other hand, examples of the unit (B) of the monomer which is copolymerizable with the monomer of the unit (A) include alkyl (meth)acrylate, such as methyl (meth)acrylate, ethyl (meth)acrylate, and butyl (meth)acrylate; cycloalkyl (meth)acrylate, such as cyclohexyl (meth)acrylate, methyl-cyclohexyl (meth)acrylate, bornyl (meth)acrylate, isobornyl (meth)acrylate, and adamantyl (meth)acrylate; aromatic (meth)acrylate, such as phenyl (meth)acrylate and benzyl (meth)acrylate; alicyclic (meth)acrylate having an alicyclic group as a side chain, such as tricyclodecanyl (meth)acrylate, (1-methyltricycloheptyl) (meth)acrylate, and (1-methyl-hexacyclododecyl) (meth)acrylate; N-substituted maleimide, such as N-methylmaleimide, N-ethylmaleimide, N-propyl-maleimide, N-isopropylmaleimide, N-cyclohexylmaleimide, and N-phenylmaleimide; and a unit of a lactone compound, such as α-methylene-γ-butyrolactone, α-methylene-γ-methyl-γ-butyrolactone, α-methylene-γ,γ-dimethyl-γ-butyrolactone, α-methylene-γ-ethyl-γ-butyrolactone, α-methylene-γ-cyclohexyl-γ-butyrolactone, α-methylene-β-methyl-γ-butyrolactone, α-methylene-β,β-dimethyl-γ-butyrolactone, α-methylene-β-ethyl-γ-butyrolactone, α-methylene-β-methyl-γ-methyl-γ-butyrolactone, and α-methylene-β-methyl-γ,γ-methyl-γ-butyrolactone.

From the above compounds, one or more compounds having a satisfactory level of transparency and heat resistance as the cladding material may be selected as appropriate. Among them, methyl (meth)acrylate is preferable because the transparency, the heat resistance, and the mechanical strength of the cladding material can be improved in a well-balanced manner by copolymerizing it with a fluorinated alkyl (meth) acrylate. Furthermore, adding 0.5 to 5% by mass of methacrylic acid unit to a fluoridated methacrylate-based polymer can improve adhesion both to the core material and the resin of the outermost cladding layer in the POF.

When bending loss in the POF is required to be small, it is preferable to use a copolymer of 10 to 40% by mass of a unit of 2-(perfluorooctyl)ethyl (meth)acrylate (17FM), 40 to 90% by mass of a unit of at least one of 2,2,2-trifluoroethyl (meth) acrylate (3FM), 2,2,3,3-tetrafluoropropyl (meth)acrylate (4FM) and 2,2,3,3,3-pentafluoropropyl (meth)acrylate (5FM), and further 0 to 20% by mass of a unit of methyl methacrylate, the copolymer having a refractive index ranging from 1.39 to 1.43.

When a high transmission band is required for the POF, it is preferable to use a copolymer of 15 to 30% by mass of a unit of at least one of 2,2,2-trifluoroethyl (meth)acrylate (3FM), 2,2,3,3-tetrafluoropropyl (meth)acrylate (4FM), and 2,2,3,3,3-pentafluoropropyl (meth)acrylate (5FM), and 70 to 85% by mass of a unit of methyl methacrylate, the copolymer having a refractive index ranging from 1.45 to 1.475.

Although the cladding layer may be formed of two or more layers as described above, it is preferable to use a two-layer structure including, as an inner cladding, a first cladding that is provided between the outermost layer cladding and the core, and a second cladding layer that is provided around it as the outermost layer cladding, from the viewpoint of reducing manufacturing cost.

When the cladding has a two-layer structure, $n_1$, $n_2$, and $n_3$ preferably satisfy the following formula (iV):

$$n_1 > n_2 > n_3 \quad (iV)$$

wherein $n_1$ represents the refractive index of the core, $n_2$ represents the refractive index of the inner cladding (first cladding) and $n_3$ represents the refractive index of the outermost layer cladding (second cladding), from the viewpoint of reduction in bending loss when the POF is bent. Alternatively, the following formulae (V) and (Vi) may be satisfied:

$$n_1 > n_2 \quad (V)$$

$$n_2 < n_3 \quad (Vi)$$

It is noted that the refractive index in the present invention is the refractive index measured at 25° C. using the sodium D line.

[Light Blocking Coating Layer]

Next, the light blocking coating layer, which is a component of the POF cable according to the present invention, is described.

The POF cable according to the present invention has a light blocking coating layer which is provided around the aforementioned bare POF having the core/cladding structure. The light blocking coating layer is made of a nylon-based resin (polyamide resin) containing a light blocking agent, such as carbon black, to prevent incidence of ambient light.

As the aforementioned nylon-based resin, nylon 11 (homopolymer) and nylon 12 (homopolymer) are suitable which are superior in heat resistance, flex resistance, and chemical resistance. Because of having good formability in the coating process and having a moderate crystalline melting point, the nylon 11 and nylon 12 can be easily coated over the bare POF without degrading the transmission performance of the POF cable having the core made of a PMMA resin. These resins also excel in adhesion to the bare POF and dimensional stability and are hence preferable in light of their availability for effective elimination of thermal shrinkage and pistoning which are problematic particularly when the POF cable is used for an in-vehicle LAN application. In addition, the POF cable is required to be battery fluid-resistant for in-vehicle communication applications. Nylon 11 and nylon 12 are preferable because of their especially good battery fluid-resistance among other nylon-based resins. It is noted that the adhesion between the bare POF and the light blocking coating layer in the present invention specifically means the adhesion between the light blocking coating layer and the protective coating layer provided around the bare POF, which will be described later.

The light blocking coating layer may be made of a single nylon-based resin or, alternatively, it may be made of a mixture of two or more nylon-based resins. If necessary, a polymer or a compound other than nylon-based resins may be added. The amount of other component(s) such as other polymer(s) or compound(s), when added, is preferably lower than 50% by mass. Addition of other component(s) of more than 50% by mass results in insufficient functioning of the nylon 11 and nylon 12. This may often cause reduction in battery-fluid resistance and thermal dimensional stability of the POF cable. The material used for forming the light blocking coating layer in the present invention is based on a nylon-based resin. The content of the nylon-based resin component (total amount of nylon 11 and nylon 12 if both are contained) is preferably 50% by mass or higher, more preferably 70% by mass or higher, and even more preferably 80% by mass or higher.

Typical nylon-based resins such as nylon 12 are industrially synthesized by polycondensation of amine and carboxylic acid. However, the polymerization of a nylon-based resin is accompanied by the establishment of a chemical equilibrium, so that the resultant polymer is always contaminated with a monomer and oligomer derived from a feed material for the nylon-based resin.

Investigations made by the present inventors have demonstrated that transmission losses in the POF are significantly increased for the POF cables wherein a primary coating layer made of nylon 11 or nylon 12 is provided in contact with the bare POF, when the cable is left in a high temperature environment at 105° C. for a long period of time.

The present inventors have analyzed a possible cause of this in depth. As a result, the inventors have ascertained that the residual monomers and oligomers derived from the feed material are responsible for the aforementioned increase in transmission loss in the POF, that is, they dissolve and diffuse into the bare POF from the primary and/or secondary coating layer(s) to cause the increase in transmission loss.

Furthermore, it has been found that significant increase in transmission loss is caused when the cladding outermost layer is a fluorine-containing olefin resin having a tetrafluoroethylene (TFE) unit and having a heat of crystal fusion of a certain value or higher.

As described above, the POF cables are required to have a good heat resistance. In particular, the POF cables that are intended to be used in an automobile are required not to cause any significant increase in transmission loss for a long period of time of longer than 5,000 hours, in an environment at 105° C.

In the POF cable according to the present invention, in order to achieve a higher long-term heat resistance of the POF cable, it is necessary that the light blocking coating layer is made of a material based on a nylon-based resin, and that the material contains the monomer and oligomer compounds derived from the nylon-based resin in an amount of 1.5% by mass or lower. The total content of the monomer and oligomer compounds is preferably 1.3% by mass or lower, more preferably 1.0% by mass or lower, even more preferably 0.8% by mass or lower. When the total content of the monomer and oligomer compounds in the light blocking coating layer falls within the aforementioned range, the protective coating layer can more fully block the monomer and oligomer compounds. If the total content of the monomer and oligomer compounds in the light blocking coating layer is too high, particularly higher than 1.5% by mass, the protective coating layer cannot sufficiently block the monomer and oligomer compounds. Even when the total content of the monomer and oligomer compounds in the light blocking layer is 0.1% by mass or higher, or even 0.5% by mass or higher, a sufficient blocking effect is provided by the protective layer of the present invention.

Examples of the monomer compounds in the nylon-based resin that forms the light blocking coating layer may include, as described above, an aliphatic diamino acid compound, an aliphatic dicarboxylic acid compound, and an aminoaliphatic carboxylic acid compound, which are a feed monomer of the nylon-based resin, and may also include 11-aminoundecanoic acid for nylon 11 and 12-aminododecanoic acid for nylon 12. In addition, examples of the monomer compounds may include by-products such as cyclic lactam compounds produced during the synthesis of the nylon-based resin, the cyclic lactam compounds having an endocyclic amide bond (—CONH—) obtained through intramolecular esterification of the molecular chain terminals of an aminocarboxylic acid compound. Specific examples of such cyclic lactam compounds include lauryl lactam for nylon 12.

Examples of the oligomer compounds in the nylon-based resin that forms the light blocking coating layer may include, as described above, compounds having molecular chain terminals that have an amino group (—NH$_2$) and/or a carboxyl group (—COOH), which are formed through intermolecular esterification of the molecular chain terminals of two or more molecules of the aforementioned feed monomers (e.g., aliphatic diamino acid compounds, aliphatic dicarboxylic acid compounds, and amino-aliphatic carboxylic acid compounds, as described above) in the course of the condensation polymerization for the production of the nylon-based resin; cyclic lactam compounds having an endocyclic amide bond (—CONH—) formed through further intramolecular esterification of the molecular chain terminals of the above compounds; compounds formed through intermolecular esterification of the above compounds; and compounds formed through an intramolecular/intermolecular secondary reaction (deamination reaction or decarboxylation reaction).

When the aforementioned monomers and oligomers are linear, the terminal amino group has high affinity with fluorine-containing olefin polymers, and the monomers and oligomers thus tend to stay in the cladding layer made of the fluorine-containing olefin polymer. This often causes reduction in transparency of the cladding material, which can result in significant deterioration of transmission characteristics of the POF cable. Meanwhile, when the aforementioned monomers and oligomers are cyclic lactam compounds, the monomers and oligomers tend to migrate to the vicinity of the interface on the inner layer side of the cladding layer (the core or the first cladding layer) to form particulate structures. As a result, more structural mismatch would happen at the core-cladding interface of the POF or a cladding-cladding interface if there are two or more cladding layers, with a tendency of significant deterioration of transmission characteristics of the POF cable.

Among the aforementioned oligomers, those having a lower molecular weight tend to dissolve and diffuse into the bare POF more easily. In particular, those having a molecular weight of 2,000 or lower have a remarkable tendency of it. Thus, the total content of the oligomer and monomer compounds having a molecular weight of 2,000 or lower is preferably 1.5% by mass or lower, more preferably, 1.3% by mass or lower, even more preferably 1.0% by mass or more, and particularly preferably 0.8% by mass or lower.

The amount of monomer and oligomer compounds contained in a nylon-based resin may be reduced by using any one of well-known techniques, such as a method for controlling the temperature, the moisture content, and the feed material/product concentration in the reaction system during the polycondensation of the nylon-based resin; a method in which the polymerized nylon-based resin is supplied to a hot-water extraction column and then subjected to hot-water countercurrent extraction; and a method for eliminating monomers from the melted polyamide resin in a high-temperature, high-vacuum environment.

Examples of the nylon-based resin containing the monomer and oligomer compounds as described above in a total amount of 1.3% by mass or lower may be Daiamide-L1600 and L1640 (trade name) for nylon 12, available from Daicel-Degussa Ltd., and Rilsan BMF-0 (trade name) for nylon 11, available from Arkema K. K.

[Protective Coating Layer]

A feature of the POF cable according to the present invention lies in the protective coating layer that is provided between the bare POF and the light blocking coating layer, in order to prevent the monomer compounds and/or the oligomer compounds from migrating into the bare POF, the compounds being derived from the feed material and contained in the nylon-based resin forming the aforementioned light blocking coating layer.

A resin that forms such a protective coating layer is preferably selected from polybutylene terephthalate-based resins, methyl (meth)acrylate-based resins, styrene-based resins, homopolymers of vinylidene fluoride, and copolymers including a polyethylene unit and a polyvinyl alcohol unit.

It is preferable that the melt flow index (MI) (defined as the amount of polymer (g) flowing in 10 minutes through a nozzle of 2 mm in diameter and 8 mm in length at a temperature of 210° C. under a load of 5 kgf (49 N)) of the resin that forms the protective coating layer be within a range of from 5 to 200. An excessively smaller MI may reduce the forming stability during the formation of the coating layer or may increase the pressure of the resin applied to the bare POF within a cross-head, which can possibly degrade the optical properties of the POF cable. On the other hand, an excessively larger MI tends to cause reduction in mechanical strength and degrade the uniformity of thickness of the protective coating layer.

Described now are various resins that can suitably be used for the protective coating layer of the POF cable according to the present invention.

The methyl (meth)acrylate-based resins for the aforementioned protective coating layer may be known resins such as, for example, a homopolymer of methyl (meth)acrylate (PMMA) or a copolymer of methyl (meth)acrylate and another monomer. The content of the methyl (meth)acrylate unit in the methyl (meth)acrylate-based resin is preferably 10% by mass or higher, more preferably 50% by mass or higher, and even more preferably 60% by mass or higher.

Examples of the copolymerization component of the methyl (meth)acrylate unit include ethyl (meth)acrylate, isopropyl (meth)acrylate, n-propyl (meth)acrylate, tert-butyl (meth)acrylate, n-butyl (meth)acrylate, and other alkyl (meth)acrylate, as well as fluorinated alkyl (meth)acrylate represented by the following general formula (9):

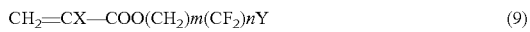

$$CH_2=CX-COO(CH_2)m(CF_2)nY \quad (9)$$

(wherein, X is a hydrogen atom or a methyl group, Y is a hydrogen atom or a fluorine atom, m is 1 or 2, n is an integer of from 1 to 12).

In the aforementioned general formula (9), when the structure of the fluorine-containing alkyl group becomes bulky, the polymerizability during polymerization and heat resistance of the copolymer decrease. The fluorine-containing alkyl group therefore preferably includes 1 to 12 carbon atoms.

Examples of the fluorinated alkyl (meth)acrylate represented by the aforementioned general formula (9) include fluorinated (meth)acrylates having a linear fluorinated alkyl group as a side chain such as, 2,2,2-trifluoroethyl (meth)acrylate (3FM), 2,2,3,3-tetrafluoropropyl (meth)acrylate (4FM), 2,2,3,3,3-pentafluoropropyl (meth)acrylate (5FM), 2,2,3,4,4,4-hexafluorobutyl (meth)acrylate (6FM), 1H,1H,5H-octafluoropentyl (meth)acrylate (8FM), 2-(perfluorobutyl)ethyl (meth)acrylate (9FM), 2-(perfluorohexyl)ethyl (meth)acrylate (13FM), 1H,1H,9H-hexadecafluorononyl (meth)acrylate (16FM), 2-(perfluorooctyl)ethyl (meth)acrylate (17FM), 1H,1H,11H-(icosafluoroundecyl) (meth)acrylate (20FM), and 2-(perfluorodecyl)ethyl (meth)acrylate (21 FM). Examples also include fluorinated (meth)acrylate having a branched fluorinated alkyl group as a side chain, such as hexafluoroneopentyl (meth)acrylate and hexafluoroisobutyl (meth)acrylate.

As the methyl (meth)acrylate-based resin, it is preferable to use a copolymer including 70 to 95% by mass of methyl (meth)acrylate unit and 5 to 30% by mass of alkyl (meth)acrylate unit (e.g., n-butyl (meth)acrylate and ethyl (meth)acrylate), from the viewpoint of the mechanical strength of the protective coating layer and of preventing the monomers and oligomers in the aforementioned nylon-based resin from dissolving and diffusing into the bare POF.

When the methyl (meth)acrylate-based resin includes the aforementioned fluorinated alkyl (meth)acrylate unit, it is preferable to use a copolymer including 10 to 95% by mass of methyl (meth)acrylate unit and 5 to 90% by mass of fluorinated alkyl (meth)acrylate unit, more preferably, 50 to 90% by mass of methyl (meth)acrylate unit and 10 to 50% by mass of fluorinated alkyl (meth)acrylate unit, and even more preferably, 60 to 90% by mass of methyl (meth)acrylate unit and 10 to 40% by mass of fluorinated alkyl (meth)acrylate unit, from the viewpoint of the mechanical strength of the protective coating layer and of preventing the monomers and oligomers in the aforementioned nylon-based resin from dissolving and diffusing into the bare POF.

Examples of the copolymerization component for a methyl (meth)acrylate unit other than those described above include a cycloalkyl (meth)acrylate, such as cyclohexyl (meth)acrylate, methylcyclohexyl (meth)acrylate, bornyl (meth)acrylate, isobornyl (meth)acrylate, and adamantyl (meth)acrylate; alicyclic (meth)acrylate having other alicyclic group as a side chain, such as tricyclodecanyl (meth)acrylate, (1-methyltricycloheptyl) (meth)acrylate, (1-methylhexacyclododecyl) (meth)acrylate, tricyclo[5.2.1.0$^{2,6}$]-deca-8-yl (meth)acrylate; aromatic (meth)acrylate, such as phenyl (meth)acrylate and benzyl (meth)acrylate; and an aromatic vinyl compound, including styrene, as well as α-substituted styrene, such as α-methylstyrene and α-ethylstyrene, and substituted styrene, such as fluorostyrene and methylstyrene.

The methyl (meth)acrylate-based resin that forms the protective coating layer preferably has a glass transition temperature of 70° C. or higher, more preferably 80° C. or higher, and even more preferably 90° C. or higher, as measured using differential scanning calorimeter (DSC). A lower glass transition temperature impairs the effect of blocking the migration of the monomer and/or oligomer compound(s) derived from the nylon-based resin in the light blocking coating layer, into the bare POF, which makes it difficult to improve the heat resistance of the POF cable.

A styrene-based resin that is primarily formed of styrene unit may be used as a component resin for the protective coating layer. The styrene-based resin as used herein refers to a resin that includes styrene unit in an amount of 80% by mass or higher. Examples thereof include a homopolymer of styrene, and a copolymer including 80% by mass or more of styrene unit. Atactic polystyrenes are preferable examples of the styrene homopolymer. The atactic polystyrenes are amorphous polymers having a glass transition temperature of around 100° C. It does not have an exact crystalline melting point, so that it can be directly coated over the bare POF having the PMMA core at a relatively low temperature (equal to or lower than 220° C.). On the other hand, isotactic polystyrenes and syndiotactic polystyrenes have a crystalline melting point of 240° C. or higher, so that a higher coating temperature (260° C. or higher) is required to coat the protective coating layer over the bare POF. A lower coating temperature is better in light of reducing an effect of coating on the bare POF. It should be noted that the various monomer components described in terms of the copolymerization components for the aforementioned methyl (meth)acrylate unit may be used as the copolymerization components for the styrene unit.

Such styrene-based resins may be selected from, for example, HF10, NF20, HT52, HF77, and 679 (trade name) available from PS Japan, as well as NIHON POLYSTY G120K, G440K, and G430 (trade name) available from Japan Polystyrene Inc.

When a vinylidene fluoride resin is used as the resin that forms the protective coating layer, it should be a resin made of a vinylidene fluoride (VdF) unit alone (i.e., homopolymer of vinylidene fluoride:PVDF). Well-known examples of commercially available vinylidene fluoride resins include a copolymer of 70 to 90% by mass of VdF unit and 10 to 30% by mass of TFE unit or HFP unit, and a copolymer of 15 to 50% by mass of VdF unit, 30 to 70% by mass of TFE unit, and 15 to 25% by mass of HFP unit. These materials are not enough to achieve sufficient improvement of the heat resistance of the POF cable, even if being used for the protective coating layer.

Such PVDF resins may be selected from, for example, KYNAR 710 and 720 (trade name) available from Arkema K. K., HYLAR-MP10 and MP20 (trade name) available from Ausimont, and a KF POLYMER (trade name) available from KUREHA CORPORATION.

The protective coating layer formed by using the aforementioned resin has a sufficient function of blocking the migration of the monomer and/or oligomer compound(s) derived from the nylon-based resin forming the light blocking coating layer into the bare POF. However, the POF cable with such the protective coating layer has a pull-out strength of lower than 30 N between the bare POF and light blocking coating layer. Therefore, these POF cables will find applications in which a part of the light blocking coating layer is removed from the POF cable at an end thereof and a plug is fixed thereto.

On the other hand, in some POF cables for automobile applications, a plug is directly fixed to the outer surface of the light blocking coating layer of the POF cable by using an adhesive or laser welding, without removing a part of the light blocking coating layer at an end thereof. In this case, a high adhesion (pull-out strength) is required between the bare POF and the light blocking coating layer.

Polybutylene terephthalate-based resins are preferable examples of a material for the protective coating layer that can exhibit such a high adhesion.

The term polybutylene terephthalate-based resin (hereinafter, abbreviated as "PBT resin") that forms the protective coating layer refers to a polymer primarily formed of an oligopoly-1,4-butylene terephthalate unit represented by the following general formula (10):

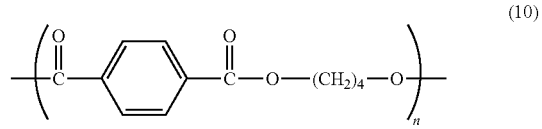

(10)

which is synthesized through polycondensation of bis(hydroxybutyl)terephthalate (BHT) or an oligomer thereof, obtained by means of esterification between 1,4-butanediol (tetramethylene glycol) and terephthalic acid or of ester exchange between 1,4-butanediol and dimethyl terephthalate.

Specific examples of the PBT resin suitable in the present invention include a PBT resin which is a block copolymer including: a hard segment unit (crystalline phase) containing the oligopoly-1,4-butylene terephthalate represented by the aforementioned general formula (10); and a soft segment unit (amorphous phase) containing a block unit represented by the following general formula (11), having an aliphatic polyether unit. The block unit is obtained through polycondensation between an aliphatic polyether having a molecular weight ranging from 200 to 5,000 (for example, poly(tetramethylene glycol) (PTMG)) and at least one of terephthalic acid, dimethyl terephthalate, diethyl terephthalate, dipropyl terephthalate, and dibutyl terephthalate.

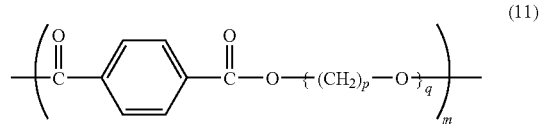

(11)

(wherein, p is an integer of from 4 to 12, and q is an integer of from 2 to 20)

Also, the examples include a PBT resin made of a block copolymer obtained including: a hard segment unit (crystalline phase) containing the oligopoly-1,4-butylene terephthalate represented by the aforementioned general formula (10); and the soft segment unit (amorphous phase) containing an aliphatic polyester block unit represented by the following general formula (12), such as poly(ε-caprolactone) (PCL) and polybutylene adipate (PBA):

(12)

Among the aforementioned PBT resins, particular preference is given to a PBT resin including, as the soft segment unit, the block unit including the aliphatic polyether unit represented by the aforementioned general formula (11), in terms of keeping the optical properties of the POF cable and the durability of the pull-out strength of the coating layer in a high temperature and high humidity environment. In particular, preference is given to a PBT resin which is a block copolymer including a hard segment part (A) (structure represented by the formula (10)) of oligopoly-1,4-butylene terephthalate and a soft segment part (B) (structure represented by the formula (11) wherein p=4) which is obtained through polycondensation of terephthalic acid or terephthalate and polytetramethylene glycol (PTMG) having a molecular weight ranging from 200 to 600, in terms of keeping the optical properties of the POF cable and the durability of the pull-out strength of the coating layer in a high temperature and high humidity environment.

Furthermore, in the aforementioned PBT resin, the ratio (a/b) between the total number of moles (a) of 1,4-butylene terephthalate unit contained in the hard segment part (A) and the total number of moles (b) of 1,4-butylene terephthalate unit contained in the soft segment part (B), is preferably in a range of 15/85 to 30/70. If this ratio (a/b) is too small, the main chain of the polymer includes a larger number of ether bond units. This often makes the PBT resin more susceptible to degradation due to hydrolysis in a high temperature and high humidity environment. In addition, the increased amount of the soft segment renders the material itself soft and easily deformable, reducing the pull-out strength, further impairing the effect of blocking the monomers and oligomers derived from the nylon-based resin forming the light blocking coating layer. On the other hand, if this ratio (a/b) is too large, the crystalline melting point rises because of the increased amount of the hard segment. This tends to reduce coating stability of the protective coating layer and reduce thermal adhesiveness between the bare POF and the protective coating layer and/or between the protective coating layer and the light blocking coating layer, during the coating process. The ratio (a/b) is preferably not smaller than 18/82, and more preferably not smaller than 22/78. The ratio is preferably not larger than 27/73, and more preferably not larger than 25/75.

Furthermore, the aforementioned PBT resin preferably has a crystalline melting point in a range of 155° C. to 205° C. An excessively low crystalline melting point would possibly result in insufficient functioning of preventing the monomers or oligomers from migrating into the bare POF. On the other hand, an excessively high crystalline melting point would possibly reduce the forming stability of a protective coating layer when it is provided on the outer surface of the bare POF by using a coextrusion coating machine as described below. The crystalline melting point of the PBT resin is more preferably equal to or lower than 195° C., and even more preferably equal to or lower than 185° C. In addition, the crystalline melting point of the PBT resin is more preferably not lower than 165° C., and even more preferably not lower than 175° C.

In addition, the aforementioned PBT resin preferably has a Shore D hardness in a range of 38 to 65, as measured according to JIS K7215 set standards. A Shore D hardness beyond the lower limit tends to increase flowability at a high temperature, and therefore tends to reduce coating stability and render the material itself soft and easily deformable. This reduces the pull-out strength between the bare POF and the light blocking coating layer. A Shore D hardness beyond the higher limit reduces thermal adhesiveness between the bare POF and the protective coating layer and/or between the protective coating layer and the light blocking coating layer, during the coating process. As a result, the pull-out strength between the bare POF and the light blocking coating layer is reduced. The Shore D hardness is more preferably equal to or higher than 40, and even more preferably equal to or higher than 45. In addition, the Shore D hardness is more preferably not higher than 60, and even more preferably not higher than 55.

The crystalline melting point and the Shore D hardness of the PBT resin may be adjusted by means of changing the component ratio between the aforementioned hard segment unit and the aforementioned soft segment unit, the molecular weight of each component, or the molecular weight of the whole polymer.

The PBT resin may be selected from, for example, Hytrel 2551, 2474, 4047, 4057, and 4767 (trade name) available from DuPont-Toray Co., LTD., DYURANEX 400LP (trade name) available from Polyplastics Co., Ltd., NUBELAN 4400 Series (trade name) available from Teijin Chemicals Ltd., PELPRENE S type and P type (P150M) (trade name) available from TOYOBO CO., LTD., and PRIMALLOY B Series (trade name) available from Mitsubishi Chemical Corporation.

By using the PBT resin as described above for the protective coating layer, it is possible to provide a pull-out strength of at least 30 N between the bare POF and the light blocking coating layer, which contributes to further suppression of pistoning when the POF cable is placed in a high temperature environment. When a plug is fixed to the POF cable at one end thereof and the cable is connected to another instrument via the plug, a possible mechanical action such as vibration may impart an excessive force on the bare POF, which can break the bare POF if the adhesion between the bare POF and the light blocking coating layer is poor. Such breakage can also be avoided.

Besides, examples of the resin forming the protective coating layer that can adhere strongly include, a copolymer including a polyethylene unit and a polyvinyl alcohol unit (hereinafter, abbreviated as "EVAL copolymer"). The EVAL copolymer is preferably a copolymer including the ethylene unit and the vinyl alcohol unit at a ratio of 20 to 70% by mole of ethylene unit and 30 to 80% by mole of vinyl alcohol unit. Particular preference is given to a copolymer having a crystalline melting point of 195° C. or lower, more preferably, 180° C. or lower, and a melt flow index of 25 to 80 g/10 minutes when measured at 210° C. under a load of 5 kgf (49 N), because it can provide excellent effects of preventing the monomers and oligomers in the aforementioned nylon-based resin from dissolving and diffusing into the bare POF and of forming the POF cable in stable condition.

Furthermore, the EVAL copolymer had good oxygen barrier properties, which helps to prevent any increase in transmission losses due to oxidation degradation of the bare POF in a high temperature environment.

Examples of the EVAL copolymer include EVAL E105, G156, F104, FP104, EP105, and EU105 (trade name) available from KURARAY CO., LTD.

The resins as described above can be given as the examples of preferable materials for the protective coating layer of the POF cable according to the present invention. However, the aforementioned protective coating layer may contain a light blocking agent such as carbon black in order to prevent incidence of ambient light to the bare POF, as in the case of the light blocking coating layer. The light blocking agent may be contained in an amount of, for example, 0.1% by mass or more in order to achieve sufficient light blocking effect, as long as the intended effect of the protective coating layer is not deteriorated.

By using the PBT resin as described above for the protective coating layer, it is possible to provide a pull-out strength of at least 30 N between the bare POF and the light blocking coating layer, which contributes to further suppression of pistoning when the POF cable is placed in a high temperature environment. When a plug is fixed to the POF cable at one end thereof and the cable is connected to another instrument via the plug, a possible mechanical action such as vibration may impart an excessive force on the bare POF, which can break the bare POF if the adhesion between the bare POF and the light blocking coating layer is poor. Such breakage can also be avoided.

[Functional Coating Layer]

The POF cable according to the present invention has a feature that a coating layer made of a nylon-based resin composition having a crystalline melting point within a certain range is provided over the outer surface of the light blocking coating layer to suppress increase in Rayleigh scattering when the POF cable is used in a high temperature environment, or another feature that a functional coating layer made of a nylon-based resin composition having an oxygen permeability within a certain range is provided to suppress increase in electronic transition absorption when the POF cable is used in a high temperature environment.

The functional coating layers can be colored in order to render the POF cable more distinguishable. Addition of flame retardant to the functional coating layers can impart the flame resistance to the POF cable. Furthermore, since the functional coating layers are made of a nylon-based resin composition having a certain crystalline melting point, reduction in heat resistance due to the monomers and oligomers derived from the nylon-based resin can be reduced. In addition, it is possible to improve mechanical protection properties of the coating layers in a high temperature environment.

The nylon-based resin composition that forms the functional coating layers refers to a resin composition based on a nylon-based resin, that is, a resin composition containing not less than 50% by mass of nylon-based resin. The content of the nylon-based resin is preferably 60% by mass or higher, and more preferably 70% by mass or higher. With the nylon-based resin contained in an amount of 50% by mass or higher, preferably 60% by mass or higher, more preferably 70% by mass or higher, it is possible to suppress the aforementioned reduction in heat resistance, and to provide a POF cable having sufficient heat resistant dimensional stability, mechanical strength, and chemical resistance. A resin to be mixed with the nylon-based resin may be any thermoplastic resin that have been commonly used as the coating material for bare POFs, as long as it does not deteriorate the properties required for the functional coating layer in the present invention.

As described above, the polymerization of a nylon-based resin is accompanied by the establishment of a chemical equilibrium, so that the resultant polymer is always contaminated with a monomer or oligomer derived from a feed material for the nylon-based resin. According to the results of considerations made by the present inventors, it has been found that, when the POF cable having a light blocking coating layer around which a certain nylon-based resin is provided as an functional coating layer is placed in a high temperature environment at 100° C. or higher for a long period of time, the residual monomers and oligomers in the functional coating layer permeate through the light blocking coating layer and the protective coating layer and are dissolved and diffused into the bare POF, which increases Rayleigh scattering.

On the other hand, the POF cable (primary coated cable) having the aforementioned bare POF around which the protective coating layer and the light blocking coating layer are formed is stable in an environment at 105° C. for a long period of time, in terms only of the transmission loss at or around the wavelength of 650 nm. However, the POF cable is suffered from significant transmission loss in a wavelength region of shorter than 600 nm. Therefore, it was difficult to use this cable for signal transmission in a wavelength region of 500 to 600 nm. According to the results of considerations made by the present inventors, it has been found that oxygen permeates the light blocking coating layer and the protective coating layer and is dissolved and diffused into the bare POF, which causes increase in electronic transition absorption due to oxidation degradation.

More specifically, it has been found that the increase in transmission loss in the POF cable in a high temperature environment is caused by the aforementioned increase in Rayleigh scattering and electronic transition absorption.

Taking this into consideration, the present inventors have made tremendous studies and investigations about a nylon-based resin composition that does not impair the heat resistance of the POF cable (primary coated cable) even when used in the functional coating layer. As a result, it has been found that the increase in transmission loss at a wavelength of 650 nm can be suppressed in a high temperature environment of 105° C., by using a nylon-based resin composition having a crystalline melting point that falls within a certain range. In addition, it has also been found that the increase in transmission loss at a wavelength of 600 nm or lower can be suppressed significantly without degrading the transmission properties at a wavelength of 650 nm in a high temperature environment of 105° C., by using a nylon-based resin composition having a crystalline melting point and an oxygen permeability that fall within certain ranges, respectively.

More specifically, the present inventors have found that, as a first solution, the problem associated with the Rayleigh scattering due to the residual monomers and oligomers in the functional coating layer can be solved by using, as a material for the functional coating layer, a nylon-based resin composition having a crystalline melting point within a range of 215° C. to 280° C.

Nylon resins are known to have a temperature called Brill transition temperature. In this Brill transition temperature region, nylon-based resins show a phenomenon called Brill transition, that is to say, the twisting motion is enhanced around the methylene-amide bonds of the polymer main chain. Although the intermolecular hydrogen bonds of the amide group are kept alive, significant motion occurs that is associated with change in conformation of the methylene segments and regular distortion (Polymer, 44 (2003), p. 6407-6417).

Brill transition occurs in a temperature region spanning over 40° C. The maximum peak temperature is referred to as the Brill transition temperature. It is known that the Brill transition temperature for nylon 12 (melting point at about 180° C.) is around 140 to 150° C., and the Brill transition temperature for nylon 6-12 (melting point at about 155 to 160° C.) is around 120 to 130° C. According to the investigations by the present inventors, it has been found that, when a nylon-based resin composition containing nylon 12 or nylon 6-12 is used as a material for the functional coating layer, the residual monomers and oligomers derived from the nylon resin contained in nylon 12 or nylon 6-12 migrate into the bare POF when the POF cable is left in a 100-degrees-Celsius environment for a long period of time, which significantly reduces optical transmission performance. Taking the above into consideration, the present inventors considered that the residual monomers and oligomers tended to bleed out because each of nylon 12 and nylon 6-12 had the Brill transition temperature at around 120 to 145° C., and that this problem could be solved by using a nylon-based resin composition having a higher Brill transition temperature as the material of the functional coating layer.

However, Brill transition temperature is not an index value that can be measured easily because measurement thereof requires a special device. Therefore, the present inventors have examined the possibility of using, as an index value that can be measured relatively easily, a crystalline melting temperature (crystalline melting point) that is measured by using differential scanning calorimeter (DSC). As a result, it has been found that the POF cable will have a sufficient durability by using a nylon-based resin having a crystalline melting point within a certain temperature range, as the functional coating layer. The present invention has thus been completed.

More specifically, when the nylon-based resin composition that forms the functional coating layer has a crystalline melting point below 215° C., the protective coating layer is possibly insufficient to prevent the residual monomers and oligomers derived from the nylon-based resin material used to form the functional coating layer from bleeding out the functional coating layer and migrating into the bare POF when the POF cable is placed in an environment of 100° C. or higher for a long period of time, even if the protective coating layer is provided. On the other hand, when the crystalline melting point is higher than 280° C., it is necessary to rise the temperature that is used to coat the functional coating layer. When this temperature is especially 300° C. or higher, the bare POF having a core made of a copolymer based on PMMA and MMA, and a light blocking coating layer made of a nylon-based resin having a relatively low melting point, such as nylon 11 and nylon 12, tend to be deformed by heat, which can possibly degrade the optical properties and thermal shrinkage properties of the POF cable. The crystalline melting point of the nylon-based resin composition that forms the functional coating layer is preferably equal to or higher than 225° C., more preferably equal to or higher than 235° C., and even more preferably equal to or higher than 260° C. In addition, the crystalline melting point is preferably not higher than 275° C., and more preferably not higher than 270° C.

A nylon-based resin that is contained in a nylon-based resin composition having a crystalline melting point in a range of 215° C. to 280° C. may be one selected from nylon 6 (homopolymer), nylon 66 (homopolymer), nylon 610 (copolymer), and nylon 6/66 (copolymer), or a compound of two or more of them. Among them, nylon 6 (having a melting point of 225° C., the maximum Bril temperature of around 195° C., see Polymer, 42 (2001), pp. 10119 to 10132), and nylon 66 (having a melting point of 265° C., the maximum Bril temperature of around 150 to 160° C., see Polymer, 42 (2001), pp. 10119 to 10132) are particularly preferable because inexpensive products are available for their forming materials.

On the other hand, as a second solution, the present inventors have found that the problems associated with electronic transition absorption due to oxidation degradation by oxygen can be solved by using, as the nylon-based resin composition for the functional coating layer, a nylon-based resin composition having a crystalline melting point in a range of 240 to 280° C., as measured using differential scanning calorimetry (DSC), and having an oxygen transmission rate $P(cm^3 \cdot cm/(cm^2 \cdot sec \cdot Pa))$ as measured using a method defined in ISO 14663-2:1999 (Annex C) at a temperature T(K) which satisfies the following formula (A):

$$P < 8 \times 10^{-2} \times \exp(-5600/T) \tag{A}$$

The range of the temperature T(K) which meets the Formula (A) is preferably within a range of 283 K (10° C.) to 333 K (60° C.). It is known that the oxygen transmission rate against temperature for polymer materials shows good agreement with the Arrhenius model. In addition, the Arrhenius plot changes near the glass transition temperature. The nylon 66 resin composition of the present invention has a glass transition temperature of from 55 to 65° C. Accordingly, the upper limit of the temperature T(K) is preferably at 333 K (60° C.). On the other hand, the lower limit is preferably at 283 K (10° C.) from the viewpoint of the measurement accuracy for the oxygen transmission rate.

In particular, according to the investigations by the present inventors, it is possible to improve the heat resistance (in particular, at a wavelength of 600 nm or lower) of the POF cable at 105° C. when the nylon 66 resin composition of the functional coating layer has an oxygen transmission rate that is smaller than a value obtained by substituting T=296 K (23° C.) into the Formula (A) as well as the Formulas (B), (C), and (D) as described below.

By using a nylon-based resin composition that forms the functional coating layer having a crystalline melting point which is equal to or higher than 240 degrees, the heat resistance is improved more (in particular, at a wavelength of 600 nm or lower) at 105° C. when the POF cable is placed in an environment of 105° C. for a long period of time. On the other hand, when the crystalline melting point is higher than 280° C., it is necessary to rise the temperature that is used to coat the functional coating layer. The bare POF having a core made of a copolymer based on PMMA and MMA, and a light blocking coating layer made of a nylon-based resin having a relatively low melting point, such as nylon 11 and nylon 12, tend to be deformed by heat (in particular, when the temperature is 300° C. or higher), which can possibly degrade the optical properties and thermal shrinkage properties of the POF cable. Accordingly, the crystalline melting point of the nylon-based resin composition that forms the functional coating layer is preferably equal to or higher than 240° C., more preferably equal to or higher than 250° C., and even more preferably equal to or higher than 260° C. In addition, this crystalline melting point is preferably not higher than 280° C., more preferably not higher than 275° C., and even more preferably not higher than 270° C.

Specific examples of the nylon-based resin contained in the nylon-based resin composition having a crystalline melting point in a range of 240° C. to 280° C. include nylon 66 (homopolymer), or a nylon-based resin composition based on nylon 66 as described below. Nylon 66 has the crystalline melting point of 265° C., the oxygen transmission rate at 23° C. of P=ca. $3 \times 10^{-10}$ to $4 \times 10^{-10}$ $cm^3 \cdot cm/(cm^2 \cdot sec \cdot Pa)$, and the oxygen transmission rate at 105° C. of P=ca. $1 \times 10^{-8}$ to $2\times10^{-8}$ cm³·cm/(cm²·sec·Pa). The term "based on" as used herein means that nylon 66 is contained in an amount of 50% by mass or higher, preferably 60% by mass or higher, and more preferably 70% by mass or higher, relative to the 100% by mass in total of the entire nylon-based resin composition.

The method with which nylon 6 to be used for the functional coating layer is produced is not specifically limited. Industrially, it may be produced in a following process. ε-caprolactam is melted in a melter and is passed into a control tank where a small amount of water and an additive such as a polymerization modifier, if appropriate, is/are added. Thus, the ring opens by hydrolytic polymerization of ε-caprolactam, which produces 6-aminocaproic acid. The reaction product in a molten state is subjected to condensation polymerization, and then the obtained polymer is supplied to a hot-water extraction column where lactam monomers and oligomers contained in the polymer are subjected to hot-water counter-current extraction. Subsequently, water is removed (to dryness) in a vacuum or inert gas atmosphere at around 100° C.

The method with which nylon 66 to be used for the functional coating layer is produced is not specifically limited. Industrially, it is produced in a following process. A polymerization modifier is added to a mixed solution of hexamethylene diamine and adipic acid (AH salt solution), and then a polymer is produced by polycondensation reaction in a pressurized polymerization reactor at a high temperature. Thereafter, water vapor and moisture in a system are removed by using an appropriate method.

The POF cable of the present invention can exhibit sufficient heat resistance as long as the total content of the monomer and oligomer compounds derived from the nylon-based resin contained in the functional coating layer is within a level similar to the content in typical industrial nylon-based resins. The total content of the monomer and oligomer compounds in the functional coating layer is preferably within a range of not more than 15% by mass, more preferably within a range of not more than 10% by mass, and even more preferably within a range of not more than 5.0% by mass. The lower limit of the total amount of these compounds is not specifically limited. When the total content of the monomer and oligomer compounds in the functional coating layer is within the aforementioned range, a resultant POF cable will have better heat resistance. For example, a POF cable having sufficient heat resistance can be obtained even when the total content of the monomer and oligomer compounds in the functional coating layer is not less than 0.1% by mass, not less than 0.5% by mass, and even not less than 1% by mass.

It should be noted that the monomer and oligomer compounds derived from a nylon-based resin are as defined in the description about the light blocking coating layer. More specifically, the monomer and the oligomer refer to ε-caprolactam, and a cyclic oligomer and a chain oligomer of a tetramer or a lower-order multimer of ε-caprolactam, respectively, for nylon 6. The monomer and the oligomer refer to hexamethylene diamine and adipic acid, a cyclic oligomer and a chain oligomer of a tetramer or a lower-order multimer of a condensation compound made of hexamethylene diamine and adipic acid, respectively.

Examples of nylon 6 include UBE nylon 1011B, 1015B, 1022B, and 1018SE (trade name) available from UBE INDUSTRIES, LTD., Amilan CM1007, CM1017, CM1021, CM1026, and CM1014 (trade name) available from Toray Industries, Inc., Ultramid 8200, 8202, 8270, B27, B3K, B3S, and 8232G (trade name) available from BASF, and GRILON BS Series, BZ Series, and BRZ Series (trade name) available from EMS.

Examples of nylon 66 include UBE nylon 2015B, 2020B, and 2026B (trade name) available from UBE INDUSTRIES, LTD., Amilan CM3007, CM3001-N, CM3006, CM3301, CM3304, and CM3004 (trade name) available from Toray Industries, Inc., Leona 1200S, 1300S, 1500, and 1700 (trade name) available from Asahi Kasei Corporation, Ultramid 1000, 1003, A3, N322, and A3X2G5 (trade name) available from BASF, GRILON AS Series, AZ Series, AR, and AT Series (trade name) available from EMS, and Zytel 101, 103, 42A, and 408 (trade name) available from DuPont.

Examples of nylon 610 include Amilan CM2001, and CM2006 (trade name) available from Toray Industries, Inc. Examples of nylon 6/66 include Ultramid C3U, C33, and C40 (trade name) available from BASF.

The value of transmission loss, at a wavelength of 650 nm, of the POF cable according to the aforementioned first solution is stable in a high temperature environment of 105° C. for a long period of time.

After continuous investigations about nylon-based resin composition in the functional coating layer in order to suppress the increase in transmission loss at a wavelength of 600 nm or lower, the present inventors have found that the increase in transmission loss in the POF cable can be suppressed significantly in a short-wavelength region of lower than 600 nm, without degrading transmission properties at 650 nm, in a high temperature environment of 105° C., by using a nylon-based resin composition having an oxygen permeability of within a certain specific range, as the second solution.

Used as the nylon-based resin composition that forms the functional coating layer is the one of which oxygen transmission rate P(cm³·cm/(cm²·sec·Pa)) in the absolute dry state at temperature T(K) as measured using a method defined in ISO 14663-2:1999 (Annex C) satisfies the following formula (A):

$$P<8\times10^{-2}\times\exp(-5600/T) \quad (A).$$

With the value of the oxygen transmission rate (P) larger than the right-hand side value of the aforementioned Formula (A), the oxygen in an environment where the POF is placed passes through the light blocking coating layer and the protective coating layer and dissolves and diffuses into the bare POF when the POF cable is placed in a high temperature environment of 105° C. for a long period of time, which increases the possibility for the bare POF to be affected by the oxidation degradation. As a result, the electronic transition absorption increases in the core and cladding of the bare POF, which increases transmission loss at a wavelength of 600 nm or lower. The value of the oxygen transmission rate (P) which satisfies the aforementioned Formula (A) can contributes to suppression of the increase in transmission loss in the POF at a wavelength of 600 nm or lower.

The oxygen transmission rate (P) of the nylon-based resin composition that forms the functional coating layer preferably satisfies, from the viewpoint of suppression of increase in transmission loss at a wavelength of 600 nm or lower, the following formula (B):

$$P<8\times10^{-2}\times\exp(-5800/T) \quad (B),$$

more preferably the following formula (C):

$$P<8\times10^{-2}\times\exp(-6000/T) \quad (C),$$

and even more preferably the following formula (D):

$$P<8\times10^{-2}\times\exp(-6300/T) \quad (D).$$

In order to lower the oxygen transmission rate of the nylon-based resin composition, it is preferable to use a method of controlling the crystallinity within a certain range, or a method of controlling the spherulite size within a certain range.

The nylon-based resin composition that forms the functional coating layer preferably has a crystallinity in a range of 30% to 55%. Controlling the crystallinity within this range facilitates production of a nylon-based resin composition having a desired oxygen transmission rate. A lower crystallinity can bring about crystallization after the treatment of the POF cable at a high temperature, which produces change in dimensions of the POF cable or results in non-desired oxygen transmission rate. Consequently, it becomes difficult to suppress the increase in transmission loss at a wavelength of 600 nm or lower when the POF cable is placed in an environment of 105° C. for a long period of time. A larger crystallinity, on the other hand, increases a flexural modulus of the POF cable. A resultant POF cable may be much more difficult to be handled, or may get buckled more easily after the POF cable is wound around a bobbin and stored for a long period of time. The lower limit of the range of the crystallinity of the nylon-based resin composition that forms the functional coating layer is preferably not lower than 35%, and the upper limit is preferably not higher than 50%, and more preferably not higher than 45%.

It should be noted that the crystallinity (X) is calculated from a density according to the following general formula:

Crystallinity$(X) = (ds-da)/(dc-da)$, (wherein da is a density of an amorphous substance, dc is a density of a crystalline substance, and ds is a density of a sample).

In the present invention, the nylon-based resin composition that forms the functional coating layer preferably has an average diameter in spherulite size in a range of 0.01 μm to 40 μm, as observed through a microscope.

The spherulite size as used herein is a value obtained by the method which include cutting very thin sections from the functional coating layer of the POF cable, observing them through a microscope, taking photographs of spherulites, and analyzing the photographs by using an image analyzer to calculate a number average of spherulite diameters.

Spherulites which are not large enough tend to cause degradation of the mechanical strength (in particular, tension strength) of the POF cable. Too large spherulites cannot provide a desired oxygen transmission rate, so that the transmission loss at a wavelength of 600 nm lower can be increased, and also, too large spherulites can degrade the heat resistant dimensional stability of the POF cable, when the POF cable is placed in an environment of 105° C. for a long period of time. The lower limit of a preferable range of this spherulite size (average diameter) is preferably not lower than 1.0 μm, more preferably not lower than 5 μm. The upper limit is preferably not higher than 30 μm, more preferably not higher than 20 μm, and even more preferably not higher than 10 μm.

The crystallinity and the spherulite size of nylon 66 can be controlled within a certain range, for example, by means of controlling a formation temperature and a cooling rate within an appropriate range during manufacturing. However, it is difficult to control the crystallinity and the spherulite size at their desired levels under the conditions in which the POF cables can be manufactured without any performance losses. Now, in the POF cable according to the present invention, the nylon-based resin composition that forms the functional coating layer preferably contains a crystallization accelerator (nucleating agent) and a certain flame retardant that will be described later, with which the spherulite size can be reduced or the crystallinity can be increased.

The crystallization accelerator is preferably a compound that does not migrate into the bare POF and thus does not affect the optical properties of the POF cable. Examples of such a crystallization accelerator include, but not limited to, metal oxides such as magnesium oxides, aluminum oxides, zinc oxides, copper oxides, and iron oxides, inorganic particles of, for example, talc, silica, graphite, and silicon carbide, and high-melting point polyamides such as nylon 6T, and nylon 66/6T.

The content of the crystallization accelerator in the nylon-based resin composition that forms the functional coating layer may be determined within any range as long as the heat resistance of the POF cable at 105° C. is not deteriorated, but it is preferably within a range of 0.01 to 10% by mass, more preferably within a range of 0.05 to 5% by mass, and even more preferably within a range of 0.3 to 3% by mass, relative to 100% by mass of the nylon-based resin composition.

[Colorant for Functional Coating Layer]

In the POF cable according to the present invention, the functional coating layer preferably contains an inorganic chromatic pigment as a colorant for identification.

Organic dyes and inorganic pigments are typically used as a colorant for thermoplastic resin. However, according to the investigations by the present inventors, it has been revealed that, when a POF cable having a functional coating layer containing an organic dye is placed in a high temperature environment of 100° C. or higher for a long period of time, the organic dye passes through the light blocking coating layer and the protective coating layer and migrates into the bare POF, causing significant increase in transmission loss. On the other hand, it has been demonstrated that inorganic pigments do not exhibit such migration, and that the transmission loss is not affected even when the POF cable is placed in a high temperature environment of 100° C. or higher for a long period of time.

Furthermore, the oxygen permeability can be controlled by means of adding a certain colorant or adding a combination of a flame retardant which will be described below and a certain colorant in order to increase the crystallinity or reduce the spherulite size of the functional coating layer when a nylon 66 resin composition is used for a material of the functional coating layer. The present inventors have also demonstrated that this can contribute to stable maintenance of the transmission property at a wavelength of 650 nm and to significant suppression of the increase in transmission loss at a wavelength of 600 nm or lower, when the POF cable is used in a high temperature environment.

The content of the inorganic chromatic pigment with respect of 100% by mass in total of the entire nylon-based resin composition that forms the functional coating layer, is preferably within a range of 0.1% to 10% by mass. If the content of the inorganic pigment is not high enough, the inorganic pigment only results in insufficient coloring, making it difficult to produce bright colors. On the other hand, an excessively higher content reduces the mechanical strength of a coating material, which can possibly degrade abrasion resistance and scratch resistance thereof. The content of the inorganic pigment is preferably 0.5% by mass or higher, more preferably 1% by mass or higher, and even more preferably 3% by mass or higher. In addition, the content of the inorganic pigment is preferably not higher than 7% by mass, and more preferably not higher than 5% by mass.

The inorganic pigments may be, for example, rare metal compounds containing at least one of cerium or lanthanum when green is required, Ultramarine Blue and Iron Blue for blue, yellow iron oxides for yellow, Bengal red (ferric oxide) for red, titanium oxides, talc, and kaolin for white, and carbon black and black iron oxides for black. Among them, at least one colorant selected from the Ultramarine Blue, the Iron Blue, the iron oxides, the Bengal red, the titanium oxide, the rare metal compounds, and the carbon black can suitably be used.

[Flame Retardant for Functional Coating Layer]

When the POF cable is required to have flame resistance, a flame retardant may be added to the functional coating layer. In the POF cable according to the present invention, it is preferable that the bare POF made of a PMMA resin, the protective coating layer, and the light blocking coating layer do not contain any flame retardant. In addition, it is also preferable that the functional coating layer can provide a flame resisting function because the material of each coating layer is not self-extinguishing.

Well-known examples of typical flame retardants for nylon-based resins include phosphor compounds, brominated compounds, chlorine compounds, triazine compounds, and hydrated metal compounds, which are utilized in various applications.

However, according to the investigations by the present inventors, a certain flame retardant passes through the light blocking coating layer and the protective coating layer and migrates into the bare POF to cause significant increase in transmission loss or degrade the coating material itself when the POF cable is placed in a high temperature environment of 100° C. or higher for a long period of time. Alternatively, a certain flame retardant should be contained in a significantly large amount to provide sufficient flame resistance, which significantly reduces the mechanical strength of the coating layer.

The present inventors have searched for and examined about a flame retardant that can solve the aforementioned problems. As a result, we have found that a melamine cyanurate or a large-molecular weight brominated flame retardant alone, or alternatively, a combination of a large-molecular weight brominated flame retardant and antimony oxide is the best choice for the POF cable according to the present invention when used in an amount within a certain range relative to the nylon-based resin.

More specifically, melamine cyanurate is preferably contained in an amount ranging from 3% to 40% by mass, relative to 100% by mass in total of the nylon-based resin composition that forms the functional coating layer. The content lower than the aforementioned range often results in failure of improvement of a desired flame resistance. The content higher than the aforementioned range tends to decrease flowability of the resin, increase the flexural modulus of the POF to make it awkward to handle, or reduce smoothness of the POF cable surface. The content is preferably equal to or higher than 5% by mass, and more preferably equal to or higher than 10% by mass. In addition, the content is preferably not higher than 30% by mass, and more preferably not higher than 20% by mass.

If an extrusion molding is made at a temperature of 270° C. or higher as in the case where the nylon 66 resin is used, a brominated flame retardant is a better choice because melamine cyanurate may be thermally decomposed.

It is preferable that a brominated flame retardant be contained in such an amount that 1.5 to 30% by mass of bromine atoms and 0 to 20% by mass of antimony oxide are contained in the resin composition, relative to 100% by mass in total of the nylon-based resin composition that forms the functional coating layer. If the content of the bromine atoms is not enough, it is difficult to impart sufficient flame resistance to the POF cable. If too many bromine atoms are contained, it is possible that the abrasion resistance and the mechanical strength of the POF cable are degraded or the flexural modulus of the POF cable becomes too high, making it awkward to handle. The content of the bromine atoms is preferably equal to or higher than 5% by mass, more preferably equal to or higher than 8% by mass, and even more preferably equal to or higher than 10% by mass. In addition, the content of the bromine atoms preferably not higher than 25% by mass, more preferably not higher than 20% by mass, and even more preferably not higher than 15% by mass.

The brominated flame retardant can improve the flame resistance when used alone. However, a combination with antimony oxide can further enhance the flame resistance. The antimony oxide does not migrate into the bare POF even when the POF cable is placed in a high temperature environment for a long period of time, so that it is suitable for the POF cable according to the present invention. Examples of the antimony oxide include antimony trioxide and antimony pentoxide, and antimony pentoxide is preferably because it is less expensive. As to the content of the antimony oxide, it is preferable that 20% by mass or less of antimony oxide be added to the brominated flame retardant having a bromine atom content of 1.5 to 30% by mass, relative to 100% by mass in total of the nylon-based resin composition that forms the functional coating layer. If the content of the antimony oxide is not low enough, it can possibly degrade abrasion resistance and scratch resistance of the POF cable, or increase the flexural modulus of the POF cable to make it awkward to handle. The content of the antimony oxide is preferably not higher than 15% by mass, and more preferably not higher than 10% by mass. In addition, when a brominated flame retardant is combined with an antimony oxide, the mass ratio (brominated flame retardant/antimony oxide) of the brominated flame retardant and the antimony oxide is preferably within a range of 1/1 to 4/1. If this mass ratio is too high, addition of the antimony oxide does not produce sufficient synergic effect of enhancing flame resistant property. If this mass ratio is too low, this means that an excessive amount of antimony oxide is added, the flame resistance is not improved significantly, while the abrasion resistance and the mechanical strength of the POF cable are degraded. Alternatively, the flexural modulus of the POF cable is possibly be increased. The mass ratio of the brominated flame retardant and the antimony oxide is preferably 1.5/1 or higher, and more preferably 2/1 or higher. In addition, the mass ratio is preferably not higher than 3/1, and more preferably not higher than 2.5/1.

Examples of the antimony trioxide include PATOX Series (e.g., CZ) and STOX Series (trade name) available from Nihon Seiko Co., Ltd., and FCP AT-3 and AT-3CN (trade name) available from SUZUHIRO CHEMICAL CO., LTD. Examples of the antimony pentoxide include San-Epok (trade name) available from NISSAN CHEMICAL INDUSTRIES, LTD.

In the POF cable according to the present invention, it is preferable to use a compound based on at least one of nylon 6 and nylon 66 as the nylon-based resin composition that forms the functional coating layer. For nylon 6, it is preferable to use melamine cyanurate or a large-molecular weight brominated flame retardant alone or a combination of a large-molecular weight brominated flame retardant and antimony oxide. For nylon 66, it is preferable to use a large-molecular weight brominated flame retardant alone or a combination of a large-molecular weight brominated flame retardant and antimony oxide.

In addition, the aforementioned brominated flame retardant used in the POF cable according to the present invention is preferably the one having a 1% mass loss temperature of 300° C. or higher as measured using TG/DAT. As described above, in the POF cable according to the present invention, the crystalline melting point of the nylon-based resin composition that forms the functional coating layer is preferably in a range of 215° C. to 280° C., and particular preference is given to a nylon 6 resin (melting point: about 225° C.) or a nylon 66 resin (melting point: about 265° C.). However, a forming temperature for such nylon-based resin compositions is usually 230° C. or higher (240° C. or higher for nylon 6 resins, and 280° C. or higher for nylon 66 resins). Under such a forming temperature, 1% mass loss temperature of lower than 300° C. would possibly cause thermal decomposition of the aforementioned brominated flame retardant, which can lead to degradation of the flame resistance of the POF cable or degradation of the heat resistance of the POF cable.

In addition, from the viewpoint of good dispersibility to the nylon-based resins, the brominated flame retardant used in the POF cable according to the present invention is preferably at least one selected from tetrabromobisphenol A derivative compounds, brominated polystyrene, polydibromostyrene, and poly(pentabromobenzyl acrylate).

Among such brominated flame retardants, particular preference is given to at least one selected from tetrabromobisphenol A derivative compounds having a weight average molecular weight ranging from 900 to 4,000, and brominated polystyrene, polydibromostyrene and poly(pentabromobenzyl acrylate) having a number average molecular weight ranging from 900 to 60,000. It should be noted that the number average molecular weight (Mn) and the weight average molecular weight (Mw) as used herein refer to Mn and Mw given in terms of the equivalent polystyrene molecular weight, as measured using gel permeation chromatography (GPC).

If the aforementioned brominated flame retardant has a too small molecular weight, the brominated flame retardant bleeds out of the functional coating layer, passes through the light blocking coating layer and the protective coating layer, and migrates into the bare POF to possibly cause significant increase in transmission loss, or the brominated flame retardant bleeds out to the surface of the functional coating layer of the POF cable to possibly cause degradation of the flame resistance of the POF cable, when the POF cable is placed in a high temperature environment of 100° C. or higher for a long period of time, even with a material having a high melting point as described above being used for the functional coating layer.

The aforementioned brominated flame retardant having a too large molecular weight possibly degrade flowability of the brominated flame retardant as well as solubility and dispersibility to the nylon-based resin composition, and accordingly tend to degrade the flame resistance and mechanical strength of the POF cable and to degrade the appearance of the cable.

The molecular weight of the tetrabromobisphenol A derivative compound is preferably equal to or larger than 2,000 but preferably not larger than 3,000. On the other hand, the molecular weight of each of the brominated polystyrene, polydibromostyrene, and poly(pentabromobenzyl acrylate) is preferably equal to or larger than 10,000, more preferably equal to or larger than 20,000, and even more preferable equal to or larger than 30,000. The molecular weight is preferably not larger than 50,000, and more preferably not larger than 40,000.

Examples of the tetrabromobisphenol A (hereinafter, abbreviated as "TBA") derivative compounds having a molecular weight of equal to or larger than 900 include oligomer compounds of TBA and 1,2-dibromoethane (TBA-EDB) represented by the following general formula (13):

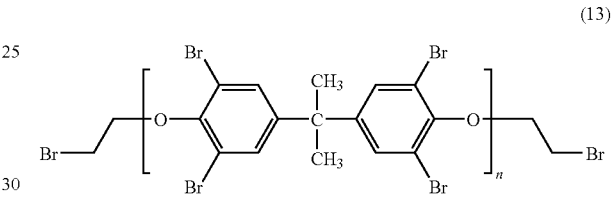

(13)

(n is an integer of from 1 to 4).

Examples include Fireguard 3000, and 3100 (trade name) available from Teijin Chemicals, Ltd.

Alternatively, examples include TBA-carbonate oligomer compounds (TBA-PC) with both ends capped with benzene or tribromobenzene, represented by the following general formula (14):

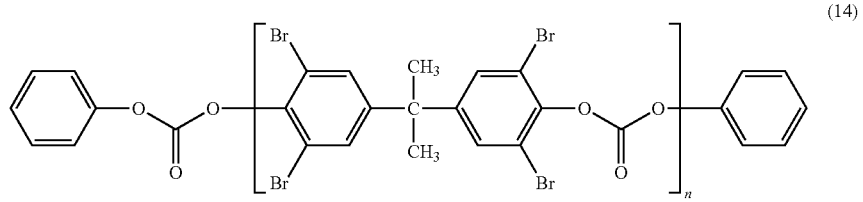

(14)

(n is an integer of from 3 to 5) or
the following general formula (15):

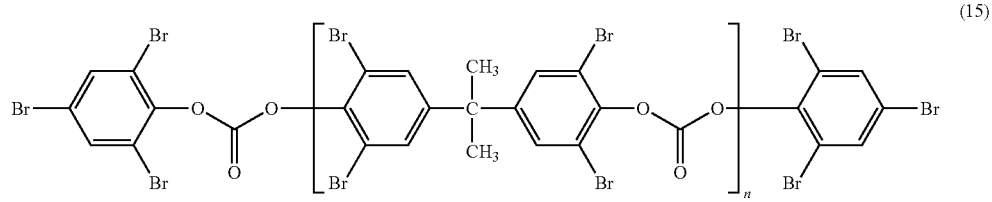

(15)

(n is an integer of from 3 to 5).

Examples include Fireguard 7000, 7500, and 8500 (trade name) available from Teijin Chemicals, Ltd. and BC-52, and BC-58 available from GLC.

Alternatively, examples include TBA-epoxy oligomer compounds (TBA-EPO) with both ends capped with tribromophenol or epoxy groups, represented by the following general formula (16):

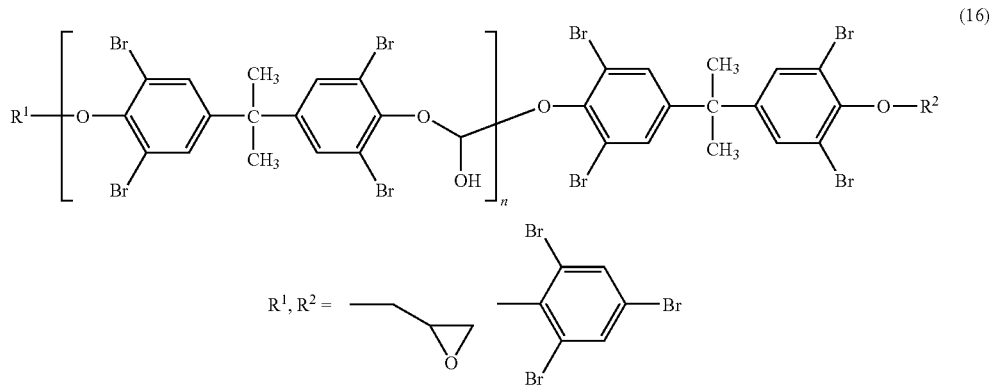

(16)

(n is an integer of from 0 to 4).
Examples include F-2001, 2200, 2016, 2300, 2300H, 2310, 2400, 2400H, and 3020 (trade name) available from Bromochem Far East Co., Ltd., SR-T5000 (trade name) available from Sakamoto Yakuhin Kogyo Co., Ltd., and T3040, T5000, and T20000 (trade name) available from MANAC Incorporated.

Examples of the brominated polystyrene (BrPS) or polydibromostyrene (PDBS) include compounds having a molecular weight ranging from 900 to 60,000, represented by the following general formula (17):

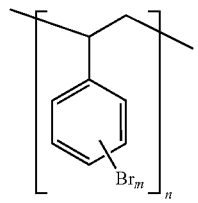

(17)

(m=2 for polydibromostyrene, m=2 to 5 for brominated polystyrene, and n is an integer).
Examples include FR-803P (trade name) available from Bromochem, SAYTEX-HP-7010, HP-3010, and PYROCHEK-68PB (trade name) available from ALBEMARLE CORPORATION, PB411, PBDS-80, PBS-64HW, and CP-411 (trade name) available from GLC, and Plasafety-1200 (trade name) available from MANAC Incorporated.

Examples of poly(pentabromobenzyl acrylate) (PPBBA) include compounds having a molecular weight ranging from 900 to 60,000, represented by the following general formula (18):

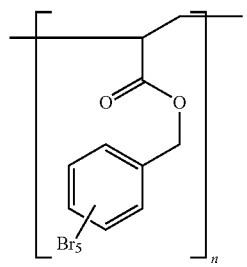

(18)

(n is an integer).
Examples include FR-1025 (trade name) available from Bromochem Far East Co., Ltd.

[Structure of POF Cable]
Next, the thickness of each layer making up of the POF cable according to the present invention is described.

In the present invention, with the outer diameter of the bare POF having the core/cladding structure "A" (μm), the thickness of the protective coating layer "a" (μm), the thickness of the light blocking coating layer "b" (μm), and the thickness of the functional coating layer "c" (μm), it is preferable that the values of a, b, and c satisfy the following formulae, from the viewpoint of providing a POF cable having better thermal stability with the protective coating layer capable of fully blocking the monomer and oligomer compounds derived from the nylon-based resin.

$$900 \leq A \leq 1100$$

$$1.5 \leq b/a \leq 30$$

$$5.5 \leq (b+c)/a \leq 70.$$

If a value of b/a is too small, possible results include degradation of the pull-out strength between the bare POF and the light blocking coating layer, degradation of the mechanical properties as well as the battery fluid-resistance that is required for in-vehicle applications, and unwanted effects on the pistoning of the POF cable. If a value of b/a is too large, the resultant protective coating layer is thin, and therefore it may possibly be unable to block migration of the residual monomers and oligomers derived from the nylon-based resin contained in the light blocking coating layer and the functional coating layer. A more preferable range is $2.0 \leq b/a \leq 10$, and even more preferable range is $3.0 \leq b/a \leq 5$.

It is preferable that the relational formula $5.5 \leq (b+c)/a \leq 70$ be true between the total thickness of the thickness (c) of the functional coating layer and the thickness (b) of the light blocking coating layer, and the thickness (a) of the protective coating layer. If a value of (b+c)/a is too small, possible results include degradation of the pull-out strength between the bare POF and the light blocking coating layer, degradation of the mechanical properties as well as the battery fluid-resistance that is required for in-vehicle applications, and unwanted effects on the pistoning of the POF cable. If a value of (b+c)/a is too large, the resultant protective coating layer is thin, and therefore it may possibly be incapable of blocking migration of the residual monomers and oligomers derived from the nylon-based resin contained in the light blocking coating layer and the functional coating layer. A more preferable range is $8.0 \leq (b+c)/a \leq 40$, and even more preferable range is $9.5 \leq (b+c)/a \leq 10$.

In addition, with the thickness of the protective coating layer "a" (μm), the thickness of the light blocking coating layer "b" (μm), and the thickness of the functional coating layer "c" (μm), it is preferable that the formulae $10 \leq a \leq 100$, $140 \leq b \leq 300$, $200 \leq a+b \leq 350$, and $500 \leq a+b+c \leq 660$ be true when the outer diameter of the bare POF is 900 to 1100 μm.

If the thickness of the protective coating layer a is too small, the effect of blocking the residual monomers and oligomers are not fully exhibited. If the thickness is too large, the pull-out strength between the bare POF and the light blocking coating layer tends to be reduced or the degree of pistoning tends to be increased.

If the thickness b of the light blocking coating layer is too small, the POF cable may possibly have a lower chemical resistance. If it is too large, the protective coating layer may possibly be unable to fully block the residual monomers and oligomers derived from the light blocking coating layer.

If the total thickness (a+b) of the protective coating layer and the light blocking coating layer is too small, the layer made of nylon 11 or nylon 12 also have a small thickness. This can cause degradation of solvent resistance of the POF cable. If the total thickness is too large, the bare POF becomes more susceptible to thermal degradation when the protective coating layer and the light blocking coating layer are coated simultaneously around the bare POF by using a single crosshead as described below.

If the total thickness (a+b+c) of the whole coating layer is too small, the layers of the bare POF may be capable of exhibiting only insufficient effects of, for example, protecting the bare POF from vibration, high temperature, and high humidity within an automobile. If the total thickness is too large, the resultant POF cable has a larger bending elasticity, which makes it more difficult to handle the cable when being processed.

[Method of Manufacturing POF Cable]

Next, a method of manufacturing the POF cable according to the present invention, that is, a method of forming the protective coating layer, the light blocking coating layer, and the functional coating layer around the bare POF is described in terms of some embodiments. These manufacturing methods may appropriately be selected depending on, for example, flow properties of the material used and specifications of the device used.

Production according to a first method can be made as follows.

First, a core, one or more cladding(s) over the core, and a protective coating layer over the cladding are formed by means of bicomponent spinning to integrally form the bare POF and the protective coating layer. Thereafter, a light blocking coating layer is formed around the protective coating layer by using a coating machine having a crosshead die to provide a POF primary cable. Subsequently, a functional coating layer is formed around the POF primary cable by using another coating machine having a crosshead die.

This approach is suitable when the protective coating layer having a thickness of 50 μm or smaller is formed around the bare POF. In this case, if the melt flow index (MI) (defined as the amount of polymer (in grams) flowing in 10 minutes through a nozzle of 2 mm in diameter and 8 mm in length at a temperature of 210° C. under a load of 5 kgf (49 N)) of the resin used for the protective coating layer as measured according to Japanese Industrial Standards JIS K7210 is too small, possible results include reduction of the forming stability during the formation of the coating layer and degradation of the optical properties of the POF cable due to an excessively high resin pressure applied to the bare POF within the crosshead. On the other hand, if the MI is too large, the mechanical strength of the protective coating layer tends to be reduced. Taking the above into consideration, the MI of the resin that forms the protective coating layer is preferably within a range of 5 to 200, more preferably within a range of 20 to 100, and even more preferably within a range of 40 to 50. In addition, it is preferable, from the point of view of stability during bicomponent spinning, that the following general formula (Vii) is true with the MIs of the materials that form the core, the cladding, and the protective coating layer being MI1, MI2, and MI3, respectively:

$$MI1 > MI2 > MI3 \quad \text{(Vii)}$$

The spinning temperature for the bicomponent spinning is preferably within a range of 200° C. to 260° C., and more preferably within a range of 220° C. to 240° C. In addition, the temperature of the crosshead die is preferably within a range of 190° C. to 230° C., and more preferably within a range of 200° C. to 220° C.

Production according to a second method can be made as follows.

First, a bare POF made of a core and at least one or more cladding formed around the core is provided by means of bicomponent spinning. Thereafter, a protective coating layer and a light blocking coating layer are co-extruded around the bare POF by using a coating machine having a crosshead die to provide a POF primary cable. Subsequently, a functional coating layer is formed around the POF primary cable by using another coating machine having a crosshead die.

In general, the bare POF is heat drawn for the purpose of imparting toughness to it. However, if the glass transition temperature and/or the melting point of the protective coating layer are/is higher than the glass transition temperature and/or the melting point of the components of the bare POF (the resins of the core material and the cladding material), co-drawing of the bare POF and the protective coating layer can possibly damage the protective coating layer that cannot keep pace with the stretching of the bare POF. In such cases, the second method is suitable. For example, the core material of the POF is made of a poly(methyl methacrylate) and the protective coating layer is made of a PBT resin or a PVDF resin. In this case, if the melt flow index (MI3) (defined as the amount of polymer (in grams) flowing in 10 minutes through a nozzle of 2 mm in diameter and 8 mm in length at a temperature of 210° C. under a load of 5 kgf (49 N)) of the resin used for the protective coating layer is too small, the resin has a higher viscosity. Possible results therefrom include reduction of the forming stability during the formation of the coating layer, and damage of the bare POF due to an excessively high resin pressure applied to the bare POF within the crosshead when the protective coating layer and the light blocking coating layer are co-extruded around the bare POF. On the other hand, if the MI3 is too large, it becomes more difficult to provide the protective coating layer having a certain given uniform thinner thickness. In addition, the protective coating layer is more likely to be broken when the POF cable is bent. Taking the above into consideration, the MI3 is preferably within a range of 20 to 200, more preferably within a range of 30 to 150, and even more preferably within a range of 50 to 100. In addition, it is preferable, from the point of view of stability during co-extrusion, that the melt flow index (MI3) of the material that forms the protective coating layer and the melt flow index (MI4) of the material that forms the light blocking coating layer satisfy the following formula (Viii):

$$MI3 \geq MI4 \quad \text{(Viii)}$$

The co-extrusion spinning temperature is preferably within a range of 200° C. to 260° C., and more preferably within a range of 220° C. to 240° C. In addition, the temperature of the crosshead die is preferably within a range of 210° C. to 240° C., and more preferably within a range of 2150° C. to 225° C.

In order to adjust the melt flow index (MI3) of the resin that forms the protective coating layer within the aforementioned numerical range, the molecular weight of the resin may be adjusted or an appropriate melt viscosity modifier may be added to the resin, as long as the performance of the POF cable is not deteriorated.

[Signal Transmission via POF Cable]

Next, a signal transmission system in which the POF cable according to the present invention is used is described.

As described above, visible LEDs having a center emission wavelength of around 650 nm are widely used as a light source for POFs. However, they cannot provide sufficient heat resistance at 100° C. or higher. This is because such LEDs are made of a GaAlAs-based material having a larger percentage of Al component and are thus highly susceptible to oxidation.

On the other hand, other visible LEDs are known to have a center emission wavelength of not higher than 600 nm, such as those based on InGaN (center emission wavelengths of 505 nm and 520 nm), PGaN (center emission wavelength of 565 nm), and InGaAlP (center emission wavelength of 590 nm). They contain no, or few if any, Al component that are responsible for degradation of the heat resistance of the LEDs. Accordingly, the LED itself can have a practical level of heat resistance at 100° C. or higher.

Now, as described above, the POF cable according to the present invention includes, around the bare POF, the protective coating layer, a blocking coating layer, and the functional coating layer each of which is made of a certain material. Therefore, increase in transmission loss in the POF is significantly suppressed in a high temperature environment of 100° C. or higher even for a wavelength of 600 nm or lower.

By combining the POF cable according to the present invention with a visible LED having a center emission wavelength within a range of 500 nm to 600 nm, good signal transmission is available in the fields such as in-vehicle communication applications where a long-term heat resistance at 100° C. or higher is required.

For the aforementioned visible LED, it is possible to use the one selected from, but not limited to, InGaN-based LEDs having a center emission wavelength of around 520 nm, PGaN-based LEDs having a center emission wavelength of around 565 nm, and AlGaInP-based LEDs having a center emission wavelength of around 590 nm.

EXAMPLES

The present invention is described below with reference to Examples.

Various evaluations on each Example of the present invention were performed according to the following procedures. Tables show the structures of the POF cables used and the evaluation results along with the Comparative Examples.

[Measurement of Heat of Crystal Fusion ($\Delta H$) and Crystalline Melting Point (Tm)]

A differential scanning calorimeter (DSC) (Seiko Instruments Inc., trade name: DSC-220) was used for the measurements. After each sample was heated at a temperature rising rate of 10° C./min to 200° C. at which temperature the sample was held for 5 minutes and melted. Then, the sample was cooled at a rate of 10° C./min to 0° C., followed by another heating process at a temperature rising rate of 10° C./min, 5-minute holding, and another cooling process at a rate of 10° C./min. The heat of crystal fusion ($\Delta H$) at this point was determined. The maximum point of the crystal melting peak was defined as the crystalline melting point.

[Measurement of Refractive Index]

A melt press machine was used to form a film-like test piece having a thickness of 200 μm. An Abbe refractometer was used to measure the refractive index at room temperature, 23° C., using the sodium D line ($_nD_{23}$).

[Measurement of Melt Flow Index]

The melt flow index (MI) was measured according to Japanese Industrial Standards JIS K7210. Measured was the amount of polymer flowing in 10 minutes through a nozzle of 2 mm in diameter and 8 mm in length at 210° C. under a load of 5 kgf (49 N).

[Methods of Quantitative Analysis and Qualitative Analysis of Low-Molecular-Weight Compounds (Monomer Compounds and Oligomer Compounds) in Nylon-Based Resin]

Fifty grams of pellets of nylon-based resin and 100 ml of methanol were loaded into a 300 ml eggplant flask, and refluxed while stirring for 24 hours. After the reflux, the methanol was transferred into a beaker, and fresh methanol was added into the eggplant flask, and refluxed for another 24 hours. After the reflux, the total amount of 200 ml of the extracted methanol solution was dried, and the mass (X g) of the resultant dried product was measured.

A mass spectrometer (MS) (JOEL Ltd., trade name: SX-102) and Thermal Desorption GC-MS (Agilent; trade name: HP5890/5972) were used to perform qualitative analysis of the dried product.

An appropriate amount of the dried product was dissolved again in methanol, and a preparative size exclusion chromatography (SEC) (Japan Analytical Industry, Co., Ltd., trade name: LC-10) was used to recover the dried product on a molecular weight basis. Furthermore, a nuclear magnetic resonance spectroscopic measurement (NMR) (JOEL Ltd., trade name: EX-270) was used to perform a qualitative analysis on the recovered product.

The amount of the low-molecular-weight compounds (total amount of the monomer compounds and oligomer compounds) contained in the nylon-based resin pellets was calculated by using the following formula (iX):

$$[Content] = X/500 \times 100 (\% \text{ by mass}) \quad (iX).$$

[Measurement of Crystallinity (X)]

A density gradient column was prepared with n-heptane and carbon tetrachloride within a constant temperature bath at 25° C., into which a sample fragment of about 5 mm×5 mm was introduced. Twenty-four hours later, readings were obtained and a density (ds) was determined. Next, the crystallinity (X) is calculated from the density (ds) according to the following general formula:

$$[Content] = X/50 \times 100 (\% \text{ by mass}) \quad (iX)$$

(wherein da is a density of an amorphous substance, dc is a density of a crystalline substance, and ds is a density of a sample).

The values of ds and dc were determined using X-ray diffraction or infrared spectrum. For nylon 66, da=1.09 and dc=1.24 were used.

[Measurement of Spherulite Size]

A microtome is used to cut the functional coating layer of the POF cable into very thin sections for polarizing microscope examination. Photographs of the spherulites were taken and then the 20 points of measurement were made on the diameter of each spherulite by using an image analyzer to calculate a number average, which was used as the spherulite size.

[Measurement of Transmission Loss]

A 25-1 m cut-back method was used to measure transmission loss in the initial (before thermal treatment) POF cable and the bare POF as well as the POF cable and the bare POF after being subjected to heat treatment in an oven at 105° C. for 5,000 hours, by using light having a measurement wavelengths of 520 nm, 570 nm, and 650 nm under the condition of NA of excitation light=0.1.

[Measurement of Transmission Loss Spectra Over all Wavelengths]

A 25-1 m cut-back method was used to measure transmission loss spectra over all wavelengths, of the initial (before thermal treatment) POF cable as well as the POF cable after being subjected to heat treatment in an oven at 105° C. for 5,000 hours, by using light having a measurement wavelengths ranging from 400 nm to 710 nm under the condition of NA of excitation light=0.1.

[Measurement of Oxygen Transmission Rate]

The oxygen transmission rate of a coating material was determined in a manner described below using a method defined in ISO 14663-2:1999 (Annex C).

A nylon-based resin composition for use in forming a functional coating layer was compression molded under heat by using a compression molding machine to form a film-like test piece having a thickness of 100 μm. Then, the oxygen transmission rate [$cm^3 \cdot cm/(cm^2 \cdot sec \cdot Pa)$] was measured at 23° C. in relative humidity of 0% RH by using an oxygen transmission rate system (Model: OXTRAN®) available from MOCON, Inc., USA.

[Measurement of Pull-Out Strength of Coating Layer]

Figure 2:
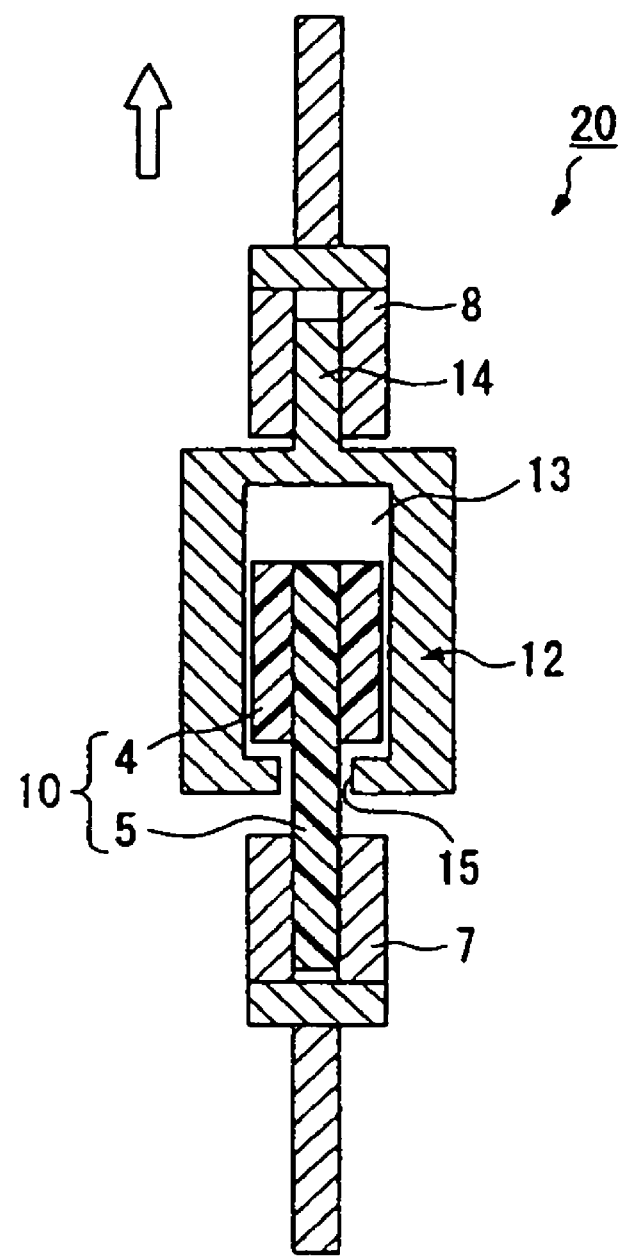
FIG. 2 is a cross-sectional view showing a device for use in measuring a pull-out strength of a coating layer of the plastic optical fiber cable.

The pull-out strength between the bare POF and the light blocking coating layer was measured, as shown in FIG. 2, by using a measurement apparatus 20 including a jig 12 that holds a POF cable 10, a chuck 8 that grips a protrusion 14 formed on one end of the jig 12, and a chuck 7 that grips a stripped portion 5 of the POF cable 10. The jig 12 has a holder chamber 13 in which a coated portion 4 of the POF cable 10 is accommodated, and a through-hole 15 that is larger than the stripped portion 5 of the POF cable 10 but is narrower than the coated portion 4 thereof.

For the measurement, the light blocking coating layer on one end of a POF cable was stripped, and the POF cable was cut in such a manner that the coated portion 4 of the POF cable has a length of 30 mm. Next, the coated portion 4 of the POF cable was housed in the holder chamber 13 formed in the jig 12, and the stripped portion 5 of the POF cable was pulled out of the through-hole 15. Thereafter, the chuck 8 was used to grip the protrusion 14 formed on the one end of the jig 12, and the chuck 7 was used to grip the stripped portion 5 of the POF cable.

Then, the chuck 8 was moved in the direction along the central axis of the POF cable 10 (in the direction indicated by the arrow in the figure) at a constant rate of 50 mm/min to pull the jig 12, and the part of the coated portion 4 of the POF cable 10 that is thicker than the stripped portion 5 was pulled out. The curve indicative of the relationship between the pull-out stress during the pulling operation and the amount of pull-out direction shift of the thicker part of the coated portion 4 of the POF cable 10 than the stripped portion 5 was used to read the peak value of the stress during the pulling operation, which was used as the pull-out strength.

[Measurement of 1% Mass Loss Temperature of Flame Retardant]

A 1% mass loss temperature for thermal decomposition was measured by using a differential thermal analyzer (TG/DTA) (available from Seiko Instruments Inc., trade name: TG/DTA 6300). The temperature of the flame retardant was increased from room temperature to 600° C. at constant rate of 10° C./min, to determine the temperature (° C.) at which a 1% mass loss was recorded.

[Flame Resistance Test]

A flame resistance test was performed by using a measurement method according to DIN 72551-5.

This measurement method is a modified version of DIN. 72551-5 that defines a method of measuring the flame resistance of electric cables. The method was modified as follows to measure the flame resistance of optical fiber cables.

More specifically, the original measurement method involves keeping the electric cable at an oblique angle of 45 degrees during or after combustion. However, unlike the electric cables, it is difficult to keep an optical fiber cable at such an oblique angle of 45 degrees when the optical fiber is burned. Accordingly, in order to keep the optical fiber cable at an oblique angle of 45 degrees during or after combustion, two copper wires are wound around the optical fiber cable in a spiral-like fashion so that they intersect with each other to measure the flame resistance. The copper wire used has a diameter of 0.7 mm φ and the distance between the adjacent turns of the spiral is 20 mm each in the longitudinal direction of the optical fiber cable.

In addition, pass or fail of the flame resistance test is determined as follows. An optical fiber cable is exposed to flame from a burner for seven seconds to ignite it, and the flame is moved away from the sample. The sample is considered having passed if the flame goes out within 30 seconds. The sample is considered having failed if the flame does not go out with this same period. Similar tests were repeated for a set of ten samples. "○" denotes that eight or more samples have passed. "Δ" denotes that seven or less samples have passed. The number of samples in which the flame went out within 30 seconds was also recorded.

[Evaluation of Appearance of POF Cable Surface]

The appearance of the POF secondary cable surface was observed and the outer surface of the cable was evaluated as follows.

⊚: POF cable has a smooth surface;

○: POF cable has a smooth surface with a slightly bumpy texture observed;

Δ: POF cable has a surface with a noticeable bumpy texture observed; and

X: POF cable has a surface with a noticeable bumpy texture and degradation of the resin observed.

[Evaluation of Cross-Section of POF Cable]

The cross section of the POF primary cable was observed through an optical microscope.

[Measurement of Flexural Modulus of POF Cable]

The POF secondary cable was placed on two supports of the fixture. The POF cable was loaded by means of a cable loading nose in a direction perpendicular to the central axis of the cable. The span length between the two supports was 15 mm. Upon loading, the POF cable was deformed into a circular arc having a radius of curvature of 5 mm. The flexural modulus (N/mm) corresponded to the stress (N) applied to the cable loading nose when the cable loading nose was displaced by 1 mm from the initial position. By using this result, the flexural modulus of the secondary cable was determined as follows.

⊚: flexural modulus of equal to or higher than 10 N but not higher than 16 N;
○: flexural modulus of equal to or higher than 6 N but lower than 10 N, or higher than 16 N but not higher than 20 N; and
Δ: flexural modulus of lower than 6 N, or flexural modulus of higher than 20 N.

If the flexural modulus is too low, the resultant POF cable becomes soft. Therefore, the POF cable is more likely to be twisted when handled. On the other hand, if the flexural modulus is too high, the resultant POF cable becomes harder and accordingly much more difficult to be handled. The POF cable also "get buckled" more easily after it is wound around a purpose-built bobbin for storage.

Reference Example 1

PMMA (refractive index of 1.492) was used for a core material, a copolymer (refractive index of 1.416 to 1.417) made of 3FM/17FM/MMA/MAA (composition ratio of 51/31/17/1 (% by mass)) was used for a first cladding material, and a copolymer made of VdF/TFE/HFP (composition ratio of 43/48/9 (% by mass), refractive index of 1.375, heat of crystal fusion (ΔH) of 14 mJ/mg) was used for a second cladding material ("MAA" refers to a methacrylic acid). These polymers were molten and fed to a spinning head at 220° C. A concentric dual injection nozzle was used for bicomponent spinning, and the polymers were stretched to double in the fiber axis direction in a hot-air furnace at 140° C. to obtain a bare POF having a diameter of 1 mm in which each cladding layer has a thickness of 10 μm.

The transmission loss of the resultant bare POF was as good as 134 dB/km, and the transmission loss after a heat resistance test was also as good as 175 dB/km.

Around the resultant bare POF, a PBT resin (DuPont-Toray Co., LTD., trade name: Hytrel 4767) as the protective coating layer, and a commercially available nylon 12 resin (available from Daicel-Degussa, Ltd., trade name: Daiamide-L1640) to which 1% by mass of carbon black was added were coated, as the light blocking coating layer, by using a cross head cable coating machine having a crosshead die at 210° C., to obtain a POF primary cable having an outer diameter of 1.5 mm that includes a protective coating layer (thickness of 40 μm) and a light blocking coating layer (thickness of 210 μm).

The initial transmission loss of the resultant POF primary cable was as good as 135 dB/km, and the transmission loss after a heat resistance test was also as good as 185 dB/km. The pull-out strength between the bare POF and the light blocking coating layer was 46 N.

The molecular weight of a polytetramethylene glycol (PTMG) unit that forms the soft segment part (B) of the PBT resin was 430, the ratio (a/b) was 25/75 between the total number of moles (a) of a polybutylene terephthalate unit contained in the hard segment part (A) and the total number of moles (b) of a polybutylene terephthalate unit contained in the soft segment part (B), the Shore D hardness was 47, the melting point was 199° C., and the melt flow index was 22 g/10 min.

The content of monomers and oligomers contained in the nylon 12 resin of the light blocking coating layer was 1.18% by mass. Qualitative analysis was made on the recovered product obtained from the methanol solution after extraction. As a result, the extracts included monomers (12-aminododecanoic acid and ω-laurolactam) that are a raw material of the nylon 12 resins, and dimmers, trimers, tetramers and higher-order multimers (aminoaliphatic carboxylic acid compounds and cyclic lactam compounds) of the monomers.

Example 1

A functional coating layer was formed around the POF primary cable having an outer diameter of 1.5 mm, which was prepared in Reference Example 1. Used as the feed material for the functional coating layer was a nylon 6 resin composition (bromine atom content of 6.8% by mass) that contains 83.5% by mass of nylon 6 resin (available from UBE INDUSTRIES, LTD., trade name: UBE nylon 1011 FB), 10% by mass of brominated polystyrene (available from ALBEMARLE CORPORATION, trade name: HP-3010, molecular weight of 50,000 given in terms of the equivalent polystyrene molecular weight as measured using GPC), 5% by mass of antimony pentoxide (available from NISSAN CHEMICAL INDUSTRIES, LTD., trade name: San-Epok), and 1.5% by mass of ultramarine blue. This resin composition was coated by using a crosshead cable coating machine having a crosshead die at 240° C. to obtain a POF secondary cable of an outer diameter of 2.3 mm, which has a functional coating layer (thickness of 400 μm). The content of monomers and oligomers contained in the nylon 6 resin was 9.0% by mass.

The resultant POF secondary cable was evaluated and the results are given in Table 2 below. The resultant POF secondary cable had an initial transmission loss of 135 dB/km and a transmission loss after a heat resistance test was 200 dB/km. The heat resistance was good.

The bare POF had an outer diameter A=1000 (μm), the protective coating layer had a thickness a=40 (μm), the light blocking coating layer had a thickness b=210 (μm), and the functional coating layer had a thickness c=400 (μm). Therefore, b/a was equal to 5.25, and (b+c)/a was equal to 15.25.

Example 2

A functional coating layer was formed around the POF primary cable having an outer diameter of 1.5 mm, which was prepared in Reference Example 1. Used as the feed material for the functional coating layer was a nylon 6 resin composition that contains 85% by mass of nylon 6 resin (available from UBE INDUSTRIES, LTD., trade name: UBE nylon 1011 FB), 15% by mass of melamine cyanurate (available from NISSAN CHEMICAL INDUSTRIES, LTD., trade name: MC-4000), and 1.5% by mass of ultramarine blue. This resin composition was coated by using a crosshead cable coating machine having a crosshead die at 240° C. to obtain a POF secondary cable of an outer diameter of 2.3 mm, which has a functional coating layer (thickness of 400 μm).

The resultant POF secondary cable was evaluated and the results are given in Table 2 below. The resultant POF secondary cable had an initial transmission loss of 135 dB/km and a transmission loss after a heat resistance test was 198 dB/km. The heat resistance was good.

Comparative Examples 1 to 2

A commercially available nylon 12 resin (available from Daicel-Degussa, Ltd., trade name: Daiamide-L1640) to which containing 1% by mass of carbon black was added was coated, as the light blocking coating layer, around the bare POF having a diameter of 1 mm, which was prepared in Reference Example 1, by using a crosshead cable coating machine having a crosshead die at 210° C. to obtain a POF primary cable having an outer diameter of 1.5 mm, which has a light blocking coating layer (thickness of 250 μm).

Next, as Comparative Examples 1 and 2, the nylon 6 resin compositions used as the functional coating layers in Examples 1 and 2 were coated around the resultant POF primary cables, respectively, by using a crosshead cable coating machine having a crosshead die at 240° C. to obtain POF secondary cables of an outer diameter of 2.3 mm, each including a functional coating layer (thickness of 400 μm).

The resultant POF secondary cables were evaluated and the results are given in Table 2 below. Each of the resultant POF secondary cables had a good transmission property, i.e., an initial transmission loss of 133 dB/km. However, a transmission loss after a heat resistance test exceeded 1,000 dB/km, indicating that the heat resistance was significantly low. In addition, the pull-out strength between the bare POF and the light blocking coating layer was 35 N.

Example 3

Reference Example 1 was repeated to obtain a POF primary cable having an outer diameter of 1.5 mm except that the thickness of the protective coating layer was 80 μm, and the thickness of the light blocking coating layer was 170 μm. As in Example 1, a functional coating layer was coated around the resultant POF primary cable to obtain a POF secondary cable having an outer diameter of 2.3 mm.

The resultant POF secondary cable was evaluated and the results are given in Table 2 below. The resultant POF secondary cable had an initial transmission loss of 132 dB/km, and transmission loss after a heat resistance test was 190 dB/km. The heat resistance was good.

The bare POF had an outer diameter A=1000 (μm), the protective coating layer had a thickness a=80 (μm), the light blocking coating layer had a thickness b=170 (μm), and the functional coating layer had a thickness c=400 (μm). Therefore, b/a was equal to 2.13, and (b+c)/a was equal to 7.13.

Examples 4 to 7

Example 3 was repeated except that the protective coating layer was prepared by using a PBT resin having a melt flow index (MI) given in Table 1-1 to produce POF secondary cables of Examples 4 to 7.

The resultant POF secondary cables were evaluated and the results are given in Table 2 below. As to the cross section of the POF primary cables in Example 4 in which the PBT resin has a low MI (MI=3) and Example 7 (MI=230) in which the PBT resin has a high MI, the protective coating layers each had an uneven thickness. On the other hand, in Examples 5 and 6 in which a PBT resin having a moderate MI was used (MI=30, 180), the protective coating layers each had a uniform thickness. In addition, all POF secondary cables each exhibited a good transmission property with a small initial transmission loss, but a transmission loss after a heat resistance test was relatively large, that is 245 dB/km in Example 4 and 250 dB/km in Example 7, in which each protective coating layer had an uneven thickness.

Examples 8 to 12

Example 3 was repeated except that the protective coating layer was prepared by using a PBT resin given in Table 1-1 to produce POF secondary cables of Examples 8 to 12. The PBT resin used in Example 10 is a trade name Hytrel 4047 available from DuPont-Toray Co., LTD.

The resultant POF secondary cables were evaluated and the results are given in Table 2 below. Example 12, in which the a/b ratio of the PBT resin, the Shore D hardness, and the melting point were relatively high, provided protective coating layers having an uneven thickness, and accordingly Example 12 had a larger transmission loss as compared to Examples 8 to 11, and also had a lower pull-out strength.

Example 13

Example 3 was repeated to produce a POF secondary cable except that a commercially available nylon 11 resin (available from Arkema K. K., trade name: Rilsan BMF-0, total content of monomers and oligomers was 0.95% by mass) to which 1% by mass of carbon black was added was used as the light blocking coating layer.

The resultant POF secondary cable was evaluated and the results are given in Table 2 below. The resultant POF secondary cable had an initial transmission loss of 135 dB/km, and a transmission loss after a heat resistance test was 180 dB/km. The heat resistance was good.

Comparative Example 3

Example 3 was repeated to produce a POF secondary cable except that a commercially available nylon 12 resin (available from EMS Showa Denko, trade name: Grilamide L16A, total content of monomers and oligomers was 1.69% by mass) to which 1% by mass of carbon black was added was used as the light blocking coating layer.

The resultant POF secondary cable was evaluated and the results are given in Table 2 below. The resultant POF secondary cable had a good transmission property, i.e., an initial transmission loss of 133 dB/km. However, a transmission loss after a heat resistance test was as large as 850 dB/km. The heat resistance was significantly low.

Comparative Examples 4 to 5

Example 3 was repeated to produce POF secondary cables of Comparative Examples 4 and 5 except that a commercially available nylon 12 resin (available from Daicel-Degussa, Ltd., trade name: Daiamide-L1640) and a commercially available nylon 6-12 resin (available from Daicel-Degussa, Ltd., trade name: Daiamide-N1901), respectively, were used for the light blocking coating layer.

The resultant POF secondary cables were evaluated and the results are given in Table 2 below. The resultant POF secondary cable had a good transmission property, i.e., an initial transmission loss of 133 dB/km. However, a transmission loss after a heat resistance test exceeded 1,000 dB/km. The heat resistance was significantly low.

Examples 14 to 15, and Comparative Example 6

Reference Example 1 was repeated to produce bare POFs except that the fluorine-containing olefin resins given in Table 1-1 were used for the second cladding of the bare POF. The resultant bare POFs each was coated with a protective coating layer, a light blocking coating layer, and a functional coating layer as in Example 3 to produce a POF secondary cable. The "PFPVE" in the Table represents perfluoro-pentafluoro(propyl vinyl ether) ($CF_2=CFOCH_2CF_2CF_3$).

The resultant POF secondary cables were evaluated and the results are given in Table 2 below. The POF secondary cables in Examples 14 and 15 having a heat of crystal fusion (ΔH) of 40 mJ/mg or smaller exhibited an initial transmission loss of 133 dB/km, and a transmission loss after a heat resistance test of not higher than 200 dB/km. The heat resistance was good. On the contrary, in Comparative Example 6 having a heat of crystal fusion (ΔH) of larger than 40 mJ/mg, a transmission loss after a heat resistance test was as large as 1,000 dB/km or larger. The heat resistance was significantly low.

Examples 16 to 20

Example 1 was repeated to produce POF secondary cables except that the thickness a of the protective coating layer, the thickness b of the light blocking coating layer, and the thickness c of the functional coating layer were as given in Table 3.

The resultant POF secondary cables were evaluated and the results are given in Table 3 below. Table 3 also shows the evaluation results in Examples 1 and 3. The pull-out strength between the bare POF and the light blocking coating layer becomes larger with a thinner protective coating layer or a larger ratio b/a. However, a transmission loss after a heat resistance test in the POF secondary cable was more likely to be increased.

Examples 21 to 25

Example 1 was repeated to produce POF secondary cables each having an outer diameter of 2.3 mm except that a nylon 6 resin composition obtained by mixing, at a mixing ratio given in Table 4-1, a nylon 6 resin (available from UBE INDUSTRIES, LTD., trade name: UBE nylon 1011FB), melamine cyanurate (available from NISSAN CHEMICAL INDUSTRIES, LTD., trade name: MC-4000), and ultramarine blue was formed, as the functional coating layer, around the POF primary cable having an outer diameter of 1.5 mm that was prepared as in Example 3. The "PA6" in the table represents a nylon 6 resin, while the "MCN" represents melamine cyanurate.

The resultant POF secondary cables were evaluated and the results are given in Table 4-2 below. The resultant POF secondary cables each had small transmission loss both initially and after a heat resistance test, indicating good heat resistance. However, the POF secondary cable had a lower flame resistance with a lower content of the melamine cyanurate in the functional coating layer. On the other hand, the flame resistance was improved with a higher content of the melamine cyanurate but the POF secondary cable had a larger flexural modulus, which tends to make the cable more and more difficult to be handled.

Examples 26 to 31

Example 1 was repeated to produce POF secondary cables each having an outer diameter of 2.3 mm except that a nylon 6 resin composition obtained by mixing, at a mixing ratio given in Table 4-1, a nylon 6 resin (available from UBE INDUSTRIES, LTD., trade name: UBE nylon 1011FB), brominated polystyrene (available from ALBEMARLE CORPORATION, trade name: HP-3010), and ultramarine blue was formed, as the functional coating layer, around the POF primary cable having an outer diameter of 1.5 mm that was prepared as in Example 3.

The resultant POF secondary cables were evaluated and the results are given in Table 4-2 below. The resultant POF secondary cables each had small transmission loss both initially and after a heat resistance test, and the heat resistance was good. However, the POF secondary cable had a lower flame resistance with a lower content of the brominated polystyrene in the functional coating layer. On the other hand, the flame resistance was improved with a higher content of the brominated polystyrene but the POF secondary cable had a larger flexural modulus, which tends to make the cable more and more difficult to be handled.

Example 32

Example 27 was repeated to produce a POF secondary cable except that brominated polystyrene having a 1% mass loss temperature of lower than 300 degrees was used as the flame retardant for the functional coating layer.

The resultant POF secondary cable was evaluated and the results are given in Table 4-2 below. The resultant POF secondary cable was inferior in transmission loss after a heat resistance test and flame resistance to Example 27 which used brominated polystyrene having a 1% mass loss temperature of 300° C. or higher.

Examples 33 to 38, and Comparative Examples 7 to 10

Example 3 was repeated to produce POF secondary cables each having an outer diameter of 2.3 mm except that inorganic pigments (Examples 33 to 38) and organic dyes (Comparative Examples 7 to 10) given in Table 4-1 were used as a colorant for the functional coating layer.

The resultant POF secondary cables were evaluated and the results are given in Table 4-2 below. The POF secondary cables in which an inorganic pigment was used as the colorant had small transmission loss both initially and after a heat resistance test, and the heat resistance was good (Examples 33 to 38). However, in the POF cables in which an organic dye was used as the colorant, a transmission loss after a heat resistance test exceeded 1,000 dB/km, indicating that the heat resistance was not good (Comparative Examples 7 to 10).

Examples 39 to 59

Example 3 was repeated to produce POF secondary cables except that brominated polystyrenes having different molecular weights and ultramarine blue (Examples 33 to 59), TBA-PCs having different molecular weights and Bengal red (Examples 44 to 49), polydibromostyrenes having different molecular weights and Iron Blue (Examples 50 to 54), and PPBBAs having different molecular weights and ultramarine blue (Examples 55 to 59) were used at a mixing ratio given in Table 4-1 and Table 5-1, as the flame retardant and the colorant for the functional coating layer.

The resultant POF secondary cables were evaluated and the results are given in Table 4-2 and Table 5-1 below. When a flame retardant having a 1% mass loss temperature of lower than 300 degrees or a flame retardant having a low molecular weight was used, the POF secondary cable had a slightly high transmission loss after a heat resistance test, a relatively low heat resistance, and a relatively low flame resistance. On the other hand, when the flame retardant used had a high molecular weight, the POF secondary cable tended to have a degraded surface appearance and the cable tended to have a large flexural modulus, making the cable more difficult to be handled.

Examples 60 to 89, and Comparative Examples 11 to 14

Example 3 was repeated to produce POF secondary cables each having an outer diameter of 2.3 mm except that a nylon 66 resin composition obtained by mixing, at a mixing ratio given in Table 5-1, a nylon 66 resin (available from UBE INDUSTRIES, LTD., trade name: UBE nylon 2015B), various flame retardants and a flame retardant auxiliary (antimony pentoxide) given in Table 5-1, and various colorants given in Table 5-1, was used as the functional coating layer, and that a crosshead die was set at 280° C. The content of monomers and oligomers in the nylon 66 resin was 8.5% by mass.

The resultant POF secondary cables were evaluated and the results are given in Table 5-2 below. In these Examples, the resultant POF secondary cables had small transmission loss both initially and after a heat resistance test, and the heat resistance was good. However, Comparative Examples 11 to 14 in which the organic dyes were used as the colorant in the functional coating layer exhibited significant increase in transmission loss after a heat resistance test of the POF secondary cables. In Examples in which the inorganic pigments were used as the colorant, the POF secondary cable had a slightly high transmission loss, a relatively low heat resistance, and a relatively low flame resistance when the flame retardant used has a low molecular weight. On the other hand, when the flame retardant used had a high molecular weight, the POF secondary cable tended to have a degraded surface appearance and the cable tended to have a large flexural modulus, making the cable more difficult to be handled. The flame resistance will be improved with a higher content of flame retardant used but the POF secondary cable had a larger flexural modulus, which tends to make the cable more and more difficult to be handled.

Reference Example 2

PMMA (refractive index of 1.492) was used for a core material, a copolymer (refractive index of 1.416 to 1.417) made of 3FM/17FM/MMA/MAA (composition ratio of 51/31/17/1 (% by mass)) was used for a first cladding material, and a copolymer made of VdF/TFE/HFP (composition ratio of 43/48/9 (% by mass), refractive index of 1.375, heat of crystal fusion ($\Delta H$) of 14 mJ/mg) was used for a second cladding material. These polymers were molten and fed to a spinning head at 220° C. A concentric dual injection nozzle was used for bicomponent spinning, and the polymers were stretched to double in the fiber axis direction in a hot-air furnace at 140° C. to obtain a bare POF having an diameter of 1 mm in which each cladding has a thickness of 10 μm (in Tables 1 and 2, abbreviated as "POF (A)"). The transmission loss of the resultant bare POF at a wavelength of 650 nm was as good as 130 dB/km.

Around the resultant bare POF, a commercially available nylon 12 (available from Daicel-Degussa, Ltd., trade name: Daiamide-L1640) to which 1% by mass of carbon black was added was coated, as the light blocking coating layer, by using a crosshead cable coating machine having a crosshead die at 210° C., to obtain a POF primary cable having an outer diameter of 1.50 mm, which has a light blocking coating layer (thickness of 250 μm).

The resultant POF primary cable had an initial transmission loss of as good as 134 dB/km at a wavelength of 650 nm. However, a transmission loss after a heat resistance test was 560 dB/km, indicating degradation of the optical transmission performance. In addition, the transmission losses after a heat resistance test at wavelengths of 520 nm and 570 nm were not lower than 1,000 dB/km and 980 dB/km, respectively, which were a significant increase from their initial transmission losses.

The total content of monomers and oligomers contained in nylon 12 of the light blocking coating layer was 1.18% by mass. Qualitative analysis was made on the recovered product obtained from the methanol solution after extraction. As a result, the extracts included monomers (12-aminododecanoic acid and ω-laurolactam) that are a raw material of nylon 12, and dimmers, trimers, tetramers and higher-order multimers (aminoaliphatic carboxylic acid compounds and cyclic lactam compounds) of the monomers.

Reference Example 3

Reference Example 1 was repeated to produce a POF primary cable having an outer diameter of 1.51 mm that includes a protective coating layer (thickness of 40 μm) and a light blocking coating layer (thickness of 215 μm), except that a polybutylene terephthalate (PBT)-based resin (DuPont-Toray Co., LTD., trade name: Hytrel 4047), as the protective coating layer, and a commercially available nylon 12 resin (available from Daicel-Degussa, Ltd., trade name: Daiamide-L1640) to which 1% by mass of carbon black was added, as the light blocking coating layer, were formed around the bare POF(POF (A)) prepared in Reference Example 2.

It should be noted that, in the polybutylene terephthalate-based resins, the polytetramethylene glycol unit that forms the soft segment part (B) thereof had a molecular weight of 430, the ratio (a/b) was 25/75 between the total number of moles (a) of the polybutylene terephthalate units contained in the hard segment part (A) of the resin, and the total number of moles (b) of the polybutylene terephthalate units contained in the soft segment part (B) of the resin, the Shore D hardness was 47, the melting point was 199° C., and the melt flow index (210° C., load 5 kg (49 N)) was 22 g/10 min.

The resultant POF primary cable had an initial transmission loss of as good as 134 dB/km at a wavelength of 650 nm. Furthermore, a transmission loss after a heat resistance test was as good as 185 nm. In addition, the transmission losses after a heat resistance test at wavelengths of 520 nm and 570 nm were not lower than 1,000 dB/km and 460 dB/km, respectively.

Figure 3:
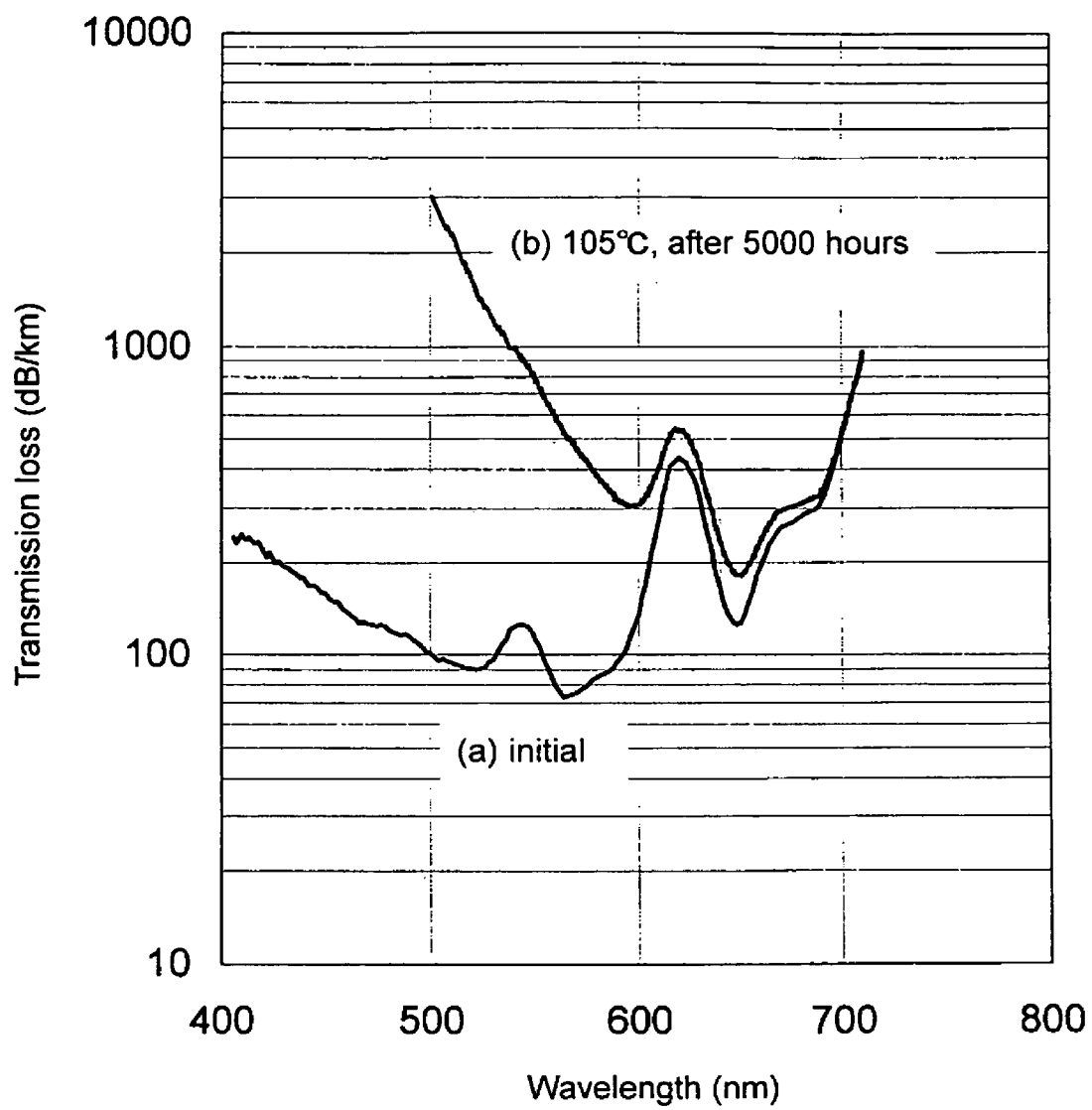
FIG. 3 shows transmission losses over all wavelengths in a POF cable recorded initially and after being left at 105° C. for 5,000 hours in Reference Example 3.

A transmission loss spectrum after the resultant POF primary cable was left at 105° C. for 5,000 hours is shown in FIG. 3 in comparison with an initial spectrum. It is apparent that the transmission loss was significantly increased on the short wavelength side.

Example 90

A nylon 66 resin (available from UBE INDUSTRIES, LTD., trade name: UBE nylon 2015B) was coated, as the functional coating layer, around the POF primary cable having an outer diameter of 1.51 mm prepared in Reference Example 3, by using a crosshead cable coating machine having a crosshead die at 280° C. to produce a POF secondary cable having an outer diameter of 2.31 mm, which has a functional coating layer (thickness of 400 μm).

The resultant POF secondary cable had an initial transmission loss of as good as 136 dB/km at a wavelength of 650 nm, and a transmission loss after a heat resistance test was as good as 205 dB/km. In addition, the transmission losses after a heat resistance test at wavelengths of 520 nm and 570 nm were not lower than 1,000 dB/km and 662 dB/km, respectively.

Figure 4:
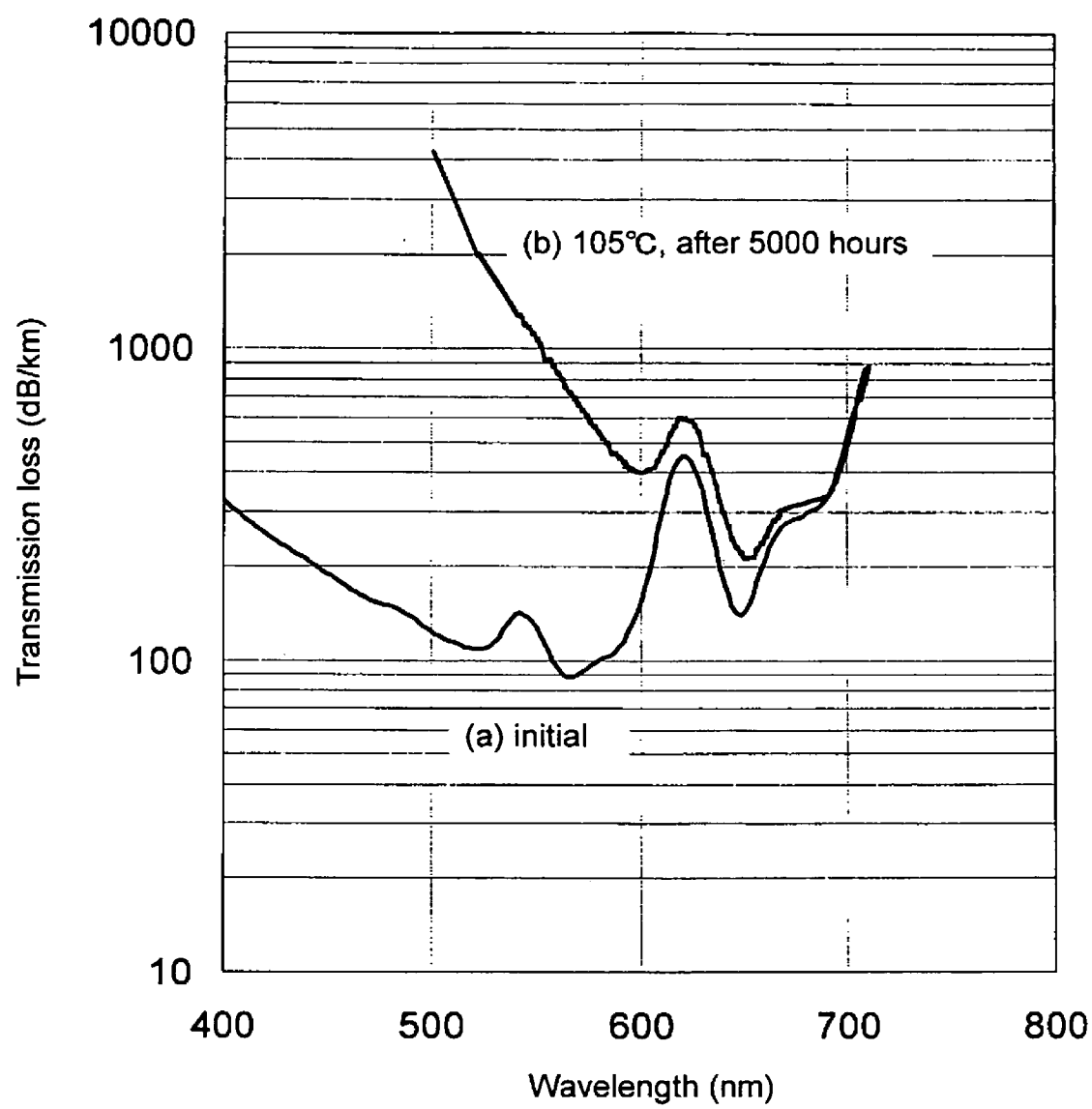
FIG. 4 shows transmission losses over all wavelengths in a POF cable recorded initially and after being left at 105° C. for 5,000 hours in Example 90.

A transmission loss spectrum after the resultant POF secondary cable was left at 105° C. for 5,000 hours is shown in FIG. 4 in comparison with an initial spectrum. It is apparent that the transmission loss was significantly increased on the short wavelength side.

Example 91

Example 90 was repeated to produce a POF secondary cable except that a nylon 66 resin composition containing 98% by mass of nylon 66 (available from UBE INDUSTRIES, LTD., trade name: UBE nylon 2015B) and 2.0% by mass of ultramarine blue was used as the functional coating layer.

The resultant POF secondary cable had an initial transmission loss of as good as 136 dB/km at a wavelength of 650 nm, and a transmission loss after a heat resistance test of as good as 197 dB/km. In addition, the transmission losses after a heat resistance test at wavelengths of 520 nm and 570 nm were not lower than 1,000 dB/km and 506 dB/km, respectively.

Example 92

Example 90 was repeated to produce a POF secondary cable except that a nylon 66 resin composition containing 85% by mass of nylon 66 (available from UBE INDUSTRIES, LTD., trade name: UBE nylon 2015B), 10% by mass of brominated polystyrene (available from ALBEMARLE CORPORATION, trade name: HP-3010, molecular weight of 50,000 given in terms of the equivalent polystyrene molecular weight as measured using GPC, bromine atom content of 68.5% by mass), and 5% by mass of antimony pentoxide (available from NISSAN CHEMICAL INDUSTRIES, LTD., trade name: San-Epok), was used as the functional coating layer.

The bromine atom content in this functional coating layer is equal to 6.85% by mass.

The resultant POF secondary cable had an initial transmission loss of as good as 134 dB/km at a wavelength of 650 nm, and a transmission loss after a heat resistance test of as good as 187 dB/km. In addition, the transmission losses after a heat resistance test at wavelengths of 520 nm and 570 nm were not lower than 1,000 dB/km and 351 dB/km, respectively.

Example 93

Example 90 was repeated to produce a POF secondary cable except that a nylon 66 resin composition containing 83% by mass of nylon 66 (available from UBE INDUSTRIES, LTD., trade name: UBE nylon 2015B), 10% by mass of brominated polystyrene (available from ALBEMARLE CORPORATION, trade name: HP-3010, molecular weight of 50,000 given in terms of the equivalent polystyrene molecular weight as measured using GPC, 5% by mass of antimony pentoxide (available from NISSAN CHEMICAL INDUSTRIES, LTD., trade name: San-Epok), and 2% by mass of ultramarine blue, was used as the functional coating layer.

The resultant POF secondary cable had an initial transmission loss of 134 dB/km at a wavelength of 650 nm and an excellent transmission loss after a heat resistance test of 140 dB/km. Furthermore, the transmission losses after a heat resistance test at wavelengths of 520 nm and 570 nm were excellent as not lower than 165 dB/km and 104 dB/km, respectively.

Figure 5:
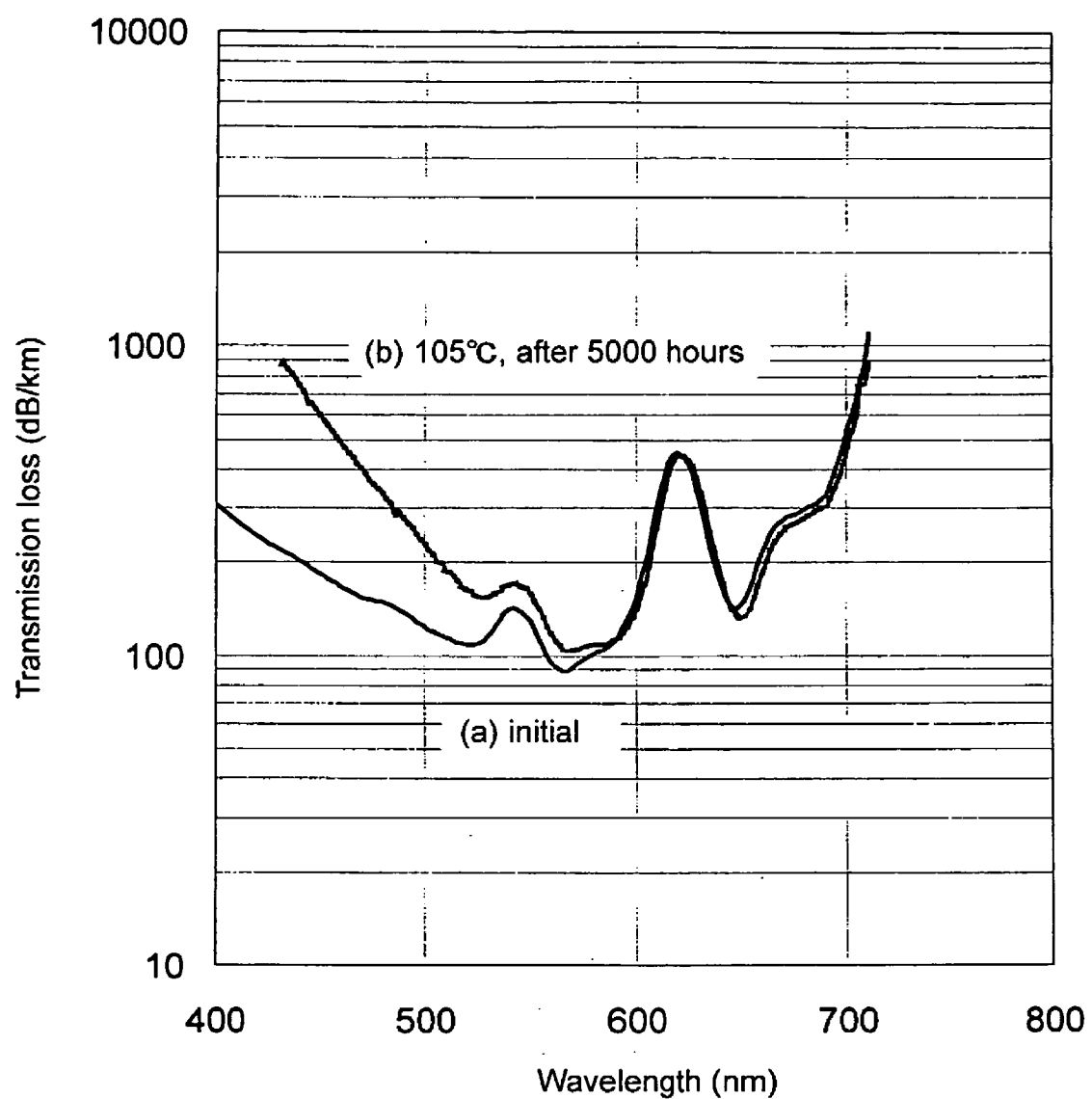
FIG. 5 shows transmission losses over all wavelengths in a POF cable recorded initially and after being left at 105° C. for 5,000 hours in Example 93.

A transmission loss spectrum after the resultant POF secondary cable was left at 105° C. for 5,000 hours is shown in FIG. 5 in comparison with an initial spectrum. It is apparent that the transmission loss on the short wavelength side was significantly suppressed as compared with FIG. 3 (Reference Example 3, POF primary cable) and FIG. 4 (Example 90).

Example 94

Example 90 was repeated to produce a POF secondary cable except that a commercially available nylon 11 (available from Arkema K. K., trade name: Rilsan BMF-0, total content of monomers and oligomers is 0.95% by mass) to which 1% by mass of carbon black was added, was used as the light blocking coating layer, and a nylon 66 resin composition containing 98% by mass of nylon 66 (available from UBE INDUSTRIES, LTD., trade name: UBE nylon 2015B) and 2% by mass of aluminum oxide as an crystallization accelerator for nylon 66, was used as the functional coating layer. The resultant POF secondary cable was evaluated and the results are given in Table 8 below.

Example 95

Example 94 was repeated to produce a POF secondary cable except that a nylon 66 resin composition containing 94% by mass of nylon 66(available from UBE INDUSTRIES, LTD., trade name: UBE nylon 2015B), 2% by mass of talc as a crystallization accelerator for nylon 66 and 4% by mass of Bengal red, was used as the functional coating layer. The resultant POF secondary cable was evaluated and the results are given in Table 8 below.

Examples 96 to 99

Example 90 was repeated to produce POF secondary cables except that the materials given in Table 7 were used as the protective coating layer, and nylon 66 resin compositions given in Table 7 were used as the functional coating layer. The resultant POF secondary cables were evaluated and the results are given in Table 8 below.

Examples 100 to 101, Comparative Example 15

Reference Example 2 was repeated to produce bare POFs each having a diameter of 1 mm in which each cladding has a thickness of 10 μm, except that a first cladding and a second cladding of the bare POF were made of the materials given in Table 6 (POF(B) for Example 100, POF(C) for Example 101, and POF(D) for Comparative Example 15).

Next, Example 90 was repeated to produce POF secondary cables except that the materials given in Table 7 were formed around the bare POF, as the protective coating layer and the functional coating layer. The resultant POF secondary cables were evaluated and the results are given in Table 8 below.

Example 102

Example 90 was repeated to produce a POF secondary cable except that a commercially available nylon 11 resin (available from Arkema K. K., trade name: Rilsan BMF-0, total content of monomers and oligomers is 0.95% by mass) to which 1% by mass of carbon black was added, was used as the light blocking coating layer, and a nylon 66 resin composition given in Table 7 was used as the functional coating layer. The resultant POF secondary cable was evaluated and the results are given in Table 8 below.

Comparative Example 16

Example 93 was repeated to produce a POF secondary cable except that a commercially available nylon 12 resin (available from EMS Showa Denko, trade name: Grilamide L16A, total content of monomers and oligomers is 1.69% by mass) to which 1% by mass of carbon black was added, was used as the light blocking coating layer. The resultant POF secondary cable was evaluated and the results are given in Table 8 below.

Comparative Example 17

Example 93 was repeated to produce a POF secondary cable except that the protective coating layer was not provided. The resultant POF secondary cable was evaluated and the results are given in Table 8 below.

Comparative Examples 18 to 19

Example 90 was repeated to produce POF secondary cables except that nylon 66 resin compositions given in Table 7, containing organic dyes, i.e., a phthalocyanine compound (Comparative Example 18) and an anthraquinone compound (Comparative Example 19) as the colorants, were used as the functional coating layer. The resultant POF secondary cables were evaluated and the results are given in Table 8 below.

Comparative Examples 20 to 21

As the functional coating layer, a commercially available nylon 12 resin (available from Daicel-Degussa, Ltd., trade name: Daiamide-L1640) in Comparative Example 20, and a nylon 12 resin composition given in Table 7 in Comparative Example 21, were coated around the POF primary cable prepared in Reference Example 3 by using a crosshead cable coating machine having a crosshead die at 220° C. to produce a POF secondary cable having an outer diameter of 2.30 mm, which has a functional coating layer (thickness of 400 μm). The resultant POF secondary cables were evaluated and the results are given in Table 8 below.

Example 103

A PGaN-based LED having a center emission wavelength at around 565 nm was attached to one end of the POF secondary cable prepared in Example 93, which was used as a cable for signal transmission. It was confirmed that stable signal transmission could be made not only initially but also after the cable was left in an environment of 105° C. for 5,000 hours.

Example 104

An InGaN-based LED having a center emission wavelength at around 520 nm was attached to one end of the POF secondary cable prepared in Example 93, which was used as a cable for signal transmission. It was confirmed that stable signal transmission could be made not only initially but also after the cable was left in an environment of 105° C. for 5,000 hours.

Example 105

An AlGaInP-based LED having a center emission wavelength at around 590 nm was attached to one end of the POF secondary cable prepared in Example 93, which was used as a cable for signal transmission. It was confirmed that stable signal transmission could be made not only initially but also after the cable was left in an environment of 105° C. for 5,000 hours.

Example 106

A PGaN LED-based having a center emission wavelength at around 565 nm was attached to one end of the POF secondary cable prepared in Example 97, which was used as a cable for signal transmission. It was confirmed that stable signal transmission could be made not only initially but also after the cable was left in an environment of 105° C. for 5,000 hours.

Example 107

An AlGaInP-based LED having a center emission wavelength at around 590 nm was attached to one end of the POF secondary cable prepared in Example 98, which was used as a cable for signal transmission. It was confirmed that stable signal transmission could be made not only initially but also after the cable was left in an environment of 105° C. for 5,000 hours.

Example 108

An InGaN-based LED having a center emission wavelength at around 520 nm was attached to one end of the POF secondary cable prepared in Example 101, which was used as a cable for signal transmission. It was confirmed that stable signal transmission could be made not only initially but also after the cable was left in an environment of 105° C. for 5,000 hours.

Comparative Example 22

A PGaN-based LED having a center emission wavelength at around 565 nm was attached to one end of the POF secondary cable prepared in Comparative Example 18, which was used as a cable for signal transmission. Stable signal transmission could be made initially, but stable signal transmission could not be made after the cable was left in an environment of 105° C. for 5,000 hours.

Comparative Example 23

A PGaN-based LED having a center emission wavelength at around 565 nm was attached to one end of the POF secondary cable prepared in Comparative Example 21, which was used as a cable for signal transmission. Stable signal transmission could be made initially, but stable signal transmission could not be made after the cable was left in an environment of 105° C. for 5,000 hours.

TABLE 1-1

| | Second Cladding | | | Protective Coating Layer | | | | | | Light Blocking Coating Layer | |
| --- | --- | --- | --- | --- | --- | --- | --- | --- | --- | --- | --- |
| | Composition (mass %) | Refractive Index | ΔH (mJ/mg) | Material | PTMG Molecular Weight | (a/b) | Shore D Hardness | Melting Point (° C.) | MI (g/10 min) | Material | Melting Point (° C.) | Content of Low-Molecular-Weight Compounds |
| Reference Example 1 | VdF/TFE/HFP (48/43/9) | 1.375 | 14 | PBT Resin: Hytrel4767 | 430 | 25/75 | 47 | 199 | 22 | PA12(a) | 177 | 1.18 |
| Example 1 | VdF/TFE/HFP (48/43/9) | 1.375 | 14 | PBT Resin: Hytrel4767 | 430 | 25/75 | 47 | 199 | 22 | PA12(a) | 177 | 1.18 |

TABLE 1-1-continued

| | Second Cladding | | | Protective Coating Layer | | | | | | Light Blocking Coating Layer | | |
|---|---|---|---|---|---|---|---|---|---|---|---|---|
| | | | | | PTMG | | | Melting | MI | | Melting | Content of Low-Molecular-Weight |
| | Composition (mass %) | Refractive Index | ΔH (mJ/mg) | Material | Molecular Weight | (a/b) | Shore D Hardness | Point (° C.) | (g/10 min) | Material | Point (° C.) | Compounds |
| Example 2 | VdF/TFE/HFP (48/43/9) | 1.375 | 14 | PBT Resin: Hytrel4767 | 430 | 25/75 | 47 | 199 | 22 | PA12(a) | 177 | 1.18 |
| Comparative Example 1 | VdF/TFE/HFP (48/43/9) | 1.375 | 14 | None | — | — | — | — | — | PA12(a) | 177 | 1.18 |
| Comparative Example 2 | VdF/TFE/HFP (48/43/9) | 1.375 | 14 | None | — | — | — | — | — | PA12(a) | 177 | 1.18 |
| Example 3 | VdF/TFE/HFP (48/43/9) | 1.375 | 14 | PBT Resin: Hytrel4767 | 430 | 25/75 | 47 | 199 | 22 | PA12(a) | 177 | 1.18 |
| Example 4 | VdF/TFE/HFP (48/43/9) | 1.375 | 14 | PBT Resin | 430 | 25/75 | 47 | 199 | 3 | PA12(a) | 177 | 1.18 |
| Example 5 | VdF/TFE/HFP (48/43/9) | 1.375 | 14 | PBT Resin | 430 | 25/75 | 47 | 199 | 30 | PA12(a) | 177 | 1.18 |
| Example 6 | VdF/TFE/HFP (48/43/9) | 1.375 | 14 | PBT Resin | 430 | 25/75 | 47 | 199 | 180 | PA12(a) | 177 | 1.18 |
| Example 7 | VdF/TFE/HFP (48/43/9) | 1.375 | 14 | PBT Resin | 430 | 25/75 | 47 | 199 | 230 | PA12(a) | 177 | 1.18 |
| Example 8 | VdF/TFE/HFP (48/43/9) | 1.375 | 14 | PBT Resin | 430 | 10/90 | 30 | 150 | 25 | PA12(a) | 177 | 1.18 |
| Example 9 | VdF/TFE/HFP (48/43/9) | 1.375 | 14 | PBT Resin | 430 | 15/85 | 38 | 155 | 23 | PA12(a) | 177 | 1.18 |
| Example 10 | VdF/TFE/HFP (48/43/9) | 1.375 | 14 | PBT Resin: Hytrel4047 | 430 | 17/83 | 40 | 182 | 23 | PA12(a) | 177 | 1.18 |
| Example 11 | VdF/TFE/HFP (48/43/9) | 1.375 | 14 | PBT Resin | 430 | 30/70 | 65 | 205 | 25 | PA12(a) | 177 | 1.18 |
| Example 12 | VdF/TFE/HFP (48/43/9) | 1.375 | 14 | PBT Resin | 430 | 37/63 | 70 | 210 | 24 | PA12(a) | 177 | 1.18 |
| Example 13 | VdF/TFE/HFP (48/43/9) | 1.375 | 14 | PBT Resin: Hytrel4767 | 430 | 25/75 | 47 | 199 | 22 | PA11 | 185 | 0.95 |
| Comparative Example 3 | VdF/TFE/HFP (48/43/9) | 1.375 | 14 | PBT Resin: Hytrel4767 | 430 | 25/75 | 47 | 199 | 22 | PA12(b) | 180 | 1.69 |
| Comparative Example 4 | VdF/TFE/HFP (48/43/9) | 1.375 | 14 | PBT Resin: Hytrel4767 | 430 | 25/75 | 47 | 199 | 22 | PA12(a) | 177 | −1.18 |
| Comparative Example 5 | VdF/TFE/HFP (48/43/9) | 1.375 | 14 | PBT Resin: Hytrel4767 | 430 | 25/75 | 47 | 199 | 22 | PA12(a) | 177 | 1.18 |
| Example 14 | VdF/TFE/HFP (40/40/20) | 1.365 | <5 | PBT Resin: Hytrel4767 | 430 | 25/75 | 47 | 199 | 22 | PA12(a) | 177 | 1.18 |
| Example 15 | VdF/TFE/HFP/ PFPVE (21/55/18/6) | 1.375 | 8 | PBT Resin: Hytrel4767 | 430 | 25/75 | 47 | 199 | 22 | PA12(a) | 177 | 1.18 |
| Comparative Example 6 | VdF/TFE (80/20) | 1.402 | 60 | PBT Resin: Hytrel4767 | 430 | 25/75 | 47 | 199 | 22 | PA12(a) | 177 | 1.18 |

TABLE 1-2

| | Functional Coating Layer | | | | | | | | | | |
|---|---|---|---|---|---|---|---|---|---|---|---|
| | (Resin: | Flame Retardant: | Flame Retardant Auxiliary: | Colorant) | | Mixing Ratio (mass %) | | | | Melting Point (° C.) | Bromine Atom Content (mass %) | Molecular Weight of Flame Retardant | 1% Mass Loss Temperature of Flame Retardant |
| Reference Example 1 | —: | —: | —: | — | = | —: | —: | —: | — | — | — | — | — |
| Example 1 | PA6: | BrPS: | AnOx: | Ultramarine Blue | = | 83.5: | 10.0: | 5.0: | 1.5 | 220 | 6.9 | 50,000 | 342 |
| Example 2 | PA6: | MCN: | —: | Ultramarine Blue | = | 83.5: | 15.0: | 0.0: | 1.5 | 220 | — | — | 310 |
| Comparative Example 1 | PA6: | BrPS: | AnOx: | Ultramarine Blue | = | 83.5: | 10.0: | 5.0: | 1.5 | 220 | 6.9 | 50,000 | 342 |
| Comparative Example 2 | PA6: | MCN: | —: | Ultramarine Blue | = | 83.5: | 15.0: | 0.0: | 1.5 | 220 | — | — | 310 |
| Example 3 | PA6: | BrPS: | AnOx: | Ultramarine Blue | = | 83.5: | 10.0: | 5.0: | 1.5 | 220 | 6.9 | 50,000 | 342 |
| Example 4 | PA6: | BrPS: | AnOx: | Ultramarine Blue | = | 83.5: | 10.0: | 5.0: | 1.5 | 220 | 6.9 | 50,000 | 342 |
| Example 5 | PA6: | BrPS: | AnOx: | Ultramarine Blue | = | 83.5: | 10.0: | 5.0: | 1.5 | 220 | 6.9 | 50,000 | 342 |

TABLE 1-2-continued

| | (Resin: | Flame Retardant: | Flame Retardant Auxiliary: | Colorant) | Mixing Ratio (mass %) | | | | Melting Point (° C.) | Bromine Atom Content (mass %) | Molecular Weight of Flame Retardant | 1% Mass Loss Temperature of Flame Retardant |
|---|---|---|---|---|---|---|---|---|---|---|---|---|
| Example 6 | PA6: | BrPS: | AnOx: | Ultramarine Blue = | 83.5: | 10.0: | 5.0: | 1.5 | 220 | 6.9 | 50,000 | 342 |
| Example 7 | PA6: | BrPS: | AnOx: | Ultramarine Blue = | 83.5: | 10.0: | 5.0: | 1.5 | 220 | 6.9 | 50,000 | 342 |
| Example 8 | PA6: | BrPS: | AnOx: | Ultramarine Blue = | 83.5: | 10.0: | 5.0: | 1.5 | 220 | 6.9 | 50,000 | 342 |
| Example 9 | PA6: | BrPS: | AnOx: | Ultramarine Blue = | 83.5: | 10.0: | 5.0: | 1.5 | 220 | 6.9 | 50,000 | 342 |
| Example 10 | PA6: | BrPS: | AnOx: | Ultramarine Blue = | 83.5: | 10.0: | 5.0: | 1.5 | 220 | 6.9 | 50,000 | 342 |
| Example 11 | PA6: | BrPS: | AnOx: | Ultramarine Blue = | 83.5: | 10.0: | 5.0: | 1.5 | 220 | 6.9 | 50,000 | 342 |
| Example 12 | PA6: | BrPS: | AnOx: | Ultramarine Blue = | 83.5: | 10.0: | 5.0: | 1.5 | 220 | 6.9 | 50,000 | 342 |
| Example 13 | PA6: | BrPS: | AnOx: | Ultramarine Blue = | 83.5: | 10.0: | 5.0: | 1.5 | 220 | 6.9 | 50,000 | 342 |
| Comparative Example 3 | PA6: | BrPS: | AnOx: | Ultramarine Blue = | 83.5: | 10.0: | 5.0: | 1.5 | 220 | 6.9 | 50,000 | 342 |
| Comparative Example 4 | PA12(a): | —: | —: | — = | 100.0: | 0.0: | 0.0: | 0.0 | 177 | — | — | — |
| Comparative Example 5 | PA6-12: | —: | —: | — = | 100.0: | 0.0: | 0.0: | 0.0 | 160 | — | — | — |
| Example 14 | PA6: | BrPS: | AnOx: | Ultramarine Blue = | 83.0: | 10.0: | 5.0: | 2.0 | 220 | 6.9 | 50,000 | 342 |
| Example 15 | PA6: | BrPS: | AnOx: | Ultramarine Blue = | 83.0: | 10.0: | 5.0: | 2.0 | 220 | 6.9 | 50,000 | 342 |
| Comparative Example 6 | PA6: | BrPS: | AnOx: | Ultramarine Blue = | 83.0: | 10.0: | 5.0: | 2.0 | 220 | 6.9 | 50,000 | 342 |

TABLE 2

| | Transmission Loss (dB/km) | | Pullout Strength (N/30 mm) | Cross Section of Primary Cable |
|---|---|---|---|---|
| | Initial | 105° C., 5000 hours | | |
| Reference Example 1 | 135 | 185 | 46 | Good |
| Example 1 | 135 | 200 | 46 | Good |
| Example 2 | 135 | 198 | 46 | Good |
| Comparative Example 1 | 133 | >1000 | 35 | Good |
| Comparative Example 2 | 133 | >1000 | 35 | Good |
| Example 3 | 132 | 190 | 42 | Good |
| Example 4 | 143 | 245 | 35 | Protective Coating Layer with Uneven Thickness |
| Example 5 | 139 | 186 | 45 | Good |
| Example 6 | 135 | 205 | 51 | Good |
| Example 7 | 133 | 250 | 48 | Protective Coating Layer with Uneven Thickness |
| Example 8 | 132 | 186 | 52 | Good |
| Example 9 | 133 | 188 | 49 | Good |
| Example 10 | 131 | 200 | 47 | Good |
| Example 11 | 131 | 202 | 40 | Good |
| Example 12 | 145 | 210 | 35 | Protective Coating Layer with Uneven Thickness |
| Example 13 | 135 | 180 | 43 | Good |
| Comparative Example 3 | 134 | 850 | 46 | Good |
| Comparative Example 4 | 133 | >1000 | 42 | Good |
| Comparative Example 5 | 133 | >1000 | 42 | Good |
| Example 14 | 131 | 198 | 46 | Good |
| Example 15 | 131 | 199 | 41 | Good |
| Comparative Example 6 | 133 | >1000 | 35 | Good |

TABLE 3

| | Cable Dimensions | | | | | Transmission Loss (dB/km) | | Pullout Strength (N/30 mm) |
|---|---|---|---|---|---|---|---|---|
| | Protective Coating Layer Thickness a | Light Blocking Coating Layer Thickness b | Functional Coating Layer Thickness c | b/a | (b + c)/a | Initial | 105° C., 5000 hours | |
| Example 16 | 7 μm | 243 μm | 400 μm | 34.71 | 91.86 | 134 | 300 | 51 |
| Example 17 | 10 μm | 240 μm | 400 μm | 24.00 | 64.00 | 130 | 260 | 49 |
| Example 1 | 40 μm | 210 μm | 400 μm | 5.25 | 15.25 | 135 | 200 | 46 |
| Example 18 | 50 μm | 200 μm | 400 μm | 4.00 | 12.00 | 134 | 195 | 44 |
| Example 3 | 80 μm | 170 μm | 400 μm | 2.13 | 7.13 | 130 | 190 | 42 |

TABLE 3-continued

| | Cable Dimensions | | | | | Transmission Loss (dB/km) | | Pullout Strength |
|---|---|---|---|---|---|---|---|---|
| | Protective Coating Layer Thickness a | Light Blocking Coating Layer Thickness b | Functional Coating Layer Thickness c | b/a | (b + c)/a | Initial | 105° C., 5000 hours | (N/30 mm) |
| Example 19 | 100 μm | 150 μm | 400 μm | 1.50 | 5.50 | 131 | 185 | 40 |
| Example 20 | 120 μm | 130 μm | 400 μm | 1.08 | 4.42 | 134 | 180 | 38 |

TABLE 4-1

| | | | | | Functional Coating Layer | | | | | | | |
|---|---|---|---|---|---|---|---|---|---|---|---|---|
| | Resin: | Flame Retardant: | Flame Retardant Auxiliary: | Colorant | | Mixing Ratio (mass %) | | | | Melting Point (° C.) | Bromine Atom Content (mass %) | Molecular Weight of Flame Retardant | 1% Mass Loss Temperature of Flame Retardant |
| Example 21 | PA6: | MCN: | —: | Ultramarine Blue | = | 96.5: | 3.0: | 0.0: | 1.5 | 220 | — | — | 310 |
| Example 22 | PA6: | MCN: | —: | Ultramarine Blue | = | 93.5: | 5.0: | 0.0: | 1.5 | 220 | — | — | 310 |
| Example 23 | PA6: | MCN: | —: | Ultramarine Blue | = | 85.5: | 13.0: | 0.0: | 1.5 | 220 | — | — | 310 |
| Example 24 | PA6: | MCN: | —: | Ultramarine Blue | = | 61.5: | 37.0: | 0.0: | 1.5 | 220 | — | — | 310 |
| Example 25 | PA6: | MCN: | —: | Ultramarine Blue | = | 55.5: | 43.0: | 0.0: | 1.5 | 220 | — | — | 310 |
| Example 26 | PA6: | BrPS: | AnOx: | Ultramarine Blue | = | 95.5: | 2.0: | 1.0: | 1.5 | 220 | 1.4 | 50,000 | 342 |
| Example 27 | PA6: | BrPS: | AnOx: | Ultramarine Blue | = | 83.5: | 10.0: | 5.0: | 1.5 | 220 | 6.9 | 50,000 | 342 |
| Example 28 | PA6: | BrPS: | AnOx: | Ultramarine Blue | = | 68.5: | 20.0: | 10.0: | 1.5 | 220 | 13.7 | 50,000 | 342 |
| Example 29 | PA6: | BrPS: | AnOx: | Ultramarine Blue | = | 56.0: | 30.0: | 12.5: | 1.5 | 220 | 20.6 | 50,000 | 342 |
| Example 30 | PA6: | BrPS: | AnOx: | Ultramarine Blue | = | 43.5: | 40.0: | 15.0: | 1.5 | 220 | 27.4 | 50,000 | 342 |
| Example 31 | PA6: | BrPS: | AnOx: | Ultramarine Blue | = | 35.5: | 46.0: | 17.0: | 1.5 | 220 | 31.5 | 50,000 | 342 |
| Example 32 | PA6: | BrPS: | AnOx: | Ultramarine Blue | = | 83.5: | 10.0: | 5.0: | 1.5 | 220 | 6.9 | 50,000 | 290 |
| Example 33 | PA6: | BrPS: | AnOx: | Iron Blue | = | 83.5: | 10.0: | 5.0: | 1.5 | 220 | 6.9 | 50,000 | 342 |
| Example 34 | PA6: | BrPS: | AnOx: | Iron Oxide | = | 83.5: | 10.0: | 5.0: | 1.5 | 220 | 6.9 | 50,000 | 342 |
| Example 35 | PA6: | BrPS: | AnOx: | Bengal Red | = | 83.5: | 10.0: | 5.0: | 1.5 | 220 | 6.9 | 50,000 | 342 |
| Example 36 | PA6: | BrPS: | AnOx: | Cerium Sulfide | = | 83.5: | 10.0: | 5.0: | 1.5 | 220 | 6.9 | 50,000 | 342 |
| Example 37 | PA6: | BrPS: | AnOx: | Titanium Oxide | = | 83.5: | 10.0: | 5.0: | 1.5 | 220 | 6.9 | 50,000 | 342 |
| Example 38 | PA6: | BrPS: | AnOx: | CB | = | 83.5: | 10.0: | 5.0: | 1.5 | 220 | 6.9 | 50,000 | 342 |
| Comparative Example 7 | PA6: | BrPS: | AnOx: | PhCy | = | 84.0: | 10.0: | 5.0: | 1.0 | 220 | 6.9 | 50,000 | 342 |
| Comparative Example 8 | PA6: | BrPS: | AnOx: | PL | = | 84.0: | 10.0: | 5.0: | 1.0 | 220 | 6.9 | 50,000 | 342 |
| Comparative Example 9 | PA6: | BrPS: | AnOx: | AQ | = | 84.0: | 10.0: | 5.0: | 1.0 | 220 | 6.9 | 50,000 | 342 |
| Comparative Example 10 | PA6: | BrPS: | AnOx: | BI | = | 84.0: | 10.0: | 5.0: | 1.0 | 220 | 6.9 | 50,000 | 342 |
| Example 39 | PA6: | BrPS: | AnOx: | Ultramarine Blue | = | 83.5: | 10.0: | 5.0: | 1.5 | 220 | 6.9 | 800 | 342 |
| Example 40 | PA6: | BrPS: | AnOx: | Ultramarine Blue | = | 83.5: | 10.0: | 5.0: | 1.5 | 220 | 6.9 | 900 | 341 |
| Example 41 | PA6: | BrPS: | AnOx: | Ultramarine Blue | = | 83.5: | 10.0: | 5.0: | 1.5 | 220 | 6.9 | 10,000 | 343 |
| Example 42 | PA6: | BrPS: | AnOx: | Ultramarine Blue | = | 83.5: | 10.0: | 5.0: | 1.5 | 220 | 6.9 | 60,000 | 345 |
| Example 43 | PA6: | BrPS: | AnOx: | Ultramarine Blue | = | 83.5: | 10.0: | 5.0: | 1.5 | 220 | 6.9 | 70,000 | 342 |
| Example 44 | PA6: | TBA-PC: | AnOx: | Bengal Red | = | 83.5: | 10.0: | 5.0: | 1.5 | 220 | 6.9 | 800 | 320 |
| Example 45 | PA6: | TBA-PC: | AnOx: | Bengal Red | = | 83.5: | 10.0: | 5.0: | 1.5 | 220 | 6.9 | 900 | 321 |
| Example 46 | PA6: | TBA-PC: | AnOx: | Bengal Red | = | 83.5: | 10.0: | 5.0: | 1.5 | 220 | 6.9 | 2,100 | 323 |
| Example 47 | PA6: | TBA-PC: | AnOx: | Bengal Red | = | 83.5: | 10.0: | 5.0: | 1.5 | 220 | 6.9 | 4,200 | 325 |
| Example 48 | PA6: | TBA-PC: | AnOx: | Bengal Red | = | 83.5: | 10.0: | 5.0: | 1.5 | 220 | 6.9 | 4,180 | 280 |
| Example 49 | PA6: | TBA-PC: | AnOx: | Bengal Red | = | 83.5: | 10.0: | 5.0: | 1.5 | 220 | 6.9 | 5,300 | 320 |
| Example 50 | PA6: | PDBS: | AnOx: | Iron Blue | = | 83.5: | 10.0: | 5.0: | 1.5 | 220 | 5.9 | 800 | 332 |
| Example 51 | PA6: | PDBS: | AnOx: | Iron Blue | = | 83.5: | 10.0: | 5.0: | 1.5 | 220 | 5.9 | 2,300 | 334 |
| Example 52 | PA6: | PDBS: | AnOx: | Iron Blue | = | 83.5: | 10.0: | 5.0: | 1.5 | 220 | 5.9 | 49,000 | 336 |

TABLE 4-1-continued

| | | | | | Functional Coating Layer | | | | | | |
|---|---|---|---|---|---|---|---|---|---|---|---|
| | Resin: | Flame Retardant: | Flame Retardant Auxiliary: | Colorant | | Mixing Ratio (mass %) | | | Melting Point (° C.) | Bromine Atom Content (mass %) | Molecular Weight of Flame Retardant | 1% Mass Loss Temperature of Flame Retardant |
| Example 53 | PA6: | PDBS: | AnOx: | Iron Blue | = | 83.5: 10.0: 5.0: 1.5 | | | 220 | 5.9 | 48,500 | 285 |
| Example 54 | PA6: | PDBS: | AnOx: | Iron Blue | = | 83.5: 10.0: 5.0: 1.5 | | | 220 | 5.9 | 80,000 | 334 |

TABLE 4-2

| | Transmission Loss (dB/km) | | Surface Appearance of Secondary Cable | Flexural Modulus of Secondary Cable | | Flame Resistance | |
|---|---|---|---|---|---|---|---|
| | Initial | 105° C., 5000 hours | | Rating | Flexural Modulus (N/mm) | Rating | Extinction within 30 s (Passed/Examined) |
| Example 21 | 135 | 185 | ◉ | ◉ | 14 | Δ | 4/10 |
| Example 22 | 135 | 190 | ◉ | ◉ | 16 | Δ | 7/10 |
| Example 23 | 135 | 195 | ◉ | ○ | 19 | ○ | 9/10 |
| Example 24 | 133 | 205 | ○ | Δ | 23 | ○ | 10/10 |
| Example 25 | 131 | 215 | Δ | Δ | 25 | ○ | 10/10 |
| Example 26 | 136 | 181 | ◉ | ◉ | 13 | Δ | 3/10 |
| Example 27 | 131 | 185 | ◉ | ◉ | 16 | ○ | 8/10 |
| Example 28 | 131 | 182 | ◉ | ○ | 18 | ○ | 9/10 |
| Example 29 | 131 | 191 | ○ | Δ | 24 | ○ | 10/10 |
| Example 30 | 132 | 185 | ○ | Δ | 26 | ○ | 10/10 |
| Example 31 | 133 | 187 | Δ | Δ | 28 | ○ | 10/10 |
| Example 32 | 136 | 250 | ◉ | ◉ | 16 | Δ | 7/10 |
| Example 33 | 135 | 183 | ◉ | ◉ | 16 | ○ | 8/10 |
| Example 34 | 133 | 186 | ◉ | ◉ | 15 | ○ | 8/10 |
| Example 35 | 131 | 193 | ◉ | ◉ | 16 | ○ | 8/10 |
| Example 36 | 131 | 187 | ◉ | ◉ | 15 | ○ | 8/10 |
| Example 37 | 131 | 197 | ◉ | ◉ | 15 | ○ | 8/10 |
| Example 38 | 134 | 195 | ◉ | ◉ | 16 | ○ | 8/10 |
| Comparative Example 7 | 133 | >1000 | ◉ | ◉ | 15 | ○ | 8/10 |
| Comparative Example 8 | 136 | >1000 | ◉ | ◉ | 15 | ○ | 8/10 |
| Comparative Example 9 | 136 | >1000 | ◉ | ◉ | 16 | ○ | 8/10 |
| Comparative Example 10 | 133 | >1000 | ◉ | ◉ | 15 | ○ | 8/10 |
| Example 39 | 135 | 250 | ◉ | ◉ | 15 | ○ | 8/10 |
| Example 40 | 132 | 210 | ◉ | ◉ | 15 | ○ | 8/10 |
| Example 41 | 132 | 200 | ○ | ○ | 19 | ○ | 8/10 |
| Example 42 | 133 | 190 | ○ | ○ | 20 | ○ | 8/10 |
| Example 43 | 132 | 188 | Δ | Δ | 22 | ○ | 8/10 |
| Example 44 | 136 | 246 | ◉ | ◉ | 15 | Δ | 7/10 |
| Example 45 | 134 | 212 | ◉ | ◉ | 15 | ○ | 8/10 |
| Example 46 | 134 | 205 | ◉ | ◉ | 16 | ○ | 9/10 |
| Example 47 | 134 | 200 | ◉ | ○ | 18 | ○ | 10/10 |
| Example 48 | 133 | 260 | ◉ | ○ | 18 | Δ | 7/10 |
| Example 49 | 134 | 190 | ○ | ○ | 20 | ○ | 8/10 |
| Example 50 | 133 | 245 | ◉ | ◉ | 15 | Δ | 7/10 |
| Example 51 | 136 | 205 | ◉ | ◉ | 15 | ○ | 8/10 |
| Example 52 | 134 | 198 | ○ | ○ | 19 | ○ | 10/10 |
| Example 53 | 132 | 270 | ○ | ○ | 19 | Δ | 7/10 |
| Example 54 | 134 | 188 | Δ | Δ | 21 | ○ | 8/10 |

TABLE 5-1

| | | | | | Functional Coating Layer | | | | | | |
|---|---|---|---|---|---|---|---|---|---|---|---|
| | Resin: | Flame Retardant: | Flame Retardant Auxiliary: | Colorant | | Mixing Ratio (mass %) | | | Melting Point (° C.) | Bromine Atom Content (mass %) | Molecular Weight of Flame Retardant | 1% Mass Loss Temperature of Flame Retardant |
| Example 55 | PA6: | PPBBA: | AnOx: | Ultramarine Blue | = | 81.0: 12.5: 5.0: 1.5 | | | 220 | 9.0 | 800 | 310 |
| Example 56 | PA6: | PPBBA: | AnOx: | Ultramarine Blue | = | 81.0: 12.5: 5.0: 1.5 | | | 220 | 9.0 | 2,050 | 312 |
| Example 57 | PA6: | PPBBA: | AnOx: | Ultramarine Blue | = | 81.0: 12.5: 5.0: 1.5 | | | 220 | 9.0 | 40,300 | 310 |
| Example 58 | PA6: | PPBBA: | AnOx: | Ultramarine Blue | = | 81.0: 12.5: 5.0: 1.5 | | | 220 | 9.0 | 40,500 | 260 |

TABLE 5-1-continued

| | | | | | Functional Coating Layer | | | | | | | | |
|---|---|---|---|---|---|---|---|---|---|---|---|---|---|
| | Resin: | Flame Retardant: | Flame Retardant Auxiliary: | Colorant | | Mixing Ratio (mass %) | | | | Melting Point (°C.) | Bromine Atom Content (mass %) | Molecular Weight of Flame Retardant | 1% Mass Loss Temperature of Flame Retardant |
| Example 59 | PA6: | PPBBA: | AnOx: | Ultramarine Blue | = | 81.0: | 12.5: | 5.0: | 1.5 | 220 | 9.0 | 71,000 | 310 |
| Example 60 | PA66: | BrPS: | AnOx: | Ultramarine Blue | = | 95.5: | 2.0: | 1.0: | 1.5 | 265 | 1.4 | 50,000 | 342 |
| Example 61 | PA66: | BrPS: | AnOx: | Ultramarine Blue | = | 83.5: | 10.0: | 5.0: | 1.5 | 265 | 6.9 | 50,000 | 342 |
| Example 62 | PA66: | BrPS: | AnOx: | Ultramarine Blue | = | 68.5: | 20.0: | 10.0: | 1.5 | 265 | 13.7 | 50,000 | 342 |
| Example 63 | PA66: | BrPS: | AnOx: | Ultramarine Blue | = | 58.5: | 30.0: | 10.0: | 1.5 | 265 | 20.6 | 50,000 | 342 |
| Example 64 | PA66: | BrPS: | AnOx: | Ultramarine Blue | = | 43.5: | 40.0: | 15.0: | 1.5 | 265 | 27.4 | 50,000 | 342 |
| Example 65 | PA66: | BrPS: | AnOx: | Ultramarine Blue | = | 35.5: | 46.0: | 17.0: | 1.5 | 265 | 31.5 | 50,000 | 342 |
| Example 66 | PA66: | BrPS: | AnOx: | Iron Blue | = | 83.5: | 10.0: | 5.0: | 1.5 | 265 | 6.9 | 50,000 | 342 |
| Example 67 | PA66: | BrPS: | AnOx: | Iron Oxide | = | 83.5: | 10.0: | 5.0: | 1.5 | 265 | 6.9 | 50,000 | 342 |
| Example 68 | PA66: | BrPS: | AnOx: | Bengal Red | = | 83.5: | 10.0: | 5.0: | 1.5 | 265 | 6.9 | 50,000 | 342 |
| Example 69 | PA66: | BrPS: | AnOx: | Cerium Sulfide | = | 83.5: | 10.0: | 5.0: | 1.5 | 265 | 6.9 | 50,000 | 342 |
| Example 70 | PA66: | BrPS: | AnOx: | Titanium Oxide | = | 83.5: | 10.0: | 5.0: | 1.5 | 265 | 6.9 | 50,000 | 342 |
| Example 71 | PA66: | BrPS: | AnOx: | CB | = | 83.5: | 10.0: | 5.0: | 1.5 | 265 | 6.9 | 50,000 | 342 |
| Comparative Example 11 | PA66: | BrPS: | AnOx: | PhCy | = | 84.0: | 10.0: | 5.0: | 1.0 | 265 | 6.9 | 50,000 | 342 |
| Comparative Example 12 | PA66: | BrPS: | AnOx: | PL | = | 84.0: | 10.0: | 5.0: | 1.0 | 265 | 6.9 | 50,000 | 342 |
| Comparative Example 13 | PA66: | BrPS: | AnOx: | AQ | = | 84.0: | 10.0: | 5.0: | 1.0 | 265 | 6.9 | 50,000 | 342 |
| Comparative Example 14 | PA66: | BrPS: | AnOx: | BI | = | 84.0: | 10.0: | 5.0: | 1.0 | 265 | 6.9 | 50,000 | 342 |
| Example 72 | PA66: | BrPS: | AnOx: | Ultramarine Blue | = | 83.5: | 10.0: | 5.0: | 1.5 | 265 | 6.9 | 800 | 342 |
| Example 73 | PA66: | BrPS: | AnOx: | Ultramarine Blue | = | 83.5: | 10.0: | 5.0: | 1.5 | 265 | 6.9 | 900 | 341 |
| Example 74 | PA66: | BrPS: | AnOx: | Ultramarine Blue | = | 83.5: | 10.0: | 5.0: | 1.5 | 266 | 6.9 | 10,000 | 343 |
| Example 75 | PA66: | BrPS: | AnOx: | Ultramarine Blue | = | 83.5: | 10.0: | 5.0: | 1.5 | 265 | 6.9 | 60,000 | 345 |
| Example 76 | PA66: | BrPS: | AnOx: | Ultramarine Blue | = | 83.5: | 10.0: | 5.0: | 1.5 | 265 | 6.9 | 70,000 | 342 |
| Example 77 | PA66: | TBA-PC: | AnOx: | Bengal Red | = | 83.5: | 10.0: | 5.0: | 1.5 | 265 | 6.9 | 800 | 320 |
| Example 78 | PA66: | TBA-PC: | AnOx: | Bengal Red | = | 83.5: | 10.0: | 5.0: | 1.5 | 265 | 6.9 | 900 | 321 |
| Example 79 | PA66: | TBA-PC: | AnOx: | Bengal Red | = | 83.5: | 10.0: | 5.0: | 1.5 | 265 | 6.9 | 2,100 | 323 |
| Example 80 | PA66: | TBA-PC: | AnOx: | Bengal Red | = | 83.5: | 10.0: | 5.0: | 1.5 | 265 | 6.9 | 4,200 | 325 |
| Example 81 | PA66: | TBA-PC: | AnOx: | Bengal Red | = | 83.5: | 10.0: | 5.0: | 1.5 | 265 | 6.9 | 5,300 | 320 |
| Example 82 | PA66: | PDBS: | AnOx: | Iron Blue | = | 83.5: | 10.0: | 5.0: | 1.5 | 265 | 5.9 | 800 | 332 |
| Example 83 | PA66: | PDBS: | AnOx: | Iron Blue | = | 83.5: | 10.0: | 5.0: | 1.5 | 265 | 5.9 | 2,300 | 334 |
| Example 84 | PA66: | PDBS: | AnOx: | Iron Blue | = | 83.5: | 10.0: | 5.0: | 1.5 | 265 | 5.9 | 49,000 | 336 |
| Example 85 | PA66: | PDBS: | AnOx: | Iron Blue | = | 83.5: | 10.0: | 5.0: | 1.5 | 265 | 5.9 | 80,000 | 334 |
| Example 86 | PA66: | PPBBA: | AnOx: | Ultramarine Blue | = | 81.0: | 12.5: | 5.0: | 1.5 | 265 | 9.0 | 800 | 310 |
| Example 87 | PA66: | PPBBA: | AnOx: | Ultramarine Blue | = | 81.0: | 12.5: | 5.0: | 1.5 | 265 | 9.0 | 2,050 | 312 |
| Example 88 | PA66: | PPBBA: | AnOx: | Ultramarine Blue | = | 81.0: | 12.5: | 5.0: | 1.5 | 265 | 9.0 | 40,300 | 310 |
| Example 89 | PA66: | PPBBA: | AnOx: | Ultramarine Blue | = | 81.0: | 12.5: | 5.0: | 1.5 | 265 | 9.0 | 71,000 | 310 |

TABLE 5-2

| | Transmission Loss (dB/km) | | Surface Appearance of Secondary Cable | Flexural Modulus of Secondary Cable | | Flame Resistance | |
|---|---|---|---|---|---|---|---|
| | Initial | 105° C., 5000 hours | | Rating | Flexural Modulus (N/mm) | Rating | Extinction within 30 s (Passed/Examined) |
| Example 55 | 135 | 245 | ◎ | ◎ | 15 | Δ | 7/10 |
| Example 56 | 135 | 206 | ◎ | ◎ | 16 | ○ | 8/10 |
| Example 57 | 132 | 195 | ○ | ○ | 19 | ○ | 10/10 |
| Example 58 | 134 | 280 | ○ | ○ | 19 | Δ | 7/10 |
| Example 59 | 133 | 190 | Δ | Δ | 21 | ○ | 8/10 |
| Example 60 | 133 | 190 | ◎ | ◎ | 13 | Δ | 4/10 |
| Example 61 | 132 | 187 | ◎ | ◎ | 16 | ○ | 8/10 |
| Example 62 | 135 | 188 | ◎ | ○ | 18 | ○ | 10/10 |
| Example 63 | 134 | 194 | ○ | Δ | 22 | ○ | 10/10 |
| Example 64 | 132 | 190 | ○ | Δ | 24 | ○ | 10/10 |
| Example 65 | 134 | 186 | Δ | Δ | 26 | ○ | 10/10 |
| Example 66 | 136 | 183 | ◎ | ◎ | 16 | ○ | 8/10 |
| Example 67 | 134 | 187 | ◎ | ◎ | 16 | ○ | 8/10 |
| Example 68 | 134 | 192 | ◎ | ◎ | 16 | ○ | 8/10 |
| Example 69 | 133 | 185 | ◎ | ◎ | 16 | ○ | 8/10 |
| Example 70 | 132 | 184 | ◎ | ◎ | 16 | ○ | 8/10 |
| Example 71 | 133 | 193 | ◎ | ◎ | 16 | ○ | 8/10 |
| Comparative Example 11 | 134 | >1000 | ◎ | ◎ | 16 | ○ | 8/10 |
| Comparative Example 12 | 134 | >1000 | ◎ | ◎ | 16 | ○ | 8/10 |

TABLE 5-2-continued

|  | Transmission Loss (dB/km) | | Surface Appearance of Secondary Cable | Flexural Modulus of Secondary Cable | | Flame Resistance | |
|---|---|---|---|---|---|---|---|
|  | Initial | 105° C., 5000 hours |  | Rating | Flexural Modulus (N/mm) | Rating | Extinction within 30 s (Passed/Examined) |
| Comparative Example 13 | 134 | >1000 | ◎ | ◎ | 16 | ○ | 8/10 |
| Comparative Example 14 | 135 | >1000 | ◎ | ◎ | 16 | ○ | 8/10 |
| Example 72 | 134 | 247 | ◎ | ◎ | 14 | Δ | 7/10 |
| Example 73 | 133 | 206 | ◎ | ◎ | 15 | ○ | 8/10 |
| Example 74 | 134 | 199 | ○ | ○ | 18 | ○ | 10/10 |
| Example 75 | 136 | 192 | ○ | ○ | 19 | ○ | 10/10 |
| Example 76 | 132 | 185 | Δ | Δ | 21 | ○ | 8/10 |
| Example 77 | 131 | 240 | ◎ | ◎ | 14 | Δ | 7/10 |
| Example 78 | 133 | 210 | ◎ | ◎ | 15 | ○ | 8/10 |
| Example 79 | 133 | 200 | ◎ | ○ | 17 | ○ | 10/10 |
| Example 80 | 135 | 196 | ◎ | ○ | 18 | ○ | 10/10 |
| Example 81 | 133 | 190 | ○ | ○ | 19 | ○ | 10/10 |
| Example 82 | 134 | 245 | ◎ | ◎ | 14 | Δ | 7/10 |
| Example 83 | 136 | 206 | ◎ | ◎ | 15 | ○ | 9/10 |
| Example 84 | 135 | 199 | ○ | ○ | 19 | ○ | 10/10 |
| Example 85 | 132 | 195 | Δ | Δ | 21 | ○ | 8/10 |
| Example 86 | 133 | 245 | ◎ | ◎ | 14 | Δ | 7/10 |
| Example 87 | 131 | 206 | ◎ | ◎ | 15 | ○ | 9/10 |
| Example 88 | 133 | 200 | ○ | ○ | 19 | ○ | 10/10 |
| Example 89 | 134 | 195 | Δ | Δ | 21 | ○ | 8/10 |

TABLE 6

|  | Core | First Cladding Composition (mass %) | Refractive Index | Second Cladding Composition (mass %) | Refractive Index | ΔH (mJ/mg) |
|---|---|---|---|---|---|---|
| POF(A) | PMMA | 3FM/17FM/MMA/MAA (51/31/17/1) | 1.417 | VdF/TFE/HFP (48/43/9) | 1.375 | 14 |
| POF(B) | PMMA | 3FM/17FM/MMA/MAA (30/50/19/1) | 1.417 | VdF/TFE/HFP (40/40/20) | 1.365 | <5 |
| POF(C) | PMMA | 3FM/17FM/MMA/MAA (30/50/19/1) | 1.417 | VdF/TFE/HFP/PFPVE (21/55/18/6) | 1.375 | 8 |
| POF(D) | PMMA | 3FM/17FM/MMA/MAA (51/31/17/1) | 1.417 | VdF/TFE (80/20) | 1.402 | 60 |

TABLE 7

|  | Bare POF | Protective Coating Layer Material | Light Blocking Coating Layer Nylon | Low Molecular Weight Content | Functional Coating Layer Composition (wt %) | | |
|---|---|---|---|---|---|---|---|
| Reference Example 2 | POF(A) | — | PA12(a) | 1.18% | — | : — | : — |
| Reference Example 3 | POF(A) | PBT Resin | PA12(a) | 1.18% | — | : — | : — |
| Example 90 | POF(A) | PBT Resin | PA12(a) | 1.18% | PA66 | : — | : — |
| Example 91 | POF(A) | PBT Resin | PA12(a) | 1.18% | PA66 | : — | : Ultramarine Blue |
| Example 92 | POF(A) | PBT Resin | PA12(a) | 1.18% | PA66 | : BrPS:AnOx | : — |
| Example 93 | POF(A) | PBT Resin | PA12(a) | 1.18% | PA66 | : BrPS:AnOx | : Ultramarine Blue |
| Example 94 | POF(A) | PBT Resin | PA11 | 0.95% | PA66 | : Aluminum Oxide | : — |
| Example 95 | POF(A) | PBT Resin | PA11 | 0.95% | PA66 | : Talc | : Bengal Red |
| Example 96 | POF(A) | PSt Resin | PA12(a) | 1.18% | PA66 | : BrPS:AnOx | : Ultramarine Blue |
| Example 97 | POF(A) | Acrylic Resin | PA12(a) | 1.18% | PA66 | : BrPS:AnOx | : Iron Blue |
| Example 98 | POF(A) | PVdF | PA12(a) | 1.18% | PA66 | : BrPS:AnOx | : Ultramarine Blue |
| Example 99 | POF(A) | EVAL Resin | PA12(a) | 1.18% | PA66 | : BrPS:AnOx | : Ultramarine Blue |
| Example 100 | POF(B) | PBT Resin | PA12(a) | 1.18% | PA66 | : BrPS:AnOx | : Bengal Red |
| Example 101 | POF(C) | PBT Resin | PA12(a) | 1.18% | PA66 | : BrPS:AnOx | : Yellow Iron Oxide |
| Example 102 | POF(A) | PBT Resin | PA11 | 0.95% | PA66 | : BrPS:AnOx | : Ultramarine Blue |
| Comparative Example 15 | POF(D) | PBT Resin | PA12(a) | 1.18% | PA66 | : BrPS:AnOx | : Ultramarine Blue |

TABLE 7-continued

| | | | | | | | |
|---|---|---|---|---|---|---|---|
| Comparative Example 16 | POF(A) | PBT Resin | PA12(b) | 1.69% | PA66 | : BrPS:AnOx | : Ultramarine Blue |
| Comparative Example 17 | POF(A) | — | PA12(a) | 1.18% | PA66 | : BrPS:AnOx | : Ultramarine Blue |
| Comparative Example 18 | POF(A) | PBT Resin | PA12(a) | 1.18% | PA66 | : BrPS:AnOx | : Phthalocyanine Compound |
| Comparative Example 19 | POF(A) | PBT Resin | PA12(a) | 1.18% | PA66 | : BrPS:AnOx | : Anthraquinone Compound |
| Comparative Example 20 | POF(A) | PBT Resin | PA12(a) | 1.18% | PA12(a) | : — | : — |
| Comparative Example 21 | POF(A) | PBT Resin | PA12(a) | 1.18% | PA12(a) | : BrPS:AnOx | : Ultramarine Blue |

| | Functional Coating Layer | | | | | |
|---|---|---|---|---|---|---|
| | Composition (wt %) | | | Melting Point (° C.) | Crystallinity (%) | Oxygen Transmission Rate $cm^3 \cdot cm/(cm^2 \cdot sec \cdot Pa)$ | Spherulite (μm) |
| Reference Example 2 | = — | : — | : — | — | — | — | — |
| Reference Example 3 | = — | : — | : — | — | — | — | — |
| Example 90 | = 100 | : — | : — | 265 | 31 | $3.4 \times 10^{-10}$ | 38 |
| Example 91 | = 98 | : — | : 2 | 265 | 33 | $2.9 \times 10^{-10}$ | 32 |
| Example 92 | = 85 | : 10:5 | : — | 265 | 40 | $2.8 \times 10^{-10}$ | 21 |
| Example 93 | = 83 | : 10:5 | : 2 | 265 | 45 | $1.5 \times 10^{-10}$ | 10 |
| Example 94 | = 98 | : 2 | : — | 265 | 34 | $2.6 \times 10^{-10}$ | 26 |
| Example 95 | = 94 | : 2 | : 4 | 265 | 38 | $2.2 \times 10^{-10}$ | 14 |
| Example 96 | = 83 | : 10:5 | : 2 | 265 | 45 | $1.5 \times 10^{-10}$ | 10 |
| Example 97 | = 80 | : 12:6 | : 2 | 265 | 48 | $1.1 \times 10^{-10}$ | 8 |
| Example 98 | = 86 | : 8:4 | : 2 | 265 | 40 | $1.9 \times 10^{-10}$ | 12 |
| Example 99 | = 77 | : 14:7 | : 2 | 265 | 50 | $0.8 \times 10^{-10}$ | 7 |
| Example 100 | = 68 | : 20:10 | : 2 | 265 | 54 | $0.1 \times 10^{-10}$ | 6 |
| Example 101 | = 68 | : 25:5 | : 2 | 265 | 54 | $0.1 \times 10^{-10}$ | 6 |
| Example 102 | = 77 | : 14:7 | : 2 | 265 | 50 | $0.8 \times 10^{-10}$ | 7 |
| Comparative Example 15 | = 83 | : 10:5 | : 2 | 265 | 45 | $1.5 \times 10^{-10}$ | 10 |
| Comparative Example 16 | = 83 | : 10:5 | : 2 | 265 | 45 | $1.5 \times 10^{-10}$ | 10 |
| Comparative Example 17 | = 83 | : 10:5 | : 2 | 265 | 45 | $1.5 \times 10^{-10}$ | 10 |
| Comparative Example 18 | = 83.5 | : 10:5 | : 0.5 | 265 | 43 | $2.8 \times 10^{-10}$ | 22 |
| Comparative Example 19 | = 83.5 | : 10:5 | : 0.5 | 265 | 44 | $2.8 \times 10^{-10}$ | 21 |
| Comparative Example 20 | = 100 | : — | : — | 265 | 28 | $45 \times 10^{-10}$ | — |
| Comparative Example 21 | = 83 | : 10:5 | : 2 | 265 | 42 | $30 \times 10^{-10}$ | — |

TABLE 8

| | Transmission Loss (dB/km) | | | | | |
|---|---|---|---|---|---|---|
| | 520 nm | | 570 nm | | 650 nm | |
| | Initial | 105° C. 5000 h | Initial | 105° C. 5000 h | Initial | 105° C. 5000 h |
| Reference Example 2 | 106 | >1000 | 80 | 980 | 134 | 560 |
| Reference Example 3 | 103 | >1000 | 85 | 460 | 134 | 185 |
| Example 90 | 110 | >1000 | 85 | 662 | 136 | 205 |
| Example 91 | 96 | >1000 | 85 | 506 | 136 | 197 |
| Example 92 | 96 | >1000 | 86 | 351 | 134 | 187 |
| Example 93 | 97 | 165 | 85 | 104 | 134 | 140 |
| Example 94 | 94 | 860 | 84 | 390 | 136 | 180 |
| Example 95 | 96 | 470 | 85 | 182 | 136 | 180 |
| Example 96 | 97 | 240 | 84 | 120 | 134 | 190 |
| Example 97 | 94 | 190 | 85 | 103 | 135 | 185 |
| Example 98 | 97 | 390 | 86 | 120 | 137 | 220 |
| Example 99 | 96 | 200 | 86 | 100 | 134 | 210 |
| Example 100 | 96 | 150 | 86 | 95 | 134 | 140 |
| Example 101 | 94 | 150 | 85 | 95 | 136 | 140 |
| Example 102 | 97 | 156 | 85 | 100 | 136 | 145 |
| Comparative Example 15 | 95 | >1000 | 85 | 860 | 135 | 800 |
| Comparative Example 16 | 96 | >1000 | 87 | 900 | 135 | 670 |
| Comparative Example 17 | 95 | >1000 | 87 | 750 | 137 | 430 |
| Comparative Example 18 | 95 | >1000 | 86 | >1000 | 136 | 730 |
| Comparative Example 19 | 96 | >1000 | 84 | >1000 | 134 | 720 |
| Comparative Example 20 | 97 | >1000 | 87 | 900 | 137 | 770 |
| Comparative Example 21 | 95 | >1000 | 86 | 820 | 137 | 620 |

The abbreviations in the specification and the tables refer to the following compounds.

VdF: vinylidene fluoride
TFE: tetrafluoroethylene
HFP: hexafluoropropylene
PFPVE: perfluoro-pentafluoro(propyl vinyl ether) ($CF_2$=$CFOCH_2CF_2CF_3$)
MMA: methyl methacrylate
MAA: methacrylic acid
3FM: 2,2,2-trifluoroethyl methacrylate
17FM: 2-(perfluorooctyl)ethyl methacrylate
PBT resin: polybutylene terephthalate-based resins (PBT resin in Table 7 is available from DuPont-Toray Co., LTD., trade name: Hytrel 4047)
PSt resin: polystyrene resin (available from Japan Polystyrene, Inc., trade name: NIHON POLYSTY G120K)
acrylic resin: copolymer of MMA and butyl acrylate (BA) (composition ratio 80/20, available from MITSUBISHI RAYON CO., LTD.)
PVdF: polyvinylidene fluoride resin (Arkema K. K., trade name: KYNAR710)
EVAL resin: ethylene-vinyl alcohol copolymer (composition ratio 32/68 mol %, available from KURARAY CO., LTD., trade name: EVAL F104)
PA12(a): nylon 12 (available from Daicel-Degussa, Ltd., trade name: Daiamide-L1640)
PA12(b): nylon 12 (available from EMS Showa Denko, trade name: Grilamide L16A)
PA11: nylon 11 (available from Arkema K. K., trade name: Rilsan BMF-0)
PA6-12: nylon 6-12 resin (available from Daicel-Degussa, Ltd., trade name: Daiamide-N1901)
PA6: nylon 6 resin (available from UBE INDUSTRIES, LTD., trade name: UBE nylon 1011FB)
PA66: nylon 66 resin (available from UBE INDUSTRIES, LTD., trade name: UBE nylon 2015B)
MCN: melamine cyanurate (available from NISSAN CHEMICAL INDUSTRIES, LTD., trade name: MC-4000)
BrPS: brominated polystyrene (BrPS in Table 7 is available from ALBEMARLE CORPORATION, trade name: HP-3010)
PDBS: polydibromostyrene
AnOx: antimony pentoxide (available from NISSAN CHEMICAL INDUSTRIES, LTD., trade name: San-Epok)
TBA-PC: tetrabromobisphenol A-carbonate oligomer compound
PPBBA: poly(pentabromobenzyl acrylate)
CB: carbon black
PhCy: phthalocyanine compound (colorant): (available from Ciba Specialties Chemicals, trade name: IRGALITE Blue-GBP)
PL: perylene-based compound (colorant): (available from Clariant, trade name: PV-Fast Orange GRL)
AQ: anthraquinone-based compound (colorant): (available from Bayer, trade name: Pigment Yellow 193)
BI: benzimidazolone-based compound (colorant): (available from Bayer, trade name: Pigment Red 176)

The invention claimed is:

1. A plastic optical fiber cable comprising:
   a bare plastic optical fiber comprising a core and a cladding layer formed around said core, the cladding layer being formed of one layer or two or more layers; and
   a coating layer provided on the outer surface of the bare plastic optical fiber,
   wherein said core is made of a poly(methyl methacrylate) or a copolymer comprising methyl methacrylate unit as a major component;
   said cladding layer comprises, a layer made of a fluorine-containing olefin-based resin comprising a tetrafluoroethylene unit in at least an outermost layer of the cladding layer the fluorine-containing olefin-based resin having a heat of crystal fusion of 40 mJ/mg or smaller as measured using differential scanning calorimetry (DSC);
   said coating layer comprising a protective coating layer, a light blocking coating layer, and a functional coating layer, the layers being provided in the order mentioned from the inner side;
   said functional coating layer is made of a first nylon-based resin composition having a crystalline melting point in a range of 215° C. to 280° C. as measured using differential scanning calorimetry (DSC), said first nylon-based resin composition containing melamine cyanurate in an amount in a range of 3% to 40% by mass or a brominated flame retardant in such an amount that the content of bromine atoms falls within a range of 1.5% to 30% by mass, said first nylon-based resin composition further containing an inorganic chromatic pigment in an amount in a range of 0.1% to 10% by mass;
   said light blocking coating layer is made of a second nylon-based resin composition containing, as a major component, a nylon-based resin of at least one of nylon 11 and nylon 12, said second nylon-based resin composition containing monomer and oligomer compounds derived from the nylon-based resin in an amount of 1.5% by mass or less in total; and
   said protective coating layer is made of at least one resin material selected from the group consisting of polybutylene terephthalate-based resins, methyl (meth)acrylate-based resins, styrene-based resins, and homopolymers of vinylidene fluoride.

2. The plastic optical fiber cable as claimed in claim 1, wherein said first nylon-based resin composition comprises at least one of nylon 6 and nylon 66 as a major component.

3. The plastic optical fiber cable as claimed in claim 1, wherein said first nylon-based resin composition contains not more than 20% by mass of antimony oxide.

4. The plastic optical fiber cable as claimed in claim 1, satisfying the following formulae (i) to (iii):

$$900 \leq A \leq 1100 \quad (i)$$

$$1.5 \leq b/a \leq 30 \quad (ii)$$

$$5.5 \leq (b+c)/a \leq 70 \quad (iii)$$

wherein "A" represents the outer diameter of the bare plastic optical fiber (μm), "a" represents the thickness of said protective coating layer (μm), "b" represents the thickness of said light blocking coating layer (μm), and "c" represents the thickness of said functional coating layer (μm).

5. A plastic optical fiber cable comprising:
   a bare plastic optical fiber comprising a core and a cladding layer formed around said core, the cladding layer being formed of one layer or two or more layers; and
   a coating layer provided on the outer surface of the bare plastic optical fiber,
   wherein said core is made of a poly(methyl methacrylate) or a copolymer comprising methyl methacrylate unit as a major component;
   said cladding layer comprises a layer made of a fluorine-containing olefin-based resin comprising a tetrafluoroethylene unit in at least an outermost layer of the cladding layer, the fluorine-containing olefin-based resin having a heat of crystal fusion for 40 mJ/mg or smaller as measured using differential scanning calorimetry (DSC);

said coating layer comprising a protective coating layer, a light blocking coating layer, and a functional coating layer, the layers being provided in the order mentioned from the inner side;

said functional coating layer is made of a first nylon-based resin composition having a crystalline melting point in a range of 240° C. to 280° C. as measured using differential scanning calorimetry (DSC), said first nylon-based resin composition having an oxygen transmission rate P [cm$^3$·cm/(cm$^2$·sec·Pa)] as measured using a method defined in ISO 14663-2:1999 (Annex C) at a temperature T(K), said P satisfying the following formula (a):

$$P < 8 \times 10^{-2} \times \exp(-5600/T) \qquad (A);$$

said light blocking coating layer is made of a second nylon-based resin composition containing, as a major component, a nylon-based resin of at least one the nylon 11 and nylon 12, said second nylon-based resin composition containing monomer and oligomer compounds derived from the nylon-based resin in an amount of 1.5% by mass or less in total; and said protective coating layer is made of at least one resin material selected from the group consisting of polybutylene terephthalate-based resins, methyl (meth)acrylate-based resins, styrene-based resins, homopolymers of vinylidene fluoride, and copolymers comprising an ethylene unit and a vinyl alcohol unit.

6. The plastic optical fiber cable as claimed in claim 5, wherein said first nylon-based resin composition has a crystallinity in a range of 30% to 55%.

7. The plastic optical fiber cable as claimed in claim 5, wherein said first nylon-based resin composition has an average diameter of a spherulite size in a range of 0.01 μm to 40 μm as observed through a microscope.

8. The plastic optical fiber cable as claim 5, wherein said first nylon-based resin composition comprises nylon 66 as a major component.

9. The plastic optical fiber cable as claimed in claim 5, wherein said first nylon-based resin composition contains a crystallization accelerator in an amount in a range of 0.01% to 10% by mass.

10. The plastic optical fiber cable as claimed in claim 5, wherein said first nylon-based resin composition contains a brominated flame retardant in such an amount that the content of bromine atoms falls within a range of 1.5% to 30% by mass.

11. The plastic optical fiber cable as claimed in claim 5, wherein said first nylon-based resin composition contains not more than 20% by mass of antimony oxide.

12. The plastic optical fiber cable as claimed in claim 5, wherein said first nylon-based resin composition contains, as a colorant, an inorganic pigment in an amount in a range of 0.1% to 10% by mass.

13. A method of signal transmission for transmitting a signal by using a combination of a plastic optical fiber cable as claimed in claim 1 and a visible light emitting diode having a center emission wavelength in a range of 500 nm to 600 nm.

14. A method of signal transmission for transmitting a signal by using a combination of plastic optical fiber cable as claimed in claim 5 and a visible light emitting diode having a center emission wavelength in a range of 500 nm to 600 nm.

15. The plastic optical fiber cable as claimed in claim 1, wherein said cladding layer is formed of two layers, the inner layer comprising a fluorinated methacrylate-based polymer, the outer layer comprising a copolymer comprising a vinylidene fluoride unit, a tetrafluoroethylene unit and a hexafluoropropylene unit.

16. The plastic optical fiber cable as claimed in claim 5, wherein said cladding layer is formed of two layers, the inner layer comprising a fluorinated methacrylate-based polymer, the outer layer comprising a copolymer comprising a vinylidene fluoride unit, a tetrafluoroethylene unit and a hexafluoropropylene unit.

17. The plastic optical fiber cable as claimed in claim 5, wherein said first nylon-based resin composition comprises nylon 66, an inorganic pigment, a bromine containing polystyrene, and antimony oxide.

18. The plastic optical fiber cable as claimed in claim 5, wherein said cladding layer is formed of two layers, the inner layer comprising a fluorinated methacrylate-based polymer, the outer layer comprising a copolymer comprising a vinylidene fluoride unit, a tetrafluoroethylene unit and a hexafluoropropylene unit;

said first nylon-based resin composition comprises nylon 66, an inorganic pigment, a bromine containing polystyrene, and antimony oxide;

said second nylon-based resin composition comprises nylon 12; and said protective coating layer comprises a polybutylene terephthalatebased resin.

19. The plastic optical fiber cable as claimed in claim 18, wherein said core comprises poly(methyl methacrylate).

* * * * *